US011893877B2

(12) United States Patent
Wachsman et al.

(10) Patent No.: US 11,893,877 B2
(45) Date of Patent: Feb. 6, 2024

(54) SECURITY SYSTEM INCLUDING AUTOMATION NOTIFICATION AND SURVEILLANCE INTEGRATION

(71) Applicant: Innovation Lock, LLC, Palm Beach Garden, FL (US)

(72) Inventors: David R. Wachsman, Palm Beach Gardens, FL (US); Alan Rabinowitz, Long Valley, NJ (US); Octavio Pupo Nogueira Neto, Sao Paulo (BR)

(73) Assignee: Innovation Lock, LLC, Palm Beach Gardens, FL (US)

( * ) Notice: Subject to any disclaimer, the term of this patent is extended or adjusted under 35 U.S.C. 154(b) by 0 days.

(21) Appl. No.: 17/984,316

(22) Filed: Nov. 10, 2022

(65) Prior Publication Data

US 2023/0066608 A1 Mar. 2, 2023

Related U.S. Application Data

(63) Continuation of application No. 16/911,005, filed on Jun. 24, 2020, now Pat. No. 11,545,025, which is a continuation-in-part of application No. 16/351,132, filed on Mar. 12, 2019, now Pat. No. 10,721,444.

(60) Provisional application No. 62/865,480, filed on Jun. 24, 2019, provisional application No. 62/728,809, filed on Sep. 9, 2018, provisional application No. 62/641,599, filed on Mar. 12, 2018.

(51) Int. Cl.

| | |
|---|---|
| ***G08B 3/10*** | (2006.01) |
| ***G08B 26/00*** | (2006.01) |
| ***H04R 3/04*** | (2006.01) |

(52) U.S. Cl.
CPC ............. *G08B 26/007* (2013.01); *G08B 3/10* (2013.01); *G08B 26/008* (2013.01); *H04R 3/04* (2013.01)

(58) Field of Classification Search
CPC ...... G08B 26/007; G08B 3/10; G08B 26/008; H04R 3/04
See application file for complete search history.

(56) References Cited

U.S. PATENT DOCUMENTS

| | | | | |
|---|---|---|---|---|
| 6,209,242 | B1 * | 4/2001 | Marshall ................. | G09F 19/02 40/430 |
| 6,255,957 | B1 | 7/2001 | Sonderegger et al. | |
| 8,269,625 | B2 | 9/2012 | Hoy et al. | |
| 9,196,136 | B2 | 11/2015 | King | |

(Continued)

*Primary Examiner* — John R Schnurr
(74) *Attorney, Agent, or Firm* — Michael J Porco; Gerald E Hespos

(57) ABSTRACT

A security system including automated notification and surveillance integration is provided. In the security system of the present disclosure, when any of the devices are locked, unlocked, interacted with, alarmed or triggered, a notification or communication signal is sent to at least one other device. The at least one other device may be a receiver, camera, smart phone, smart watch, laptop, desktop, and/or an Internet connected or Internet of Things (IoT) device. Additionally, a system is provided including at least one alarm module that generates an audible sound when an alarm condition is detected; at least one sensor that detects the audible sound and determines if the audible sound is within a predetermined frequency range and an interface that receives at least one first communication signal from the at least one sensor upon detecting an alarm and transmits at least one second communication signal to at least one device.

20 Claims, 34 Drawing Sheets

(56) References Cited

U.S. PATENT DOCUMENTS

| | | | | |
|---|---|---|---|---|
| 9,822,553 | B1 | 11/2017 | Ho et al. | |
| 10,361,880 | B1 | 7/2019 | Marcinkowski et al. | |
| 10,373,455 | B1 | 8/2019 | Grace | |
| 10,721,444 | B2 | 7/2020 | Rabinowitz et al. | |
| 11,058,238 | B1 * | 7/2021 | Toomey | A47F 5/025 |
| 2004/0046659 | A1 | 3/2004 | Kwon | |
| 2006/0103520 | A1 * | 5/2006 | Clark | G08B 29/123 340/506 |
| 2006/0226972 | A1 | 10/2006 | Smith | |
| 2007/0146127 | A1 | 6/2007 | Stilp et al. | |
| 2007/0241859 | A1 | 10/2007 | Bhat et al. | |
| 2007/0290789 | A1 | 12/2007 | Segev et al. | |
| 2009/0027197 | A1 | 1/2009 | Frolov | |
| 2009/0213221 | A1 | 8/2009 | Kanda | |
| 2009/0293567 | A1 | 12/2009 | Yuen et al. | |
| 2010/0237984 | A1 | 9/2010 | Zenaty | |
| 2011/0058035 | A1 | 3/2011 | DeBerry et al. | |
| 2011/0316396 | A1 * | 12/2011 | Arne | A47B 87/002 312/107 |
| 2012/0207265 | A1 | 8/2012 | Weinstein | |
| 2014/0104429 | A1 | 4/2014 | Ward et al. | |
| 2014/0267716 | A1 | 9/2014 | Child et al. | |
| 2015/0027178 | A1 | 1/2015 | Scalisi | |
| 2015/0170447 | A1 | 6/2015 | Buzhardt | |
| 2015/0262460 | A1 * | 9/2015 | Ito | G08B 13/22 340/568.1 |
| 2016/0047145 | A1 | 2/2016 | Johnson et al. | |
| 2016/0267759 | A1 | 9/2016 | Kerzner | |
| 2016/0290009 | A1 | 10/2016 | Feirer et al. | |
| 2017/0011619 | A1 | 1/2017 | Bass et al. | |
| 2017/0186287 | A1 * | 6/2017 | Schlake | F41C 27/00 |
| 2018/0283046 | A1 | 10/2018 | Uchida et al. | |
| 2019/0116305 | A1 | 4/2019 | Lee et al. | |
| 2019/0228601 | A1 | 7/2019 | Grzenda et al. | |
| 2019/0244449 | A1 | 8/2019 | Mukundala et al. | |
| 2019/0333045 | A1 * | 10/2019 | Hafemann | G06Q 20/326 |
| 2019/0349256 | A1 | 11/2019 | Holley | |
| 2020/0400268 | A1 * | 12/2020 | Yang | G08B 13/1418 |
| 2021/0150869 | A1 * | 5/2021 | Deutsch | G08B 13/248 |
| 2021/0327234 | A1 * | 10/2021 | Chandramowle | G06Q 20/208 |

* cited by examiner

| Mobi | Bat | Tag | B a t Sta | | Date | Time |
|---|---|---|---|---|---|---|
| 0 | 0 | 0 | 0 | 0 | 4/2/2049 | 14:34:22 |
| 1.00E+02 | 0 | 1234 | 0 | 3 | 4/2/2049 | 14:34:34 |
| 0 | 0 | 0 | 0 | 0 | 4/2/2049 | 14:34:22 |
| 1.00E+02 | 0 | 1234 | 0 | 3 | 4/2/2049 | 15:58:48 |
| 1.00E+02 | 0 | 1234 | 0 | 3 | 4/2/2049 | 16:25:41 |
| 1.00E+02 | 0 | 1234 | 0 | 3 | 4/2/2049 | 16:28:28 |
| 1.00E+02 | 0 | 1234 | 0 | 3 | 4/2/2049 | 16:32:17 |
| 1.00E+02 | 0 | 1234 | 0 | 3 | 4/2/2049 | 16:32:58 |
| 1.00E+02 | 0 | 1234 | 0 | 3 | 4/2/2049 | 16:34:23 |
| 1.00E+02 | 0 | 1234 | 0 | 3 | 4/2/2049 | 16:35:17 |
| 1.00E+02 | 0 | 1234 | 0 | 3 | 4/2/2049 | 16:36:13 |
| 1.00E+02 | 0 | 1234 | 0 | 3 | 4/2/2049 | 16:37:06 |
| 1.00E+02 | 0 | 1234 | 0 | 3 | 4/2/2049 | 16:38:02 |
| 1.00E+02 | 0 | 1234 | 0 | 3 | 4/2/2049 | 16:49:33 |
| 1.00E+02 | 0 | 1234 | 0 | 3 | 4/2/2049 | 16:51:16 |
| 1.00E+02 | 0 | 1234 | 0 | 3 | 4/2/2049 | 17:02:11 |
| 0 | 0 | 0 | 0 | 0 | 4/2/2049 | 14:34:22 |
| 1.00E+02 | 0 | 0 | 0 | 3 | 4/2/2049 | 14:38:31 |
| 1.00E+02 | 0 | 0 | 0 | 3 | 4/2/2049 | 14:48:06 |
| 0 | 0 | 0 | 0 | 0 | 4/2/2049 | 14:34:22 |
| 0 | 0 | 0 | 0 | 0 | 4/2/2049 | 14:34:22 |
| 1.00E+02 | 0 | 0 | 0 | 3 | 4/2/2049 | 14:35:52 |
| 0 | 0 | 0 | 0 | 0 | 4/2/2049 | 14:34:22 |
| 1.00E+02 | 0 | 0 | 0 | 3 | 4/2/2049 | 14:36:51 |
| 1.00E+02 | 0 | 1234 | 0 | 3 | 4/2/2049 | 14:37:00 |
| 1.00E+02 | 0 | 1234 | 0 | 3 | 4/2/2049 | 14:37:08 |
| 1.00E+02 | 0 | 0 | 0 | 3 | 4/2/2049 | 14:37:45 |
| 0 | 0 | 0 | 0 | 0 | 4/2/2049 | 14:34:22 |
| 1.00E+02 | 0 | 0 | 0 | 3 | 4/2/2049 | 14:34:47 |
| 1.00E+02 | 0 | 1234 | 0 | 3 | 4/2/2049 | 14:35:00 |
| 1.00E+02 | 0 | 1234 | 0 | 3 | ######## | 18:03:27 |
| 0 | 0 | 0 | 0 | 0 | 4/2/2049 | 14:34:22 |
| 1.00E+02 | 0 | 0 | 0 | 3 | 4/2/2049 | 14:36:44 |
| 1.00E+02 | 0 | 1234 | 0 | 3 | 4/2/2049 | 14:37:00 |
| 1.00E+02 | 0 | 0 | 0 | 3 | 4/2/2049 | 14:39:52 |
| 0 | 0 | 0 | 0 | 0 | 4/2/2049 | 14:34:22 |
| 1.00E+02 | 0 | 0 | 0 | 3 | 4/2/2049 | 14:35:28 |
| 0 | 0 | 0 | 0 | 0 | 4/2/2049 | 14:34:22 |
| 0 | 0 | 0 | 0 | 0 | 4/2/2049 | 14:34:22 |
| 0 | 0 | 0 | 0 | 0 | 4/2/2049 | 14:34:22 |
| 1.00E+02 | 0 | 0 | 0 | 3 | 4/2/2049 | 14:47:20 |
| 1.00E+02 | 0 | 1234 | 0 | 3 | 4/2/2049 | 14:47:26 |
| 1.00E+02 | 0 | 0 | 0 | 3 | 4/2/2049 | 14:57:02 |
| 1.00E+02 | 0 | 0 | 0 | 3 | 4/2/2049 | 16:35:01 |
| 1.00E+02 | 0 | 1234 | 0 | 3 | 4/2/2049 | 17:11:04 |

EXPORT OPTION SCREEN

SIDE VIEW

BOTTOM PRESPECTIVE VIEW

SECURITY SYSTEM INCLUDING AUTOMATION NOTIFICATION AND SURVEILLANCE INTEGRATION

PRIORITY

This application is a continuation-in-part application to U.S. patent application Ser. No. 16.911.005, filed Jun 24, 2020, which is a continuation-in-part application to U.S. patent application Ser. No. 16/351,132, filed Mar. 12, 2019, which claims priority to U.S. Provisional Patent Application Ser. No. 62/641,599, filed Mar. 12, 2018, and Ser. No. 62/728,809, filed Sep. 9, 2018, the contents of which are hereby incorporated by reference in their entireties.

This application also claims priority to U.S. Provisional Patent Application Ser. No. 62/865,480, filed Jun. 24, 2019, the contents of which are hereby incorporated by reference in its entirety.

TECHNICAL FIELD

The present disclosure relates generally to lock, notification and surveillance systems, and more particularly, to a security system including automated notification and surveillance integration.

BACKGROUND

Surveillance systems are often used by security personnel to surveil areas of interest via video displays that are connected to one or more cameras. These areas of interest and/or the items contained therein are often secured using a plurality of locks and/or other securing means. Security personnel are often tasked with carefully watching a plurality of video displays to discern any existing security threats in the areas of interest. However, this may require the usage of an excessive number of cameras and security personnel to enable the security personnel to watch all of the locks and/or other securing means in the areas of interest. These systems can often be costly and ineffective for discerning and/or preventing security threats. Therefore, a need exists for more efficient and effective surveillance systems.

SUMMARY

The present disclosure provides a security system including automated notification and surveillance integration. In the security system of the present disclosure, when any of the devices included in the security system are locked, unlocked, and/or interacted with (e.g., via key insertion into a mechanical lock), a notification or communication signal is sent to at least one other device. The at least one other device may be a receiver, smart phone, smart watch, laptop, desktop, and/or an Internet connected or Internet of Things (IoT) device. In one aspect, the at least one other device is an image capturing device configured to capture one or more images of the lock/device that has been locked or unlocked and the surrounding area the lock/device is disposed in responsive to the notification or communication signal sent. The security system of the present disclosure is configured for use with electronic locks, mechanical locks, and/or hybrid electronic-mechanical locks.

According to one aspect of the present disclosure, a sound sensing device is provided include a communication module, and a sound frequency detector configured to be triggered when at least one predetermined sound frequency is detected, wherein when the sound frequency detector is triggered, the communication module is configured to send at least one communication signal to at least one device.

In one aspect, the at least one predetermined frequency is at least one sound frequency of an alarm sound generated by an alarm module. In another aspect, the at least one predetermined frequency is a range of frequencies. In a further aspect, the at least one predetermined frequency is adjustable.

In another aspect, a noise cancelling module is configured to cancel frequencies other than the at least one predetermined frequency.

In a further aspect, the at least one device is a receiver coupled to a camera and the at least one communication signal triggers the camera to capture at least one image oriented in the vicinity of the sound frequency detector.

In one aspect, the at least one communication signal contains location data of the sound frequency detector and/or the detection module.

In a further aspect, when the sound frequency detector is not within the field of the view of the camera, the camera is configured to use the location data to swivel such that the sound frequency detector is within the field of the view of the camera before capturing the at least one image.

In yet another aspect, a signal converter is configured to convert signals between analog and digital signals, wherein the signal converter converts communication signals sent to and from the communication module.

In another aspect, the at least one device is a monitoring module configured to receive information included in the at least one communication signal and the at least one image captured, the monitoring module configured to display the at least one image and the information included in the at least one communication signal.

According to one aspect of the present disclosure, a system includes at least one alarm module that generates an audible sound when an alarm condition is detected; at least one sensor that detects the audible sound and determines if the audible sound is within a predetermined frequency range, wherein if the audible sound is within the predetermined frequency range, the at least one sensor transmits at least one first communication signal to an interface; and the interface that receives the at least one first communication signal from the at least one sensor and transmits at least one second communication signal to at least one device.

In one aspect, the interface further includes a data conversion module that converts the at least one second communication signal into a format compatible with the at least one device.

In another aspect, the at least one first communication signal includes at least one of an ID number associated to the at least one alarm module, a location of an asset associated to the at least one alarm module and/or a location of the at least one sensor.

In a further aspect, the at least one device is at least one camera disposed at the location of the at least one alarm module and/or at least one sensor and the at least one second communication signal includes a trigger for the at least one camera to capture at least one image.

In yet another aspect, the at least one device is at least one camera and the at least one second communication signal includes instructions for the at least one camera to swivel to the location of the at least one alarm module and/or at least one sensor.

In a further aspect, an audible message generator that generates an audible message based on the at least one first communication signal. In one aspect, the at least one device is at least one mobile device configured to receive and play the audible message. In another aspect, the at least one mobile device is a two-way radio.

In one aspect, the system further includes a detection module configured to sense the state of a component, the detection module triggers an alarm when a change in state is detected, wherein when the detection module triggers the alarm, the alarm is configured to generate the audible sound at the at least one alarm module.

In another aspect, the at least one device is a monitoring module configured to receive information included in the at least one first communication signal and the at least one image captured, the monitoring module configured to display the at least one image and the information included in the at least one first communication signal, wherein the at least one first communication signal includes at least one of an ID number associated to the at least one alarm module, a location of an asset associated to the at least one alarm module and/or a location of the at least one sensor.

BRIEF DESCRIPTION OF THE DRAWINGS

The above and other aspects, features, and advantages of the present disclosure will become more apparent in light of the following detailed description when taken in conjunction with the accompanying drawings in which.

It should be understood that the drawings are for purposes of illustrating the concepts of the disclosure and are not necessarily the only possible configuration for illustrating the disclosure.

DETAILED DESCRIPTION

Preferred embodiments of the present disclosure will be described hereinbelow with reference to the accompanying drawings. In the following description, well-known functions or constructions are not described in detail to avoid obscuring the present disclosure in unnecessary detail.

The present disclosure provides a security system including automated notification and surveillance integration. In the security system of the present disclosure, when any of the locks/devices included in the security system are locked, unlocked, and/or a triggering component (e.g., a switch, sensor, or other trigger means) is activated or triggered, a notification or communication signal is sent to at least one other device. The at least one other device may be receiver, a smart phone, smart watch, laptop, desktop, and/or an Internet connected or Internet of Things (IoT) device. In one aspect, the at least one other device is an image capturing device configured to capture one or more images of the lock that has been locked or unlocked and the surrounding area the lock is disposed, in response to the notification or communication signal sent. The security system of the present disclosure is configured for use with electronic locks, mechanical locks, and/or hybrid electronic-mechanical locks.

Figure 1:
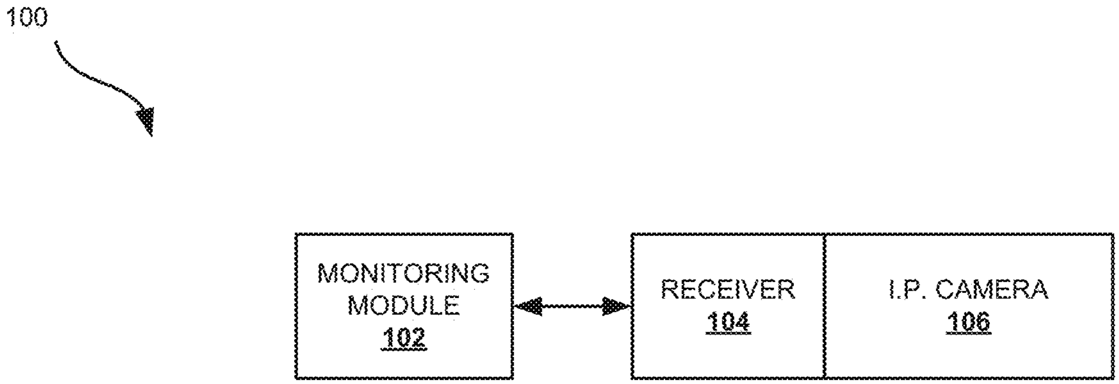
FIG. 1 is a block diagram of a lock system with automated surveillance integration in accordance with an embodiment of the present disclosure.
Figure 1:
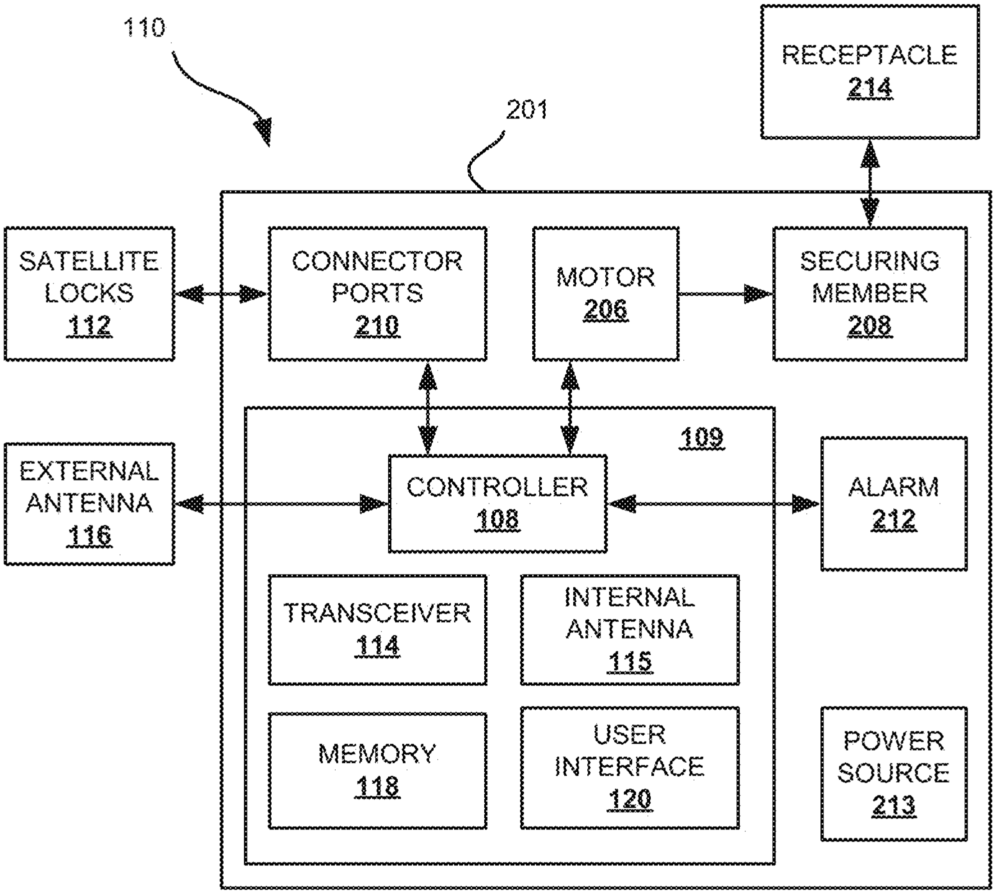

Referring to FIG. 1, a lock system 100 including automated notification and surveillance integration is shown in accordance with the present disclosure. System 100 includes monitoring module 102, receiver 104, camera or image capturing device 106, lock 110, and one or more satellite locks 112. In one embodiment, lock 110 and satellite locks 112 are configured as electronic locks. It is to be appreciated that lock 110 and/or satellite lock 112 may be configured as any type of electronic lock, such as, but not limited to, a padlock, a deadbolt, a knob lock, a lever handle lock, a cam lock, a ratchet lock, etc. The lock 110 and/or satellite locks 112 may be configured with multiple strike or latch pins to support various closure formats.

Lock 110 includes a housing 201, where control module 109, connector ports 210, motor or actuator 206, securing member 208, alarm 212, and power source 213 are disposed in housing 201. Lock 110 further includes an external antenna 116, which may be disposed external to the housing 201. It is to be appreciated that the housing 201 may be made of a non-conductive material. Housing 201 of lock 110 is configured to be mounted to a structure, such as a cabinet, lock box, etc., where the structure may include one or more doors, drawers, or display windows desired to be secured in an opened or closed state by lock 110. The size of housing 201 is configured to be sufficiently small to enable lock 110 to be mounted inconspicuously to or embedded within a structure.

Lock 110 includes a power source 213 for providing power to the components of lock 110. In some embodiments, power source 213 is configured as a hardwired connection to an external power source (e.g., the electrical system of a home or building or a low voltage power supply). In some embodiments, power source 213 may include circuitry for receiving power wirelessly, e.g., using electromagnetic induction to transfer energy through an electric field between power source 213 and another power source. It is to be appreciated that the energy transfer may occur in any part of the electromagnetic spectrum, including, but not limited to, radio frequency (RF) transmission of energy. In some embodiments, power source 213 is configured as a battery receptacle for receiving one or more batteries. For example, in one embodiment, power source 213 is configured as a battery receptacle for receiving Lithium-ion batteries that are AA-AAA in size. It is to be appreciated that any battery type may be used as a power source 213 without deviating from the scope of the present disclosure. Lock 110 may be configured to efficiently use the battery power from power source 213 such that lock 110 may be locked and unlocked many times (e.g., 25,000 to 35,000) before the batteries need to be replaced. In some embodiments, lock 110 may be concurrently coupled to a second (e.g., back-up) power source in additional to power source 213. In this way, if power is lost (e.g., a power surge has occurred, the batteries no longer store a charge, etc.), lock 110 may still be operated (e.g., to be unlocked, locked, etc.) if needed. The second power source may be a hardwired or wireless power source.

Control module 109 includes controller 108, transceiver 114, internal antenna 115, memory 118, and user interface 120. Controller 108 is configured to control the locking and unlocking of lock 110. To lock or unlock lock 110, controller 108 is configured to drive a motor 206, where motor 206 is configured to control the interaction of a securing member 208 of lock 110 with a receptacle 214 of a structure lock 110 is mounted to. When securing member 208 engages receptacle 214, lock 110 is in a locked state and when securing member 208 is not engaging receptacle 214, lock 110 is in an unlocked state. The securing member 208 may be a plunger of a plunger-type lock, a latch or hook of a ratchet-type lock, or any other type of securing member. For example, where the securing member 208 is a plunger-type lock, controller 108 is configured to drive motor 206 to extend or retract securing member 208 toward or away from receptacle 214 to lock or unlock device 110, as desired. In one embodiment, the receptacle 214 is configured as a latch pin (e.g., a tapered cylindrical pin coupled to and extending from a door or drawer) and the securing member 208 includes an aperture to receive the latch pin (e.g., when closing a door or drawer the latch pin is coupled to). In this embodiment, the securing member 208 is configured to receive the latch pin into the aperture and secure (e.g., by constricting the diameter of the aperture or otherwise engaging the latch pin) the latch pin within the aperture of the securing member 208 when lock 110 is locked.

Controller 108 is configured to lock or unlock lock 110 in response to one or more communications signals received via at least one of transceiver 114, internal antenna 115, external antenna 116, and/or a user interface 120, as will be described below.

In one embodiment, antennas 115, 116 are configured for sending/receiving communication signals to/from user devices using one or more communication protocols, such as, but not limited to, Radio-Frequency Identification (RFID), Near Field Communication (NFC), Bluetooth, Bluetooth Low Energy (BLE), or any other communication protocols or methods falling within the electromagnetic spectrum. Controller 108 is configured to lock or unlock lock 110 in response to one or more communication signals received from a user control device and sensed by either an internal antenna 115 or an external antenna 116. It is to be appreciated that external antenna 116 may be disposed external to housing 201, such that, if internal antenna 115 is inaccessible due to the placement of housing 201 (e.g., where lock 110 is embedded within a structure or is otherwise disposed in a location that renders the communication capabilities of internal antenna 115 ineffective), external antenna 116 may be placed in a more convenient area for sending and receiving communication signals to/from a user control device. The user control device may be a passive device (such as an RFID tag on an RFID card) or an active device (such as a mobile device including one or more antennas, such as RFID, NFC, Bluetooth, BLE, etc., for wireless communication). The user control device includes encrypted authorization data to be communicated to controller 108 for locking and unlocking lock 110.

For example, in one embodiment, the user control device may be a device including an RFID chip, such as an RFID card, that interacts with antenna 115 and/or antenna 116. In this embodiment, antennas 115, 116 may be configured as RFID readers configured to read information from the RFID chip on the RFID card and provide the information to controller 108. In this way, when a user presents an authorized RFID card (or other device including an RFID chip) to one of antennas 115, 116, antenna 115 or antenna 116 interrogates the RFID chip in the RFID card to obtain the data (e.g., an authorization code or key associated with lock 110) stored on the RFID chip. The data obtained from interrogating the RFID card, is then transmitted or provided by antenna 115 or antenna 116 to controller 108. The controller 108 then determines if the obtained data from the user device matches authorization data (e.g., an authorization code or key for enabling the locking and unlocking of lock 110) stored in memory 118. If the obtained data matches authorization data stored in memory 118, controller 108 is configured to change the state of lock 110 from a locked state to an unlocked state or from an unlocked state to a locked sate by driving motor 206 to control securing member 208.

In some embodiments, memory 118 may be disposed in a remote server, where controller 108 is configured to interact with the remote server via transceiver 114 or other communication means. Controller 108 may be in communication with the remote server over local area network or a wide area network (e.g., the Internet).

Although in the embodiment described above, the user control device is an RFID card, in other embodiments antennas 115, 116 and controller 108 may be configured for use with other devices and using other communication protocols to enable a user to lock or unlock lock 110 using a user control device. For example, in one embodiment, antennas 115, 116 may be configured to interact with a mobile computing device, such as a smart watch, smart phone, tablet, or other mobile computing device. Antennas 115, 116 may be configured to interrogate an RFID or NFC chip or tag disposed in the mobile computing device when the mobile computing device is placed proximately to antenna 115, 116. Antennas 115, 116 may further be configured to receive communication signals from a user control device in any one of the wireless communication protocols in use today, such as, but not limited to, Bluetooth, BLE, Wi-Fi, ZigBee, Z-wave, etc., to lock or unlock lock 110.

In some embodiments, each of antennas 115, 116 may be configured as multi-media readers including a plurality of antennas, each configured for communication using different communication protocols. For example, antennas 115, 116 may be configured for communicating via any of the communication protocols described above (e.g., RFID, NFC, Bluetooth, BLE, etc.) In this way, lock 110 may be configured to be unlocked by a plurality of different user control devices having differing communication capabilities.

In one embodiment, control module 109 includes a user interface configured for receiving one or more user inputs. Controller 108 is configured to lock or unlock electronic lock 110 in response to authentication information inputted by a user to user interface 120 and provided to controller 108. For example, user interface 120 may be configured as a key pad including a plurality of buttons (e.g., mapped to letters, numbers, and/or other symbols), enabling a user to enter a predetermined code or security key for locking or unlocking lock 110. User interface 120 may also be configured as a biometric reader for reading and obtaining biometric data from a user, such as, but not limited to, a voice recording, and/or fingerprint, iris, retina, and/or facial scans. The biometric data obtained from the user may then be provided from user interface 120 to controller 108, where controller 108 is configured to analyze the biometric data to determine if the user is an authorized user (e.g., based on comparing the received biometric data to biometric data stored in memory 118). If controller 108 determines that the user is an authorized user, controller 108 is configured to lock or unlock lock 110 responsive to the biometric data inputted to user interface 120 by the user.

In some embodiments, controller 108 is configured to require a combination of authentication data (i.e., received via antenna 116 and/or user interface 120) to lock or unlock lock 110. For example, controller 108 may be configured to require a predetermined key or code from a user control device, such as, an RFID card and at least one biometric identifier (e.g., a fingerprint, recognized voice or face, etc.). It is to be appreciated that controller 108 may be configured to require any number and combination of authorization data including one or more codes received via antenna 116 and/or user interface 120 and one or more biometric identifiers received via user interface 120.

Control module 109 of lock 110 also includes a transceiver 114 configured to send and receive wireless and/or wired communication signals to/from other devices over local and/or wide area networks (such as the Internet). In some embodiments, controller 108 is configured to lock or unlock lock 110 in response to one or more communication signals received via transceiver 114 from other devices. For example, in one embodiment, transceiver is configured to receive communication signals via transceiver 114 from a computing device (e.g., a computer, laptop, smart phone, smart watch, tablet, etc.) to lock or unlock lock 110. In this way, lock 110 is configured to be locked or unlocked remotely, even if a user is not located proximately to lock 110.

In one embodiment, transceiver 114 is configured to transmit one or more communication signals to a receiver 104, where receiver 104 is coupled to an image capturing device, such as an Internet Protocol (IP), analog, or other type of camera 106 capable of capturing at least one image including video. It is to be appreciated that, in some embodiments, receiver 104 is disposed within camera 106. In some embodiments, receiver 104 is configured as a transceiver. In some embodiments, an interface (e.g., such as interface 502, 702, described below) is used to extract information from the signal received by receiver 104 and provide the extracted information to monitoring module 102, camera 106, or any other device in system 100. The interface may couple receiver 104 to camera 106 and monitoring module 102. The interface may be an input/output device configured to facilitate communication between receiver 104 and camera 106. In one embodiment, the interface may be integrated with receiver 104.

Receiver 104 and camera 106 are located proximately to the area where lock 110 is located, such that camera 106 is within an observable distance of lock 110 and the lens of camera 106 has an unobstructed view of lock 110. When the state of lock 110 has been changed by controller 108 (e.g., lock 110 has been locked or unlocked), controller 108 is configured to simultaneously energize a relay within transceiver 114 to transmit one or more communication signals to receiver 104 indicating that lock 110 has been locked or unlocked. The one or more communication signals received by receiver 104 cause a relay within receiver 104 to be energized and receiver 104 is then configured to provide the one or more communication signals to a controller or processor of camera 106. In response to the one or more communication signals received from receiver 104, camera 106 is configured to record at least one image of lock 110. In some embodiments, camera 106 is configured to record a video stream of lock 110 for a predetermined period of time after receiving the one more communication signals indicating lock 110 has been unlocked.

In some embodiments, the at least one image and/or video recorded by camera 106 also includes visual capture of the area surrounding lock 110 including the structure lock 110 is mounted to, antenna 116, user interface 120, and/or the user attempting to lock or unlock lock 110.

When receiver 104 receives the one or more communication signals from transceiver 114 indicating lock 110 has been unlocked, either receiver 104 or camera 106 sends an alert signal to monitoring module 102 indicating that lock 110 has been unlocked. Additionally, camera 106 is configured to stream the recorded images and/or video captured by camera 106 to monitoring module 102. The monitoring module 102 may then record the images and/or video captured by camera 106 in a memory and/or display the images and/or video on a display screen to be viewed by security personnel. In some embodiments, upon being alerted that lock 110 has been unlocked, monitoring module 102 is configured to record the time and date in the memory of the opening to create an audit trail for lock 110. In some embodiments, monitoring module 102 may use the images and/or video captured by camera 106 to perform image processing, such as, facial recognition of the person unlocking lock 110. It is to be appreciated that image capturing device 106 and receiver 104 may be coupled to monitoring module 102 via a hardwired or wireless connection.

In one embodiment, system 100 is configured such that, when any attempt (whether the attempt is successful or unsuccessful) is made to change the state of lock 110 (e.g., from a locked to an unlocked state or from an unlocked to a locked state) camera 106 records images and/or video of lock 110 (and the surrounding area of lock 110) and transmits the recorded images and/or video to monitoring module 102.

It is to be appreciated that, when the state of lock 110 has been changed, controller 108 may be configured to transmit a notification signal to any device in communication with transceiver 114 or a network transceiver 114 is coupled to. For example, the controller 108 may send a notification signal to a smart phone, smart watch, laptop, desktop, or any other type of computing device. Controller 108 may send a notification signal to an Internet connected or IoT device. Controller 108 may send the notification to a security or alarm system.

In one embodiment, controller 108 may be configured to control multiple locks, such that a user may lock or unlock multiple locks simultaneously when lock 110 is unlocked. For example, as shown in FIG. 1, controller 108 is further coupled to one or more satellite locks 112 via connector ports 210. Connector ports 210 may be coupled to the one or more satellite locks 112 via one or more splitter and connector cables. In one embodiment, satellite locks 112 are configured as electronic locks controllable by controller 108. Each satellite lock 112 may be configured to only include components necessary for locking and unlocking the respective satellite lock 112 responsive to control signals received from controller 108. In this embodiment, when a user request to lock or unlock locks 110, 112 is received by controller 108 (e.g., via antenna 116, transceiver 114, or user interface 120), controller 108 is configured to simultaneously unlock each of lock 110 and satellite locks 112. In the manner described above, simultaneously with unlocking each of locks 110, 112, controller 108 is configured to send one or more communication signals to camera 106 (or any other device) via transceiver 114 and receiver 104 indicating the locks 110, 112 have been unlocked and causing camera 106 to capture one or more images and/or a video stream of locks 110, 112.

In one embodiment, controller 108 is coupled to each of satellite locks 112 in parallel or separately. In this embodiment, controller 108 is configured to simultaneously send control signals to each of satellite locks 112 in parallel for locking and unlocking satellite locks 112.

In another embodiment, satellite locks 112 are coupled to controller 108 in a daisy-chain arrangement (i.e., serially). In this embodiment, a first satellite lock 112 is coupled to controller 108 and each additional satellite lock 112 is coupled serially to the first satellite lock. In this arrangement, when controller 108 send a control signal to the first satellite lock 112 to lock or unlock satellite lock 112, each subsequent satellite lock 112 is configured to retransmit the control signal to the next satellite lock 112, such that the state of each satellite lock 112 in the chain is changed in accordance with the control signal. In this way, controller 108 need not be separately connected to each satellite lock 112 to control each satellite lock 112.

It is to be appreciated that, whether satellite locks 112 are coupled to controller 108 in parallel or serially, controller 108 may be configured to control each of satellite locks 112 such that the state of each of satellite locks 112 mirrors the state of lock 110 (i.e., each of satellite locks 112 are locked or unlocked when lock 110 is locked or unlocked). Controller 108 may additionally be configured to control each of satellite locks 112 separately (i.e., each of satellite locks 112 may be locked or unlocked separately by controller 108 regardless of the state of lock 110 or any other satellite lock 112).

In some embodiments, controller 108 may be configured with group programming rules. For example, when a first user control device is used, controller 108 is configured to unlock or lock a first subset of locks 110, 112 in accordance with the security clearance allotted to the first user control device. When a second user control device is used, controller 108 is configured to unlock or lock a second subset of locks 110, 112 in accordance with the security clearance allotted to the second user control device. It is to be appreciated that the security clearance of each user device may be saved in memory 118 to be referenced by controller 108 in assessing which subset of locks 110, 112 is to be locked or unlocked.

In some embodiments, controller 108 may be configured to employ conditions that need to be met to enable certain user control devices to lock or unlock one or more locks 110, 112. For example, controller 108 may be configured such that when a first user control device is used, the first user control device is only enabled to lock or unlock the lock 110, 112 during a certain time and/or on a specific day. In this embodiment, if any attempt is made by the first user control device to lock or unlock the locks 110, 112 that do not meet the predetermined conditions (e.g., time and/or day), controller 108 is configured to reject any attempt by the first user control device to lock or unlock locks 110, 112.

Controller 108 may be configured with any one of several security features described below.

In one embodiment, if the power to lock 110 is lost (e.g., the batteries cannot provide power, or another electrical failure of one of the components of lock 110 is causing a power loss, etc.), controller 108 is configured to maintain lock 110 in a locked state (i.e., where securing member 208 is engaging receptacle 214) until the power to lock 110 is restored. In another embodiment, if the power to lock 110 is lost, controller 108 is configured to maintain lock 110 in an unlocked state (i.e., where securing member 208 is not engaging receptacle 214) until the power to lock 110 is restored. In some embodiments, lock 110 may include a selection means (e.g., a physical button, such as a toggle, or any other selection means) configured to enable a user select how controller 108 responds to lock 110 losing power. The selection means enables the user to select for controller 108 to maintain lock 110 in a locked state if power to lock 110 is lost or for controller 108 to maintain lock 110 in an unlocked state if power to lock 110 is lost. As described above, in some embodiments, lock 110 may be coupled to second (e.g., backup) power source for operating lock 110 when power cannot be provided from power source 213.

In another embodiment, lock 110 also includes an alarm module 212. The alarm module 212 may be configured as a speaker controllable by controller 108 to make an audible alarm sound under different conditions. Alarm module 212 may be one or more lights (e.g., LEDs) controllable by controller 108 to illuminate (e.g., in a pulsing or other manner) under different conditions. It is to be appreciated that alarm module may include any means for alerting surrounding users of an alarm condition.

For example, in one embodiment, controller 108 is configured to determine if the batteries powering lock 110 and/or satellite locks 112 are below a predetermined power threshold. In this embodiment, if controller 108 determines the batteries are below a predetermined power threshold, controller 108 is configured to cause alarm module 212 to output an audible alert or alarm sound.

In another embodiment, controller 108 is configured to determine if any of locks 110, 112 is being forced open without receiving a communication signal from controller 108. In this embodiment, a sensor may be included in securing member 208, receptacle 214, or between securing member 208 and receptacle 214. The sensor is configured to sense when securing member 208 is engaging receptacle 214 or not and send communication signals to controller 108 indicating whether securing member 208 is engaging receptacle 214. If controller 108 receives a signal from the sensor that the securing member 208 is not engaging the receptacle 214 (i.e., the lock has been opened) and controller 108 has not caused securing member 208 to disengage receptacle 214, controller 108 is configured to cause alarm module 212 to generate an alarm sound.

In another embodiment, a sensor may be disposed on a door, drawer, or other portion of a structure lock 110 or satellite lock 112 is mounted to. The sensor is configured to sense whether the door, window, drawer, etc., is in an open or closed state and send a signal indicative of the open or closed state of the door, window or drawer to controller 108. If controller 108 receives a signal indicating that the door, window, or drawer has been opened and controller 108 has not caused the lock 110 or satellite lock 112 mounted to the door, window, or drawer to be unlocked, controller 108 is configured to cause alarm module 212 to generate an alarm sound or illuminate one or more lights.

In one embodiment, if controller 108 determines that the door, window, drawer, etc., that lock 110 or satellite lock 112 is mounted to has been continuously open for a predetermined amount of time, controller 108 is configured to cause alarm module 212 to generate an alarm sound. It is to be appreciated that this predetermined time is adjustable and may be selected and programmed into controller 108 as desired.

In any of the above embodiments where controller 108 causes alarm module 212 to generate an alarm sound, controller 108 may also be configured to send a communication signal to receiver 104 via transceiver 114 to cause camera 106 to capture one or more images of lock 110 and/or satellite locks 112.

In some embodiments, if controller 108 determines that locks 110 and/or satellite locks 112 have been in an unlocked state continuously for a predetermined amount of time, controller 108 is configured to automatically lock locks 110 and/or satellite locks 112. In one embodiment, the securing member 208 of each of locks 110, 112 is configured as a spring-loaded latch. The spring-loaded latches are configured such that even if the locks 110, 112 are locked while the doors, windows, or drawers the locks 110, 112 are mounted to are open (i.e., receptacle 214 is not being engaged by securing member 208), the doors, windows, or drawers may still be closed such that spring-loaded latch engages the receptacle 214 to secure the doors, windows, or drawers into a closed state.

In some embodiments, controller 108 is configured to lock or unlock locks 110, 112 in response to communication signals received via transceiver 114 from receiver 104. The signals may be generated from monitoring module 102 or camera 106. In some embodiments, the system 100 may include an application stored on a user device (such as smart phone, laptop, desktop, etc.) In this embodiment, the application is configured to store authentication information required to unlock or lock locks 110, 112. The application is further configured to enable a user to lock or unlock locks 110, 112 by sending communication signals including the authentication information to monitoring module 102 (e.g., via a wired or wireless communication network). In response to the received authentication information, monitoring module 102 is configured to cause receiver 104 to send the authentication information to controller 108 to locks or unlock 110, 112. It is to be appreciated that any information stored on the application and shared between the application, the monitoring module 102, receiver 104, camera 106, and controller 108 is encrypted to ensure security against unauthorized parties obtaining authentication information used to lock and unlock locks 110, 112.

As will be described in greater detail below, in some embodiments, camera 106 is configured to capture images and/or video of a plurality of locks 110, 112 in system 100. In this embodiment, camera 106 may be configured to swivel to alter the orientation of the lens of camera 106 to capture images and/or video of any one of the locks 110, 112 in system 100 at a given time.

Figure 2:
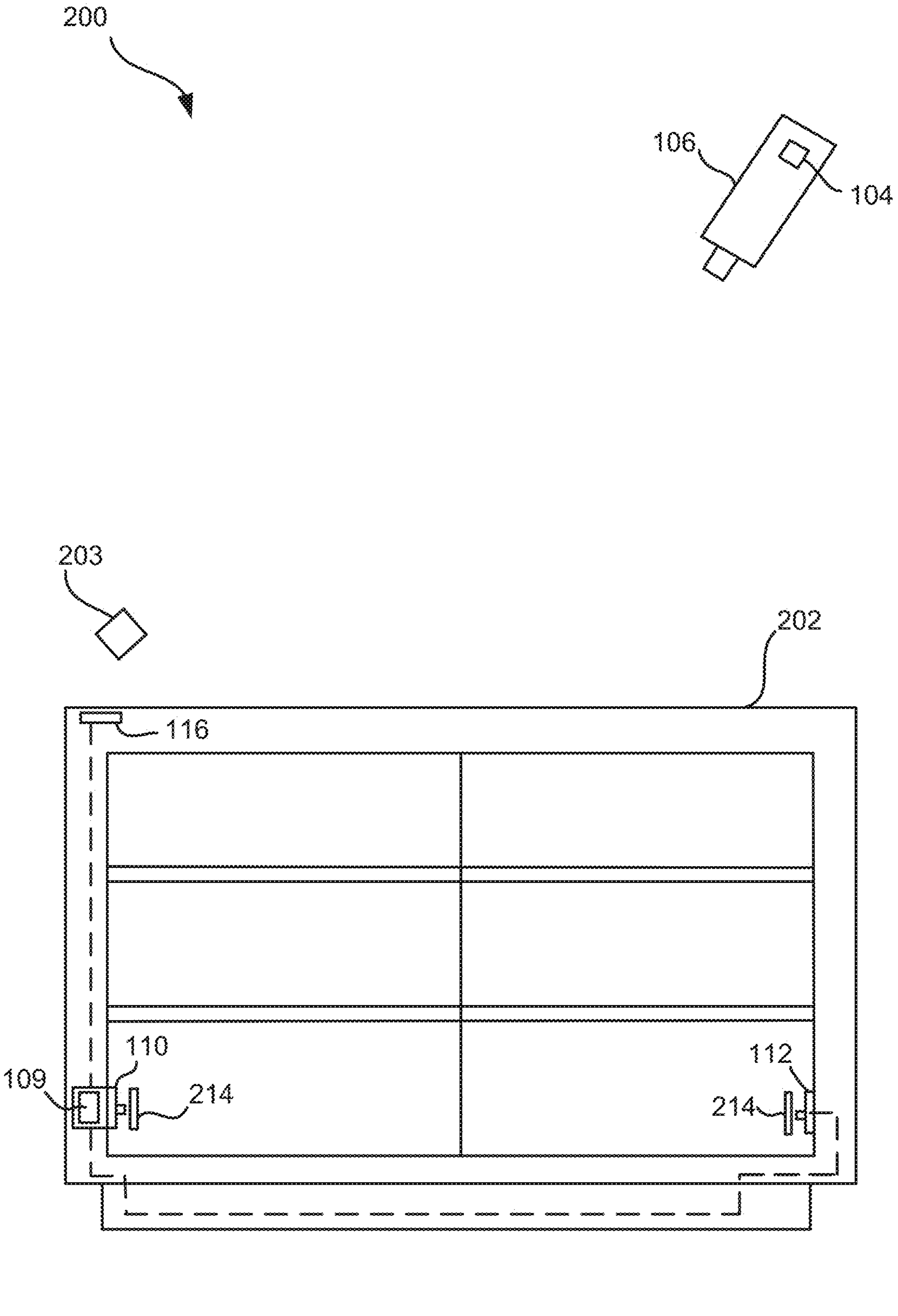
FIG. 2 is an environment including the lock system of FIG. 1 in accordance with an embodiment of the present disclosure.

As described above, locks 110, 112 may be mounted to any structure, such as, but not limited to, a door, display window, drawer, etc., such that, system 100 may be used to monitor and surveille the structure automatically when locks 110, 112 is locked or unlocked. For example, referring to FIG. 2, an environment 200 including locks 110, 112 mounted to a structure 202 is shown in accordance with the present disclosure. Structure 202 may be a cabinet, or any other structure, including one or more drawers, doors, or display windows. Locks 110, 112 may each be mounted to a separate drawer, door, or display window, etc. of structure 202 to secure the drawers, doors, or display windows of structure 202 in a closed state when locks 110, 112 are locked. Locks 110, 112, may be disposed internally or externally to structure 202.

In use, a user may place a user control device 203 (e.g., an RFID card, smart phone, smart watch, etc.) proximately to antenna 116 or antenna 115 (disposed in control module 109) and/or provide one or more user inputs (e.g., key pad entries, fingerprints, etc.) to user interface 120 to cause controller 108 to unlock locks 110 and 112. When locks 110, 112 are unlocked, securing members of locks 110, 112, e.g., a plunger, latch, hook, etc. disengages a receptacle 214 of structure 202 to enable the door, drawer, display window, etc. to be opened. Simultaneously with locks 110 and 112 being unlocked, controller 108 is configured to send one or more communication signals to camera 106 via transceiver 114 and receiver 104 to cause camera 106 to capture or record one or more images and/or a video of structure 202 and locks 110, 112.

Figure 3:
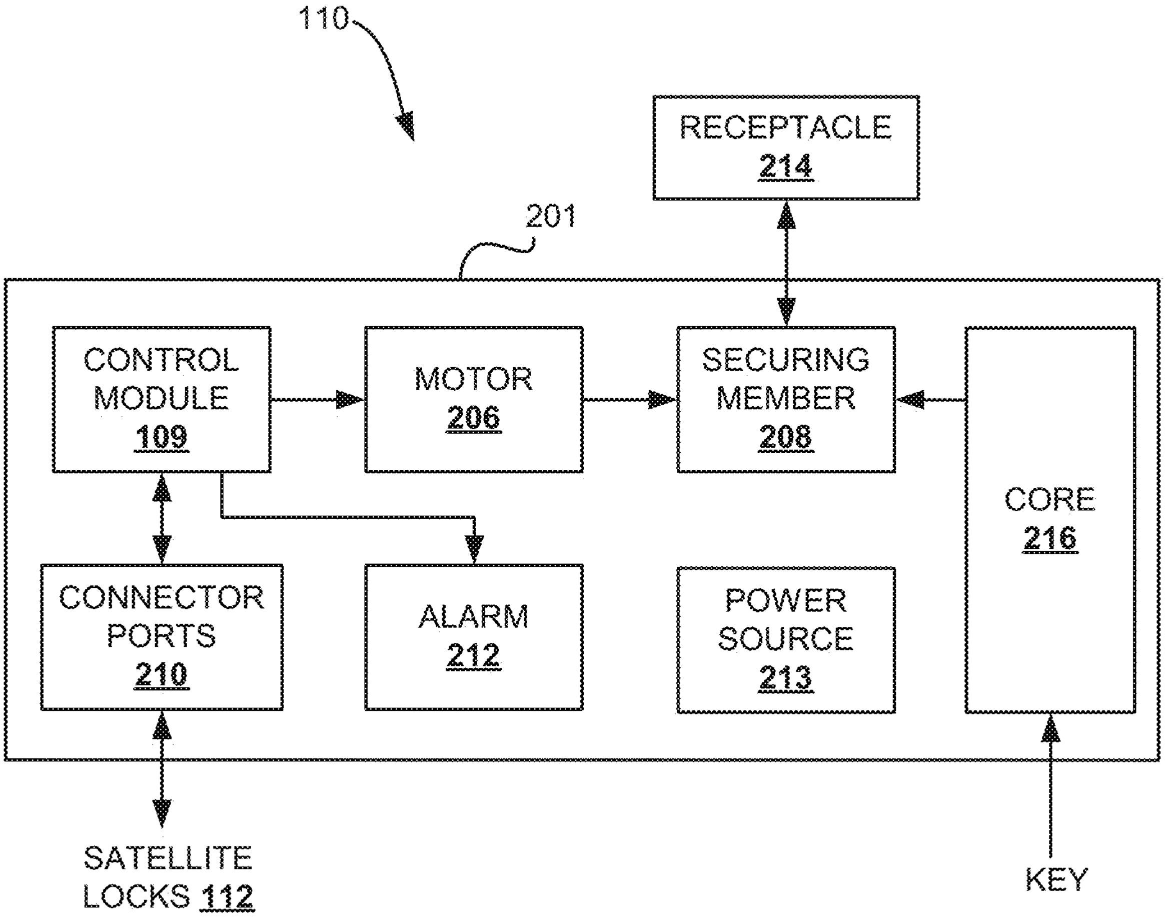
FIG. 3 is a block diagram of hybrid electronic mechanical lock in accordance with an embodiment of the present disclosure.

In some embodiments, lock 110 may be configured as a hybrid electronic mechanical lock, such that lock 110 may be locked or unlocked either electronically (i.e., via controller 108 controlling motor 206) or mechanically (i.e., using a physical key). For example, referring to FIG. 3, lock 110 is shown including a core or cylinder 216. It is to be appreciated that, in one embodiment, core 216 is configured as an interchangeable core. Core 216 is coupled to the securing member 208 and configured to receive a suitable key through a keyway of the core 216. When the key is inserted into the keyway of core 216 and turned, core 216 controls the interaction of securing member 208 with receptacle 214 to lock or unlock lock 110. In one embodiment, controller 108 is configured to sense or detect if the state of lock 110 has been changed from a locked state to an unlocked state or from an unlocked state to a locked state (e.g., by way of a contact sensor coupled to securing member 208 or receptacle 214, or other sensing means). In this embodiment, when the state of lock 110 is changed mechanically using a key and core 216, controller 108 is configured to send one or more communication signals to camera 106 via transceiver 114 and receiver 104 to cause camera 106 to capture one or more images and/or a video of lock 110.

Figure 4:
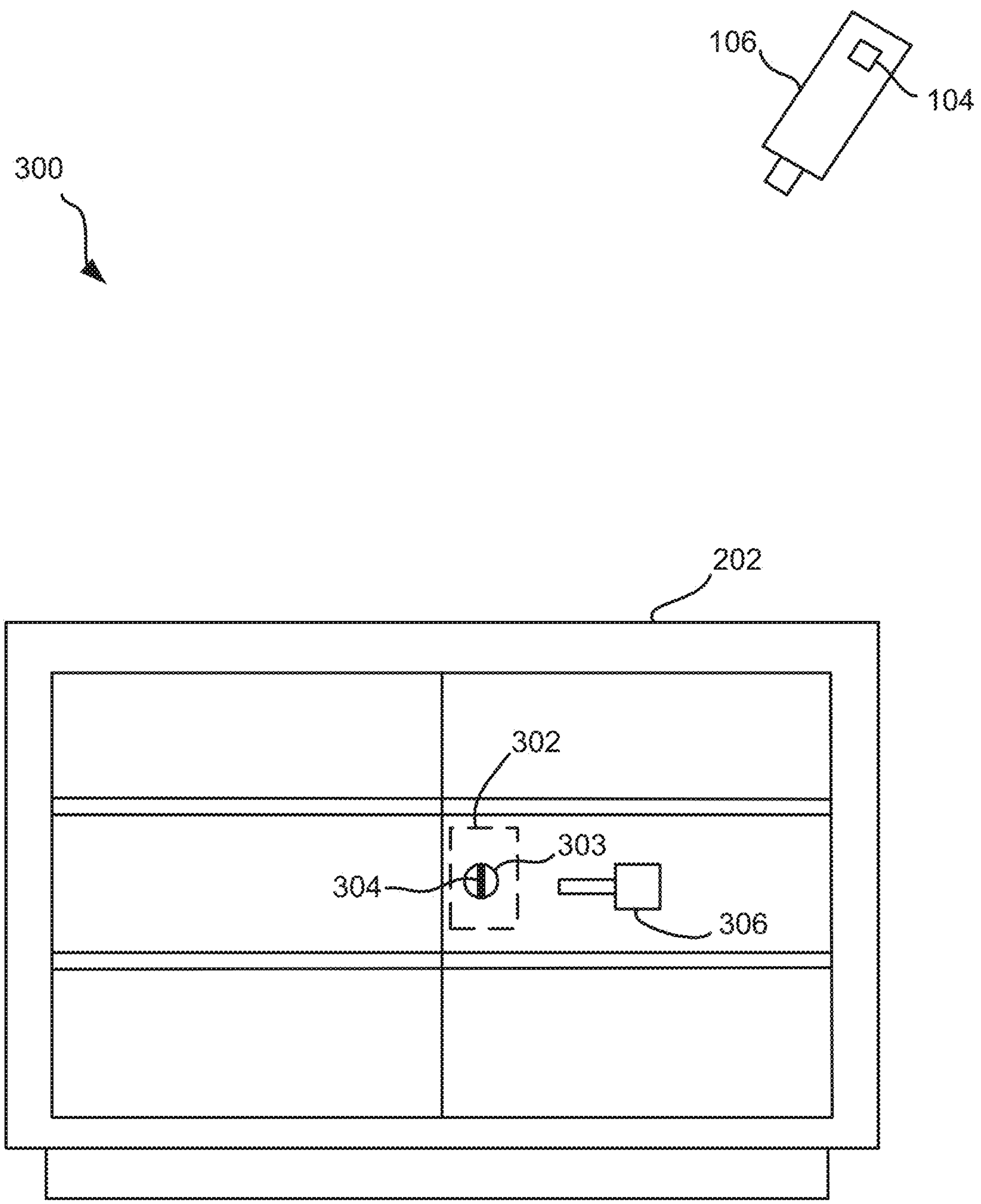
FIG. 4 is another environment including the lock system of FIG. 1 being used with a mechanical lock in accordance with an embodiment of the present disclosure.

In another embodiment of the present disclosure, system 100 may be configured for use with a mechanical lock for automated surveillance. For example, referring to FIG. 4, an environment 300 including a mechanical lock 302 mounted to structure 202 is shown in accordance with the present disclosure. Mechanical lock 302 includes a core or cylinder 303 including a keyway 304. In this embodiment, mechanical lock 302 does not include any electrical parts. Instead, mechanical lock 302 integrates with system 100 via a key fob or apparatus 306. As will be described in greater detail below, key fob 306 is an apparatus that includes both means for mechanically opening a mechanical lock and means for communicating wirelessly with at least one other device, such as, but not limited to image capturing device 106. Key fob 306 is configured to transmit one or more communication signals to receiver 104 and camera 106 when key fob 306 is inserted into keyway 304. In this way, when the state of lock 302 is changed via key fob 306, camera 106 is configured to record one or more images and/or a video of structure 202 and mechanical lock 302 in response to the communications signals received from key fob 306. It is to be appreciated that key fob 306 may also be used with the hybrid electrical-mechanical lock shown in FIG. 3.

Figure 5A:
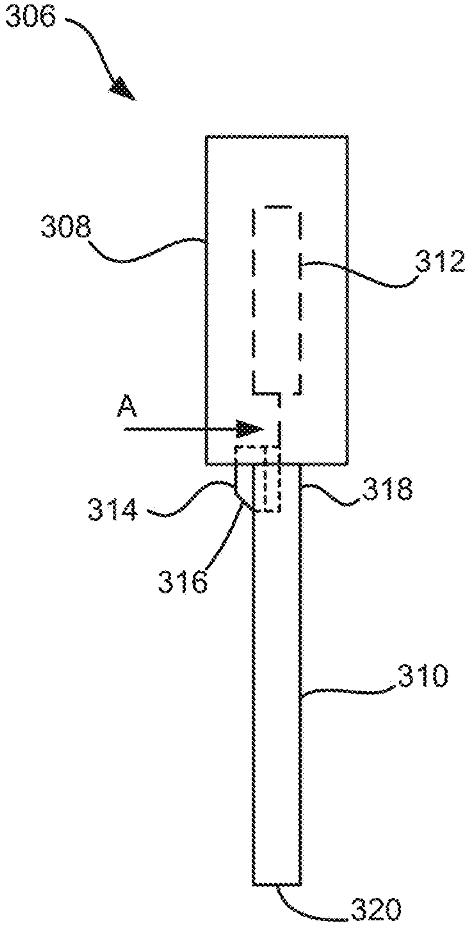
FIGS. 5A and 5B illustrate a key fob in accordance with an embodiment of the present disclosure.
Figure 5B:
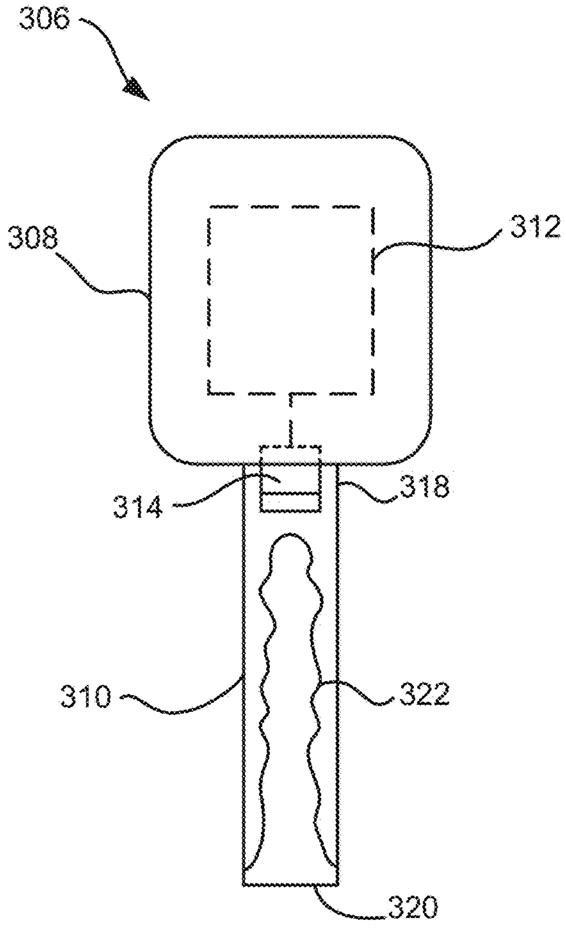

Referring to FIGS. 5A and 5B, key fob 306 is shown in greater detail. As shown in FIGS. 5A and 5B, key fob 306 includes a bow or handle portion 308 and a blade or shaft portion 310. The handle portion 308 includes an embedded transceiver circuit 312 that is coupled to a microswitch 314 or other means for triggering transceiver circuit 312. The shaft portion 310 includes a first end 318 (e.g., a base portion) and a second end 320 (e.g., a tip portion) and a plurality of key cuts 322 extending from the second end 320 to the first end 318.

In one embodiment, the microswitch 314 is coupled to the first end 318 of the shaft portion 310. Microswitch 314 is configured to be depressible in a direction A (indicated in FIG. 5A), such that when microswitch 314 is depressed in the direction A, a signal is sent to the transceiver circuit 312. Responsive to the signal sent from microswitch 314 to transceiver circuit 312, transceiver circuit 312 is configured to send one or more communication signals to camera 106 (or any other device) via receiver 104 indicating that an attempt to change the state of lock 302 is about to occur. Responsive to the one or more communications signals received from transceiver circuit 312, camera 106 is configured to record one or more images and/or a video of structure 202 and lock 302. In one embodiment, microswitch 314 includes a beveled surface 316 configured to cause microswitch 316 to become depressed when shaft portion 310 is inserted into keyway 304 of core 303 and microswitch 314 contacts a portion of the keyway 304. In this way, whenever shaft portion 310 of key fob 306 is inserted into key way 304, camera 106 records one or more images and/or video of structure 202 and lock 302.

Figure 5C:
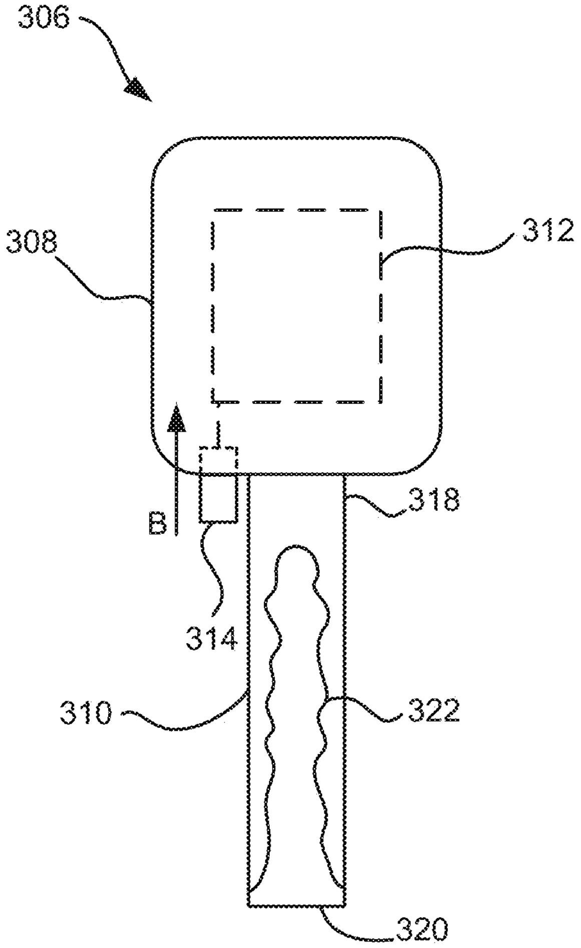
FIGS. 5C, 5D and 5E illustrate another embodiment of a key fob of in accordance with the present disclosure.

In another embodiment, microswitch 314 is mounted to portion 308 of key fob 306. For example, referring to FIG. 5C, microswitch 314 is shown mounted to portion 308, such that microswitch 314 extends from portion 308 in the same direction as shaft 310. In this embodiment, microswitch 314 is depressible in a direction B. When shaft portion 310 is inserted into keyway 304 of core 303, microswitch 314 contacts a portion of lock 302 disposed proximately to keyway 304 (e.g., a surface of core 303 or another surface of lock 302). In this way, when microswitch 314 is depressed in a direction B, a signal is sent to camera 106, as described above, to cause camera 106 to record one or more images and/or video of structure 202 and lock 302.

It is to be appreciated that in other embodiments, microswitch 314 may be replaced by other means for triggering transceiver circuit 312 to send one or more communications signals when key fob 306 is used to lock or unlock lock 302. For example, in place of microswitch 314 a sensor, actuator, or other triggering component or means may be used, where the sensor, actuator, or other means is configured to sense when key fob 306 has been used to lock or unlock lock 302. The triggering component for triggering transceiver circuit 312 may be disposed at any location of portion 308.

It is to be appreciated that key fob 306 is configured to enable existing mechanical lock and key configurations to be implemented with system 100. For example, the handle portion 308 of key fob 306, including transceiver circuit 312 and microswitch 314, may be configured to receive a key head or handle (e.g., a flat head or any other type of geometry for the head of the mechanical key) of any type of mechanical key, such that the key head is embedded within the handle portion 308 of key fob 306 and the shaft of the mechanical key is the shaft portion 310 of key fob 306. It is to be appreciated that the interior of handle portion 308 may be configured with means to secure the varying geometries (e.g., flat head or any other shape, dimension, or geometry) of any key head or handle portion of a mechanical key. In this way, any mechanical key for any mechanical lock may be adapted as a key fob 306 such that the mechanical lock may be implemented in the automated notification and surveillance system of the present disclosure.

Figure 5D:
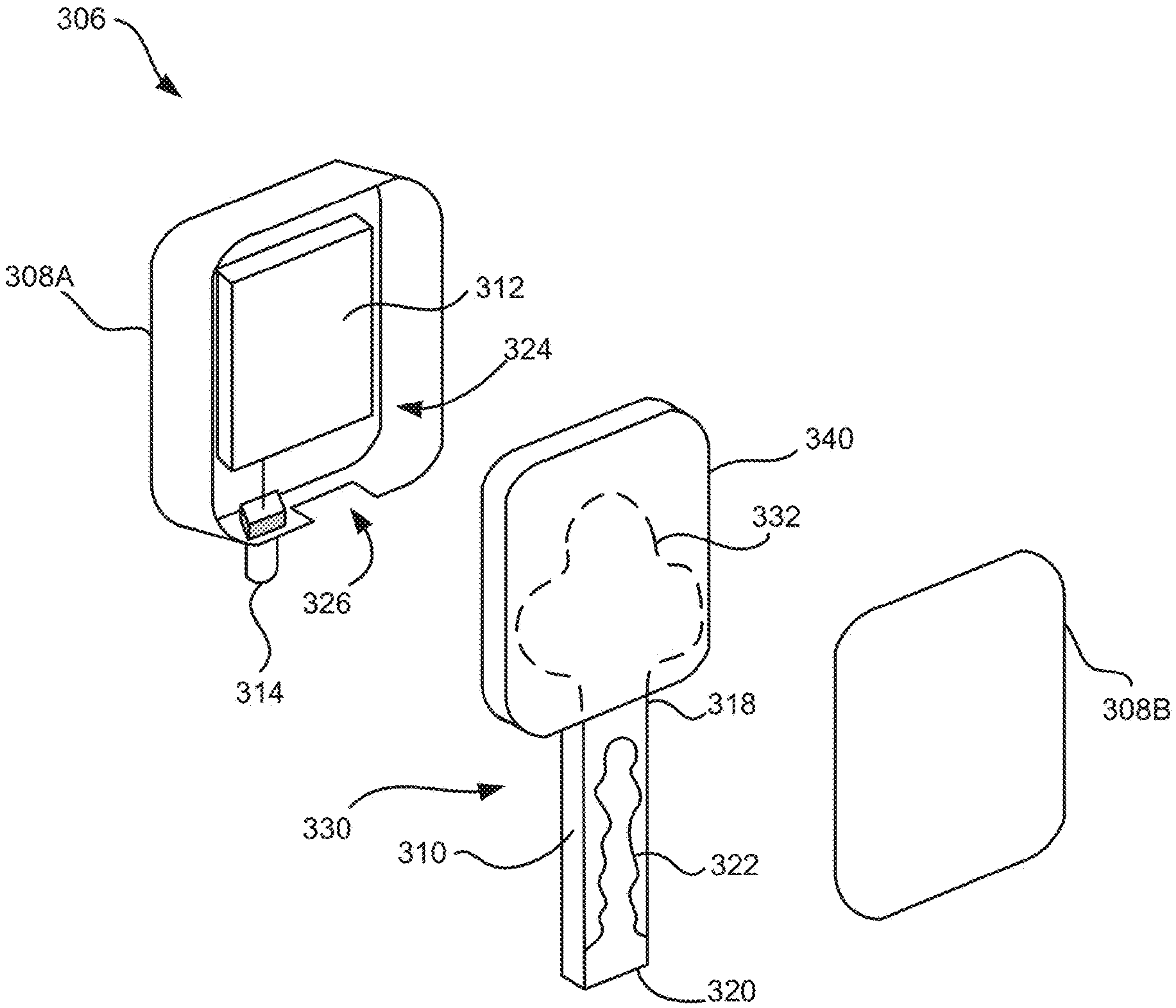

For example, referring to FIG. 5D, an exploded perspective view of key fob 306 is shown in accordance with the present disclosure. As shown in FIG. 5D, handle portion 308 includes a first portion 308A and a second portion 308B. Portion 308A includes an interior 324, where transceiver circuit 312 is shown disposed in interior 324 and coupled to microswitch 314. Portion 308B is configured as a lid. When portion 308B is removed or disconnected from portion 308A, interior 324 is configured to receive the key head 332 of a key 330. As shown in FIG. 5D, portion 308A includes a shaft slot 326 to receive a portion of shaft 310 disposed proximately to end 318 to enable key head 332 to be received by interior 324 and shaft 310 to extend from interior 324 through slot 326. After key head 332 has been received by interior 324, portion 308B is coupled to portion 308A to enclose or embed key head 332 in interior 324.

In one embodiment, key fob 306 may include an adapter 340 configured to receive key head 332, such that key head 332 is embedded in interior 324. Adapter 340 is shaped to securely fit within interior 324 to reduce the movement of key head 332 within interior 324. Adapter 340 is configured to enable key heads with various geometries to be received by interior 324 to be used with key fob 306. In one embodiment, one or more securing members (e.g., brackets) are coupled to the interior 324 for receiving adaptor 340 and securing adaptor 340 to interior 324.

Figure 5E:
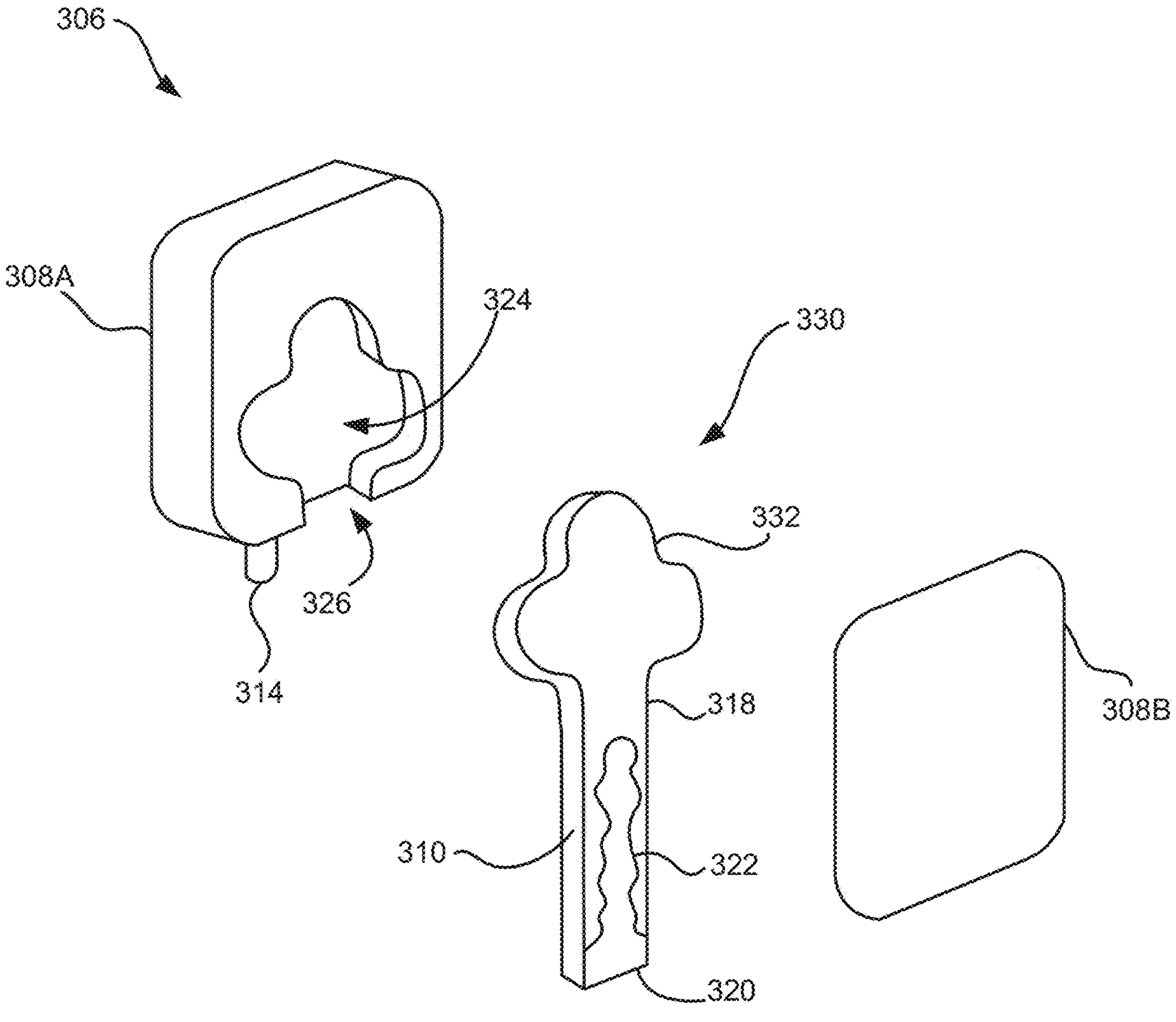

Referring to FIG. 5E, in another embodiment, interior 324 of handle portion 308A may be configured to receive head 332 of key 330 without the usage of an adaptor. In the embodiment shown in FIG. 5E, the interior 324 is configured in a geometrical shape for receiving head 332 of key 330. For example, in one embodiment, interior 324 is configured as a key-head slot having a substantially similar shape to head 332 of lock 330. In this way, head 332 is securely received by interior 324 to retain head 332.

In one embodiment, key fob 306 includes a chip or communication module, such as, but not limited to, an RFID/NFC chip or other communication means, for interacting with antennas 115, 116. In this way, key fob 306 may be used with either the electrical lock 110 shown in FIG. 3A, the hybrid electrical mechanical lock 110 shown in FIG. 3B, and/or the mechanical lock 302 shown in FIG. 4. In one embodiment, handle 308 of key fob 306 may include communication means for sending communication signals to receiver 104 and/or monitoring module 102 when key fob 306 is disposed remotely to the area where any of the locks 110, 112 shown in FIGS. 1, 2, and 3 of the present disclosure are disposed. The communication means may be implemented in transceiver circuit 312 or may be separate from transceiver circuit 312. Furthermore, the communication means is configured for longer range communication than WiFi, NFC, RFID, BLE, or other shorter range communication technologies allow for. For example, the communication means may be configured to use a cellular data network or other longer range network for sending and receiving communication signals. Additionally, the key fob 306 may include a button or other means for activating the communication means. In this way, when a user is at distances where shorter range communication technologies are not possible to use and the key fob 306 cannot be used to open any of the locks of the present disclosure, the button of the key fob 306 may be depressed to send a signal from the communication means to camera 106 (or any other device) and receiver 104 and then to controller 108 to lock or unlock locks 110, 112.

In one embodiment, where key fob 306 is used to open more than one lock 302, an RFID or NFC tag may be mounted to a portion of lock 302, structure 202 (e.g., behind a drawer face or cabinet door), or in another location proximately to lock 302 and/or structure 302, such that the transceiver circuit 312 (or other communication means of key fob 206, such as an RFID chip or reader) interacts with the RFID or NFC tag when the key fob 306 is brought in close proximity to the lock 302. The RFID or NFC tag includes a unique identifier or code associated with the lock 302 that key fob 306 is being used to unlock. When key fob 306 is used to unlock the lock 302 and microswitch 314 is depressed, the unique identifier or code on the RFID or NFC tag is read or interrogated by the transceiver circuit 312 and transmitted in the communication signals sent to receiver 104. In this way, the lock 302 can be uniquely identified by the system 100. The unique identifier is then provided from camera 106 to monitoring module 102, where it is saved along with the time and date the lock was opened, images and or video of the lock 302 captured by camera 106, and any other information gathered by monitoring module 102 with respect to lock 302. In this way, an audit trail for lock 302 is generated and maintained by monitoring module 102 for use by security personnel and other interested parties.

Although RFID and/or NFC tags are described as being used with key fob 306 above, in other embodiments of the present disclosure, other communication means may be employed. For example, referring to FIG. 5F, key fob 306 is shown being used with a structure 202 including a tag 550, where key fob 306 and tag 550 are configured to communicate using RF communication signals with longer range than RFID. It is to be appreciated that any RF communication protocol or other wireless communication means may be used with communication ranges longer than RFID.

Figure 5F:
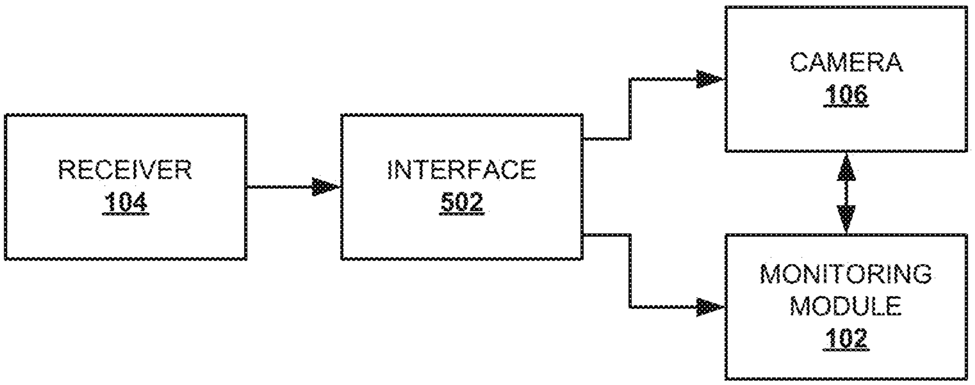
FIGS. 5F and 5G illustrate another embodiment of a key fob in accordance with the present disclosure.
Figure 5F:
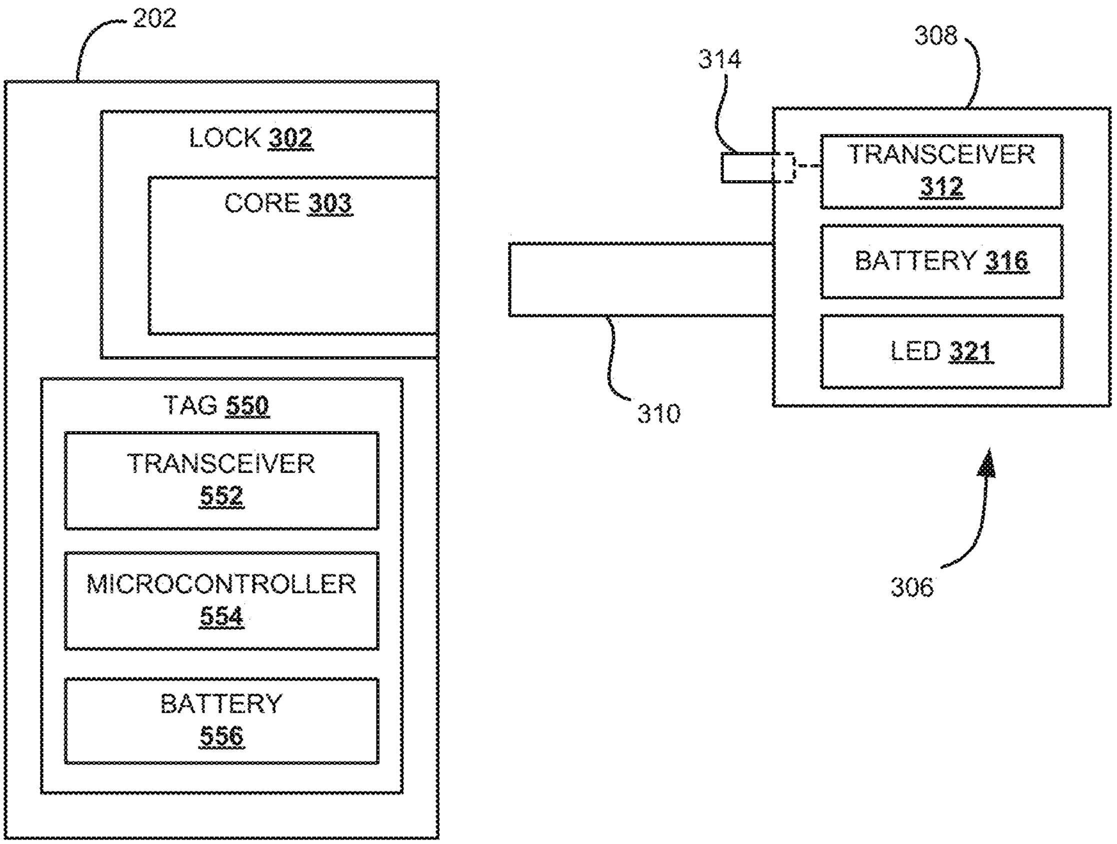

As shown in FIG. 5F, lock 302 and tag 550 may be coupled to a portion of structure 202. For example, lock 302 may be mounted to a door, drawer face, or other means of accessing structure 202. Tag 550 may be mounted behind the means for accessing structure 202 (e.g., behind a drawer face) or, alternatively be disposed in another location of or proximately to structure 202 and/or lock 302.

Tag 550 includes transceiver 552, microcontroller 554, and battery 556. In this embodiment, within handle portion 308 of key fob 306, transceiver 312, battery 316, and LED 321 are included. Transceivers 312 and 552 are each configured for RF communication, however, other communication frequencies are considered to be within the scope of the present disclosure. In one embodiment, transceivers 312, 552 are configured send/receive RF signals at 915 MHz and are each configured with a communication range in excess of 100 feet. In one embodiment, transceivers 312, 552 and the transceiver in receiver 104 are each configured in the same manner (e.g., being equivalent components) to facilitate communication between transceivers 312, 552 and receiver 104.

In one embodiment, batteries 316 and 556 are each configured as rechargeable batteries chargeable via respective charging ports (not shown). In some embodiments, batteries 316, 556 may be configured to be charged wirelessly (e.g., using a wireless charging pad that batteries 316, 556 may be placed in close proximity to). Battery 316 is configured to power transceiver 312 and any other electronic components included in key fob 306. Battery 556 is configured to power transceiver 552, microcontroller 554, and any other electronic components included in tag 550.

Microcontroller 554 is configured to control the operation of transceiver 552 and any other components of tag 550. Furthermore, microcontroller 554 (or a memory coupled to microcontroller 554) is configured to store information related to structure 202, tag 550 and/or lock 302, such as, but not limited to, an ID number associated with lock 302 and the battery level of battery 556.

In use, without receiving any communication signals from transceiver 312, tag 550 is configured to be in a sleep mode where the other components (e.g., transceiver 552, microcontroller 554) of tag 550 draw minimal current from battery 556. When transceiver 552 receives a communication signal from transceiver 312, tag 550 exits sleep mode and is in an active state such that the components of tag 550 draw the requisite amount of current from battery 556 to operate normally. Similarly, when microswitch 314 of key fob 306 is not in a depressed state, transceiver 312 (and any other components of key fob 306) is configured to be in a sleep mode where transceiver 312 draws minimal current from battery 316. When microswitch 314 is in a depressed state, key fob 306 exits sleep mode and is in an active state such that the components of key fob 306 draw the requisite amount of current from battery 316 to operate normally. It is to be appreciated that, in some embodiments, the transmission range of transceiver 312 and/or transceiver 552 may be limited or selected based on the distance between tags 550, such that when a first tag 550 is awakened or activated (i.e., exits sleep mode), other tags 550 in close proximity to the first tag 550 are not awakened or activated by communication signals exchanged between the first tag 550 and key fob 306.

Figure 5G:
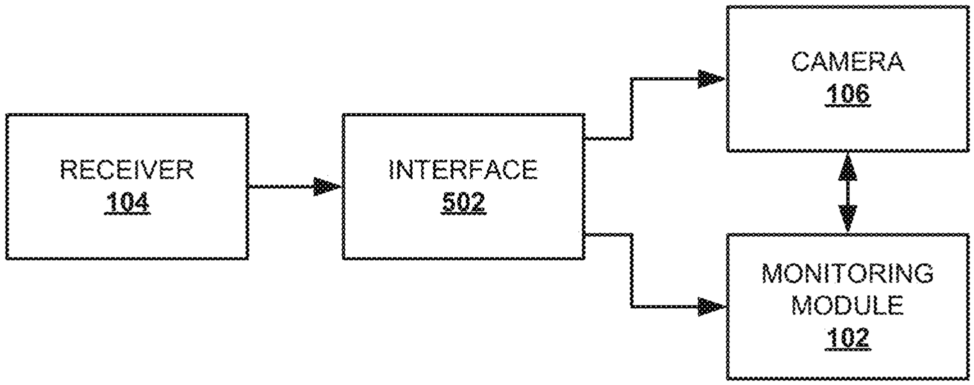
Figure 5G:
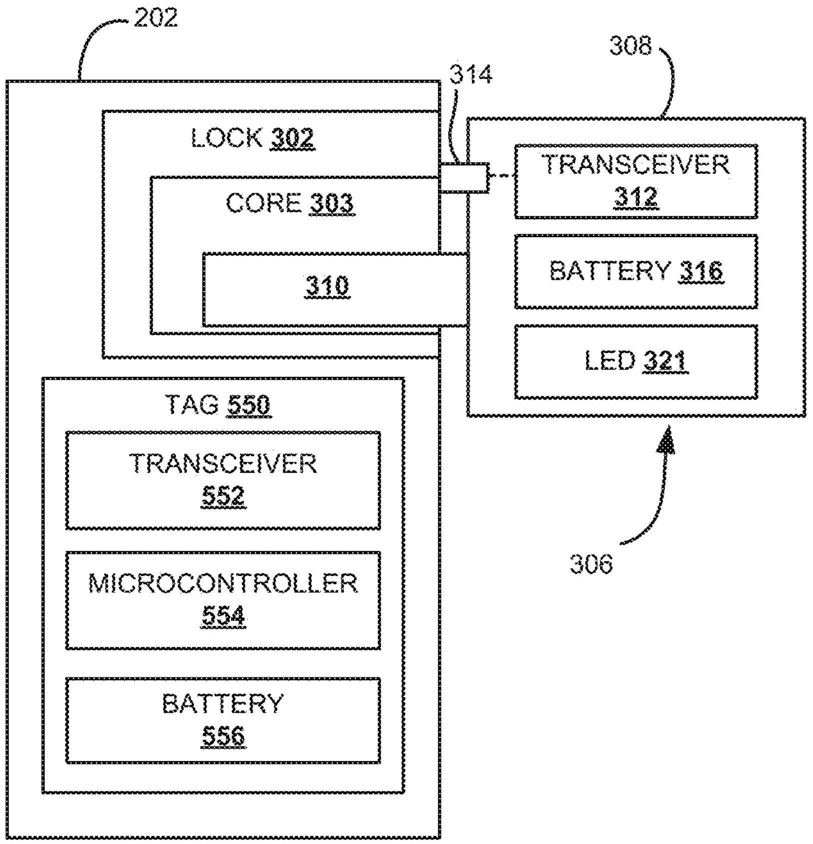

Referring to FIG. 5G, when shaft 310 is inserted through a keyway into core 303 and microswitch 314 is depressed, transceiver 312 is automatically activated and sends a communication signal (e.g., indicative of an event occurring with respect to lock 302) to transceiver 552. Responsive to the signal received from transceiver 312, transceiver 552 is configured to cause tag 550 to wake up or be activated and microcontroller 554 is configured to send, via transceiver 552, information stored in microcontroller 554 or a memory of tag 550. The information may include an ID number associated with tag 550 or lock 302, the state of battery 556 (e.g., in the form of a percentage level), and the status of lock 302 (e.g., locking/closing or unlocking/opening). Responsive to the information received from transceiver 552, transceiver 312 is configured to send the received information along with additional information associated to key fob 306 to receiver 104. The additional information associated with key fob 302 may include an ID number associated with key fob 306 and the state of battery 316 (e.g., in the form of a percentage level). When shaft 310 is removed from the keyway and microswitch 314 is no longer in the depressed state, transceiver 312 sends a second communication signal (e.g., indicative of an event occurring with respect to lock 302) to receiver 104, the second communication signal may include information associated with key fob 302 and/or tag 550.

It is to be appreciated that, with respect to the opening or closing status information of lock 302 communicated to transceiver 312 by transceiver 552, microcontroller 554 is configured to determine the status of lock 302 in a variety of ways. For example, lock 302 may be a first type of lock that is configured to only enable a shaft or blade 310 to be withdrawn from core 303 of lock 302 when lock 302 is in a locked state. Where lock 302 is the first type of lock, when microswitch 314 is depressed and transceiver 552 receives a communication signal from transceiver 312 activating tag 550, microcontroller 554 assumes lock 302 is being opened or unlocked and communicates this status to transceiver 312 via transceiver 552. As described above, this status information is further sent by transceiver 312 to receiver 104. In this scenario, when shaft 310 is removed from core 303 and microswitch 314 is no longer in the depressed state, transceiver 312 is configured to send another communication signal to receiver 104 including status information that lock 302 is/has been locked or closed.

Alternatively, lock 302 may be a second type of lock that is configured to enable shaft 310 to be withdrawn from core 303 when lock 302 is in a locked state or when lock 302 is in an unlocked state. Where lock 302 is the second type of lock, lock 302 may include a sensor configured to determine the state of lock 302. In a first embodiment, the sensor may be in communication with transceiver 552 of tag 550. In the first embodiment, when shaft 310 is inserted into core 303 and microswitch 314 is depressed causing tag 550 to activate, microcontroller 554 queries the sensor via transceiver 552 for the state of lock 302. Responsive to the query, the sensor in lock 302 is configured to provide the state of lock 302 to microcontroller 554 via transceiver 552. The state information is then provided to transceiver 312 along with the other information included in tag 550 described above. When shaft 310 is withdrawn from core 303, transceiver 312 is configured to send microcontroller 554 a communication signal via transceiver 552 to cause microcontroller 554 to query the sensor of lock 302 for the status of lock 302. After microcontroller 554 receives the status information from the sensor, the status information is provided via transceiver 552 to transceiver 312, where it is further provided to receiver 104.

In a second embodiment, the sensor of lock 302 may be in communication with transceiver 312 or another electrical component of key fob 306. In the second embodiment, when shaft 310 is inserted into core 303 and microswitch 314 is depressed, transceiver 312 (or another component of key fob 306) queries the sensor of lock 302 for the state of lock 302. Responsive to the query, the sensor in lock 302 is configured to provide the state of lock 302 to transceiver 312. The state information is then provided to receiver 104 along with the other information described above (e.g., the ID of lock 302, the battery statuses of batteries 556, 316, etc.) When shaft 310 is withdrawn from core 303 and microswitch 314 is no longer being depressed, transceiver 312 queries the sensor of lock 302 again for the status of lock 302. Responsive the query, the sensor of lock 302 is configured to provide the state of lock 302 to transceiver 312, which is further provided to receiver 104.

In any case, receiver 104 receives communications including information associated with lock 302 and key fob 306 (e.g., ID numbers, lock status, and battery statuses) from transceiver 312 both when shaft 310 is inserted into core 303 and microswitch 314 is depressed and when shaft 310 is withdrawn from core 303 and microswitch 314 is no longer being depressed. Receiver 104 includes a processor (not shown) for processing received data and controlling the functions of receiver 104 and a transceiver (not shown) for communicating with transceiver 312 and other devices within communication range. The transceiver 312 may be configured to send/receive signals at 915 MHz with a communication range in excess of 100 feet. In one embodiment receiver 104 may be disposed in or on the ceiling, wall, floor, or other surface of the facility or location that structure 202 is disposed in. The receiver 104 may be powered via a low voltage power supply.

The information received by receiver 104 from transceiver 312 is processed. The information is then extracted by an interface 502, which couples receiver 104 to camera 106 and monitoring module 102. Interface 502 is an input/output device configured to facilitate communication between receiver 104 and camera 106. In one embodiment, interface 502 may be integrated with receiver 104. It is to be appreciated that interface 502 is configured to enable key fob 306 to communicate with an existing camera (or cameras) 106 within a facility via receiver 104, where camera(s) 106 may be analog and/or IP digital cameras. Responsive to receiving the information from transceiver 312, receiver 104 is configured to activate camera 106 to cause camera 106 to record one or more images and/or video of lock 302 (in the manner described above) to capture the locking/unlocking event occurring with respect to lock 302. The information extracted by interface 502 is provided as a string by receiver 104 via interface 502 to camera 106, monitoring module 102 and/or any other relevant or desired entity (e.g., a computing device, such as, a PC, or any other peripheral device, such as, a mobile phone). The string may take the following form [Lock Status]-[Lock ID]-[Tag Battery Level]-[Key Fob ID]-[Key Fob Battery Level]. It is to be appreciated the receiver 104/interface 502 may send any information received from a key fob 306 to another device via a hardwired connection (e.g., a serial port) or alternatively via a wireless connection (e.g., Bluetooth, WiFi, etc.).

It is to be appreciated that, each tag 550 is paired with a specific lock 302, where the pairing is identified by the lock ID stored in tag 550. In this way, in one embodiment, when receiver 104 receives the lock ID in a string from transceiver 312 of key fob 306, receiver 104 is configured to send an activation signal to an appropriate camera 106 (e.g., having a field of view including the lock 302 matching the received lock ID) based on the lock ID received.

The images and/or video recorded by camera 106 are provided to monitoring module 102, which includes a video management system associated with camera 106 for storing data (e.g., images and/or video) received from camera 106 and controlling camera 106. The video management system may include one or more displays. When the images and/or video recorded by camera 106 are provided to the video management system, the images and/or video recorded by camera 106 are displayed on at least one of the displays along with a data and time stamp (e.g., received from receiver 104 or camera module 106).

Monitoring module 102 may further include (e.g., as part of the video management system or otherwise) various software and/or functions for analyzing the information received from key fob 306 and the images and/or video recorded by camera 106. For example, monitoring module 102 is configured to use the information and image/video associated with lock 302 and key fob 306 to create an audit trail of relevant events (e.g., locking and unlocking) associated with locks 302 within system 100. The audit trail includes the images and/or video recorded by camera 106, the information received by receiver 104 associated with lock 302 and key fob 306, and the time, date, and location (e.g., the lock location) of each captured event. Each time an update or addition is made to the audit trail, a notification may be sent via monitoring module 102 to user computing device (e.g., a mobile phone or computer). The notification may be in the form of an email, text message, pop-up alert, or any other type of notification.

Monitoring module 102 may be configured to provide data and trend analytics for use by loss prevention, security personnel, or other relevant entities. The data and trend analytics may be generated based on information provided by key fob 306 and the images and/or video that camera 106 records. It is to be appreciated that in addition to the images and/or video captured by camera 106 of structure 202 and lock 302 responsive to signals from key fob 306, camera 106 also records images and/or video of daily activity within its field of view. This daily activity recorded in addition to other information gathered by monitoring module 102 may be used by monitoring module 102 to generate data and trend analytics including, but is not limited to, heat mapping (e.g., a mapping via infra-red of population densities in a given area indicating where people congregate within the given area), line queuing (e.g., information related to how long checkout or other lines of people are), people counting, and/or path direction (e.g., the directions people travel within an observed area).

Referring again to FIG. 5F, in one embodiment, housing 308 includes an aperture through which an illuminating portion of LED 321 is visible through. LED 321 is configured to illuminate in different colors depending on the functions being performed and/or the state of key fob 306. For example, in one embodiment, LED 321 may be configured to illuminate in a first color when battery 316 is low and needs to be recharged. In another embodiment, LED 321 may be configured to illuminate in a second color to indicate that RF communication signal transmission by transceiver 312 is occurring without errors. In another embodiment, LED 321 may be configured to illuminate in a third color when microswitch 314 is depressed. It is to be appreciated that LED 321 may be configured to illuminate (and/or turn on and off at a predetermined period) to indicate any function or state of key fob 306 in accordance with the present disclosure.

It is to be appreciated that battery 316 is configured to conserve power where possible. In one embodiment, battery 316 is configured to automatically turn off and stop supplying power to the other electrical components of key fob 306 if microswitch 314 has been depressed continuously for a predetermined amount of time (e.g., 3 seconds).

Figure 5H:
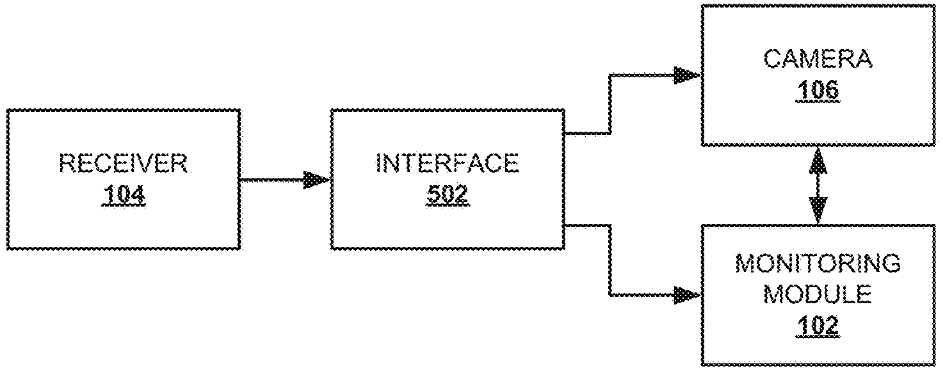
FIG. 5H illustrates another embodiment of a key fob in accordance with the present disclosure.
Figure 5H:
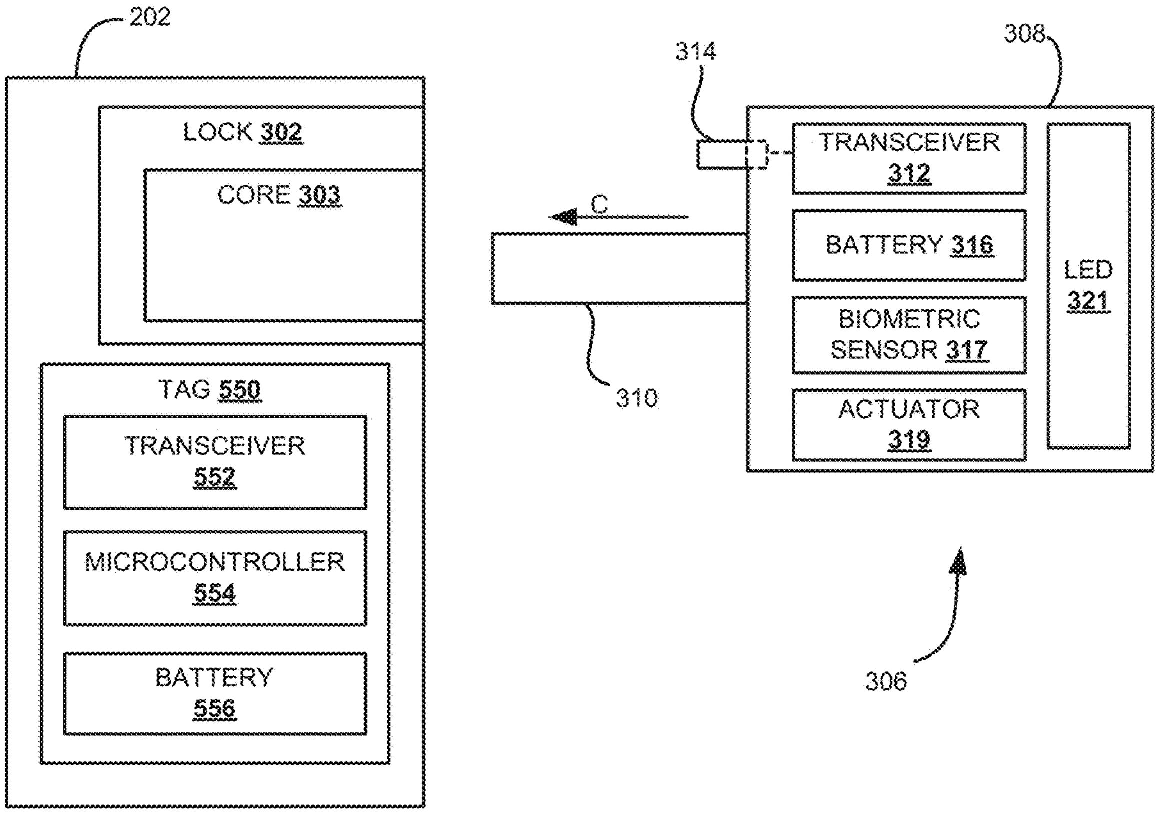

Referring to FIG. 5H, in one embodiment, key fob 306 may further include a biometric sensor 317 and an actuator 319 disposed in housing portion 308.

Biometric sensor 317 is configured to acquire a biometric identifier from a user and compare the acquired biometric identifier to a reference biometric identifier stored in a memory (e.g., of sensor 317 or a separate memory of key fob 306) to determine if a match between the acquired biometric identifier and the reference biometric identifier is present. For example, biometric sensor 317 may be a fingerprint sensor configured to sense if the fingerprint of a user and determine if the fingerprint of the user matches a reference fingerprint stored in memory. It is to be appreciated that biometric sensor 317 may be represent any type of biometric sensor, such as, but not limited to, fingerprint sensors, iris sensors, voice recognition sensors, etc.

Actuator 319 may be any actuation means for extending and retracting shaft 310. Actuator 319 is coupled to shaft 310 and is configured to extend or retract shaft 310 based on if the biometric sensor 317 detects a match between an acquired biometric identifier and the reference biometric identifier. In one embodiment, shaft 310 is initially in a retracted state, where a portion of shaft 310 is retracted into the interior of housing 308. To use key fob 306 to operate (i.e., lock or unlock) a lock 302, a user's biometric identifier is read by biometric sensor 317 and, if a match is detected by sensor 317, shaft 310 is extended by actuator 319 in a direction C away from housing 308 to a normal position. In the normal position, when shaft 310 is inserted into core 303 of lock 302, the bits or key cuts of shaft 310 line up properly with the internal components (e.g., tumblers) of core 303 and lock 302 can be locked or unlocked. Alternatively, if a match is not detected by sensor 317, actuator 319 will not extend shaft 310 to a normal position. In the retracted state, if shaft 310 is inserted into core 303 of lock 302, lock 302 cannot be locked or unlocked because the bits or key cuts of shaft 310 will not line up properly with the internal components of core 303.

In one embodiment, key fob 306 may include more than one biometric sensor 317 for acquiring different biometric identifiers from a user. In this embodiment, actuator 319 may be configured to require a match for each different biometric identifier acquired by each biometric sensor 317 to extend shaft 310 to a normal position.

In another embodiment, key fob 306 may include a means (e.g., a keypad or other means) for receiving a code or pin from the user. In this embodiment, actuator 306 is configured to only extend shaft 310 to a normal position if the correct code or pin is provided to the means for receiving the code or pin.

It is to be appreciated that any authentication component or means (e.g., one or more biometric sensors 317, keypad, or any other authentication means) may be used to authenticate a user such that actuator 319 extends shaft 310 to a normal position to enable a user to operate lock 302.

In the embodiments of key fob 306 described above, transceiver 312 is configured such that, when microswitch 314 is depressed without shaft 310 entering a keyway 304, a panic alert signal including the unique ID number associated with key fob 306 is sent by transceiver 312 to camera 106 via receiver 104 and interface 502. Transceiver 312 is configured to detect the condition that microswitch 314 has been depressed without shaft 310 entering a keyway 304 by determining that no tag (e.g., an RFID tag or tag 550) has been sensed by transceiver 312 or other communication means (e.g., an RFID reader) of key fob 306 after microswitch 314 is depressed. In some embodiments, in addition to requiring the condition that microswitch 314 has been depressed without shaft 310 entering a keyway 304, transceiver 312 may require further conditions to be triggered before sending a panic alert signal. For example, transceiver 312 may further require that microswitch 314 is depressed or in a triggered state for a predetermined amount of time (e.g., 5 consecutive seconds) and/or that microswitch 314 has been depressed or triggered in predetermined sequence (e.g., 3 times consecutively) to send a panic alert signal. The panic alert signal may be provided by camera 106 or interface 502 to monitoring module 102 or any other relevant entity to alert the entity of a panic condition within a monitored facility or area implementing the system of the present disclosure.

It is to be appreciated that in any of the embodiments described above, key fob 306 may include a microcontroller or processor for controlling each of the components of key fob 306. In embodiment, transceiver circuit 312 may be integrated with the microcontroller.

In any of the embodiments of key fob 306 described above, key fob 306 may include a tamper detection means (e.g., a sensor) configured to detect if key 330 is removed from key fob 306. For example, the tamper detection means may be a proximity sensor or switch that detects if a portion of key 330 is contained within housing or handle portion 308 of key fob 306. If a portion of key 330 is not contained within housing or handle 308, the tamper detection means triggers transceiver 312 or a separate communication module of key fob 306 to send a communication signal to at least one other device (e.g., loss prevention) indicative of the removal of key 330 from key fob 306. In this way, loss prevention may change the key required to open a lock for which the key from key fob 306 has been removed from to prevent unauthorized individuals from using the removed key to operate an associated lock 302.

Figure 5I:
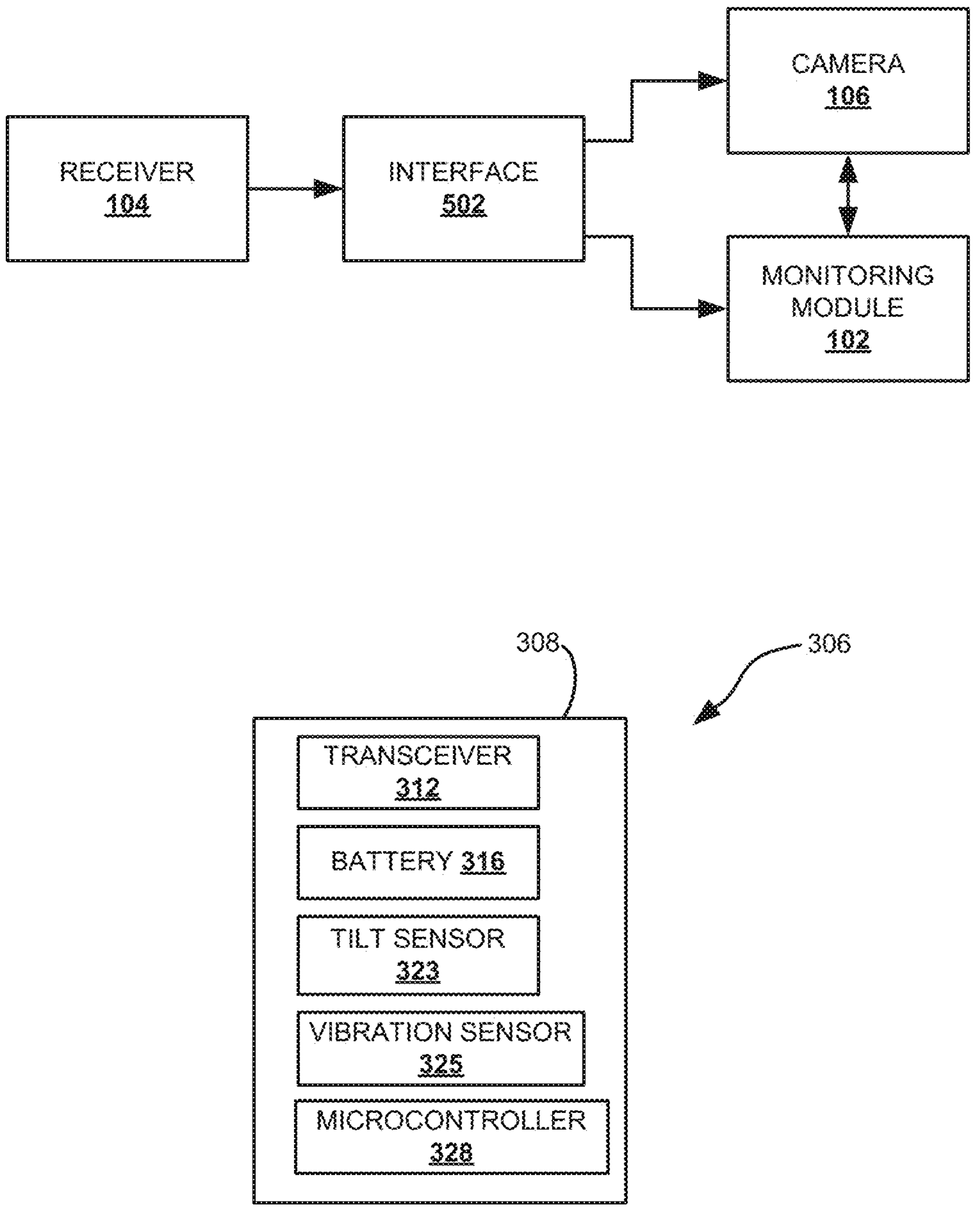
FIG. 5I illustrates a non-bitted key fob in accordance with an embodiment of the present disclosure.

In one embodiment, key fob 306 may be modified for use with non-bitted applications. For example, referring to FIG. 5I, another embodiment including a key-less or non-bitted implementation of key fob 306 is shown in accordance with the present disclosure. In this embodiment, key fob 306 does not include a bitted key. Instead, key fob 306 includes a tilt sensor 323, a vibration sensor 325, and a microcontroller 328. Tilt sensor 323 is configured to sense when housing 308 has been titled and vibration sensor 325 is configured to sense when housing 308 has experienced vibration. Microcontroller 328 is configured to control the electrical components of key fob 306.

Key fob 306 may be coupled to or integrated into a security system in a plurality of ways. For example, housing 308 may be coupled to items enclosed within showcases or display cases (e.g., made of glass), doors or entry means to a location, casino chip trays, and/or any other object or structure of interest. Housing 308 may be coupled to a surface an object of interest is disposed on. Housing 308 may be integrated with an existing access or security element of a system, such as a keypad for providing access to a door or secured structure.

Microcontroller 328 is configured to cause transceiver 312 to send a communication signal to receiver 104 if tilt sensor 323 senses a tilt of housing 308 or vibration sensor 325 senses a vibration of housing 308. The communication signal may include information associated with key fob 306 (e.g., the unique ID number of key fob 306, battery level of battery 316, the sensed data by sensors 323, 325, and/any other relevant information). This communication signal is provided to camera 106 and monitoring module 102 via interface 502. Responsive the signal received, camera 106 is configured to record one or more images and/or video of the location that key fob 306 is disposed in. Furthermore, monitoring module 102 is configured to perform any of the functions described above (e.g., maintain an audit trail, perform analytics, etc.). In one embodiment, monitoring module 102 sends a notification to another device or system (e.g., a mobile device, loss prevention, access control, a monitor coupled to camera 106, etc.) including the information obtained by the sensors 323, 325, the ID number of key fob 306, and any other relevant information associated to key fob 306 and/or the structure or object key fob 306 is coupled to or used with (e.g., the location of the structure or object, images and/or video of the structure or object, the time and date the tilt and/or vibration was sensed, etc.)

It is to be appreciated that any type of lock capable of sending communication signals to receiver 104 may be integrated into the automated surveillance and notification system of the present disclosure.

Figure 8:
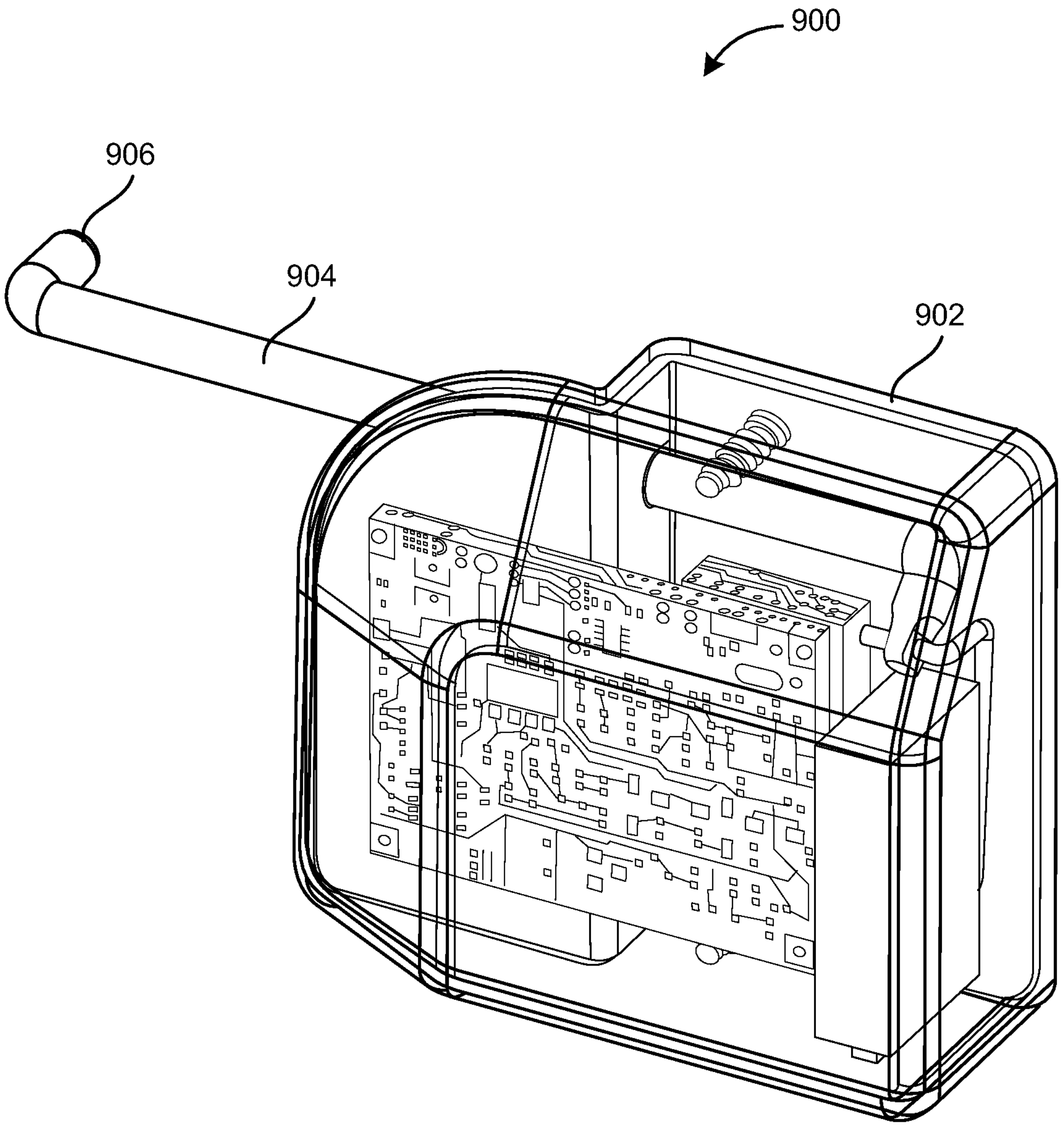
FIG. 8 is a perspective view of an electronic locking device for by-pass doors in accordance with an embodiment of the present disclosure.

For example, referring to FIG. 8, an electronic lock 900, e.g., a ratchet lock, for use with by-pass doors is shown in accordance with the present disclosure. By-pass doors are doors having two (or more) panels (e.g., made of glass, wood, metal, etc.) configured to slide past each other. Lock 900 includes a housing 902 and a rod or extension member 904, which extends from housing 902. Rod 904 includes a bent end 906, which is configured to bend at a predetermined angle relative to rod 904. Disposed in housing 902, lock 900 further includes a microcontroller, a transceiver, and a motor. A portion of rod 904 is disposed in housing 902 and coupled to the motor. The motor is controllable by the microcontroller to rotate the rod 904 and thus rotate the bent end 906. In the manner described above, the transceiver is configured to detect an RFID card, RFID key fob, or any other suitable communication device disposed proximately to housing 902 and interrogate the communication device. If the communication device is authorized (e.g., has authorized credentials), the microcontroller rotates the rod 904 to a locked or unlocked state (described below). The transceiver of lock 900 is configured to communicate and exchange information with receiver 104 and/or RFID card, key fobs, etc., in the manner described above with respect to locks 110, 112, 302.

In use, housing 902 is mounted to a first panel of by-pass doors such that bent end 906 extends past the first panel and interacts with a second panel of the by-pass doors to secure the by-pass doors in a locked position (i.e., where the sliding panels cannot slide with respect to each other and the by-pass doors remain in a closed position). When a proper card or key is detected by the transceiver of lock 900, the microcontroller causes the motor to rotate rode 904 such that bent end 906 disengages the second panel to achieve an unlocked position. In the unlocked position, the first and second panels freely rotate/slide with respect to each other to enable the by-pass doors to be opened. It is to be appreciated that, when lock 900 is locked or unlocked, the transceiver in lock 900 sends a communication signal to receiver 104 to cause camera 106 to record one or more images of lock 900 and the area proximate to lock 900. Additionally, the transceiver may send any of the information described above to receiver 104 (e.g., lock ID, lock battery level, lock status, etc.) to create an audit trail. In one embodiment, for any of the locks described above, when a key fob or card is used to operate the lock, the transceiver in the lock may query receiver 104, which may further query an access control system of the facility to determine if the ID associated with the key fob or card is authorized. The response to the query by the access control system is provided to the lock. If the key fob or ID is authorized (as determined by the response from the access control system), the microcontroller (or in some cases, the combined microcontroller/transceiver) of the lock will enable the key fob or card to operate the lock (e.g., lock or unlock the lock). If the key fob or ID is not authorized, the microcontroller of the lock will not enable the key fob or card to operate the lock.

It is to be appreciated that although the above embodiment has been described in conjunction with a ratchet lock, the principles and techniques may be applied to various type of locks, for example, mechanical, electro-mechanical, etc.

Figure 9A:
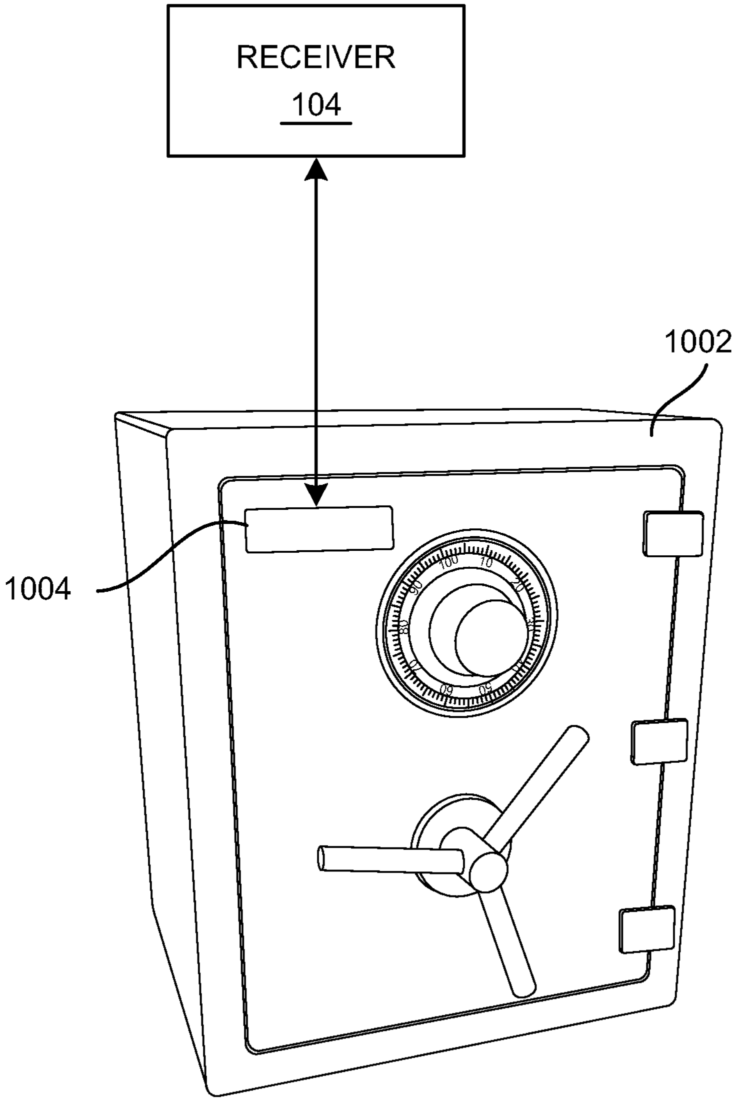
FIG. 9A illustrates a facial recognition module coupled to a structure in accordance with an embodiment of the present disclosure.

In another embodiment of the present disclosure, a facial recognition module or device may be mounted to any structure (e.g., a safe, a door, etc.) that may be opened and used to keep an audit trail of which persons attempt to gain access to the structure. For example, referring to FIG. 9A, a facial recognition module or device 1004 is shown mounted to a structure (e.g., a safe) 1002 in accordance with the present disclosure. Module 1004 includes at least one image capturing device (e.g., a camera), a processor or microcontroller, and a transceiver. The image capturing device of module 1004 is configured to capture an image of the face of any user who attempts to open the safe 1002. It is to be appreciated that the image capturing device is controlled by the processor or microcontroller and may be triggered to capture an image of persons attempting to open safe 1002 by a sensor or other means of detecting when the safe 1002 is being opened. The image of the face of the person attempting to open safe 1002 and any other relevant information (e.g., an ID associated with the safe or structure 1002, the battery level of module 1004, etc.) is then sent by the transceiver of module 1004 to receiver 104. Receiver 104 may then send the image and any accompanying information to a monitoring system or module (e.g., monitoring module 102 located in the facility where the structure 1002 is disposed or located remotely and accessible via cloud communication). Receiver 104 may also trigger one or more cameras 106 disposed in the facility where safe 1002 is located to capture one or more images of the safe 1002.

For each image of a face of a person attempting to open safe 1002 that the monitoring system receives, the monitoring system will perform facial recognition analysis (e.g., via suitable facial recognition software) to determine if the face of the person in the image is a face associated with a person of a known identity (e.g., where the face and identify are stored in a database accessible by the monitoring system). If the face and identify of the person are known to the monitoring system, the monitoring system stores the identity of the person, the data/time the safe 1002 was opened, the ID of the safe 1002, and any other relevant information in a database to create an audit trail. If the recognized person is not a user authorized to access the safe 1002, the monitoring system may send an alert to a relevant entity and/or trigger an alarm condition within the facility. Alternatively, if the facial recognition analysis of the face in image received by the monitoring system determines that the face is not recognized, the monitoring system saves the face in a database of the monitoring system so that the face may be recognized in future attempts to open the safe 1002. Furthermore, the monitoring system alerts security personnel that the identity of the person must be obtained to be added to the monitoring system and paired with the image of the face of the person.

It is to be appreciated that, in one embodiment, the image capture module, e.g., module 1004 may not include an image capture device, but instead, may use the camera of an existing surveillance system where the structure 1002 is disposed in to capture images of the face of persons attempting to open structure 1002. In this embodiment, the module 1004 may include a sensor that activates a camera in close proximity to the structure 1002. The sensor may include, but is not limited to, a keypad associated with the structure, a dial sensor that determines, for example, when a dial of a safe is in use, a vibration sensor, a sound sensor, a motion sensor, a key activated sensor, a light switch, etc. Upon the module 1004 being activated by the sensor, a signal is transmitted to receiver 104 which then activates an associated camera. It is further to be appreciated that an associated sensor in module 1004 may activate the image capture device when such an image capture device is disposed in the module 1004, as described above.

Figure 13A:
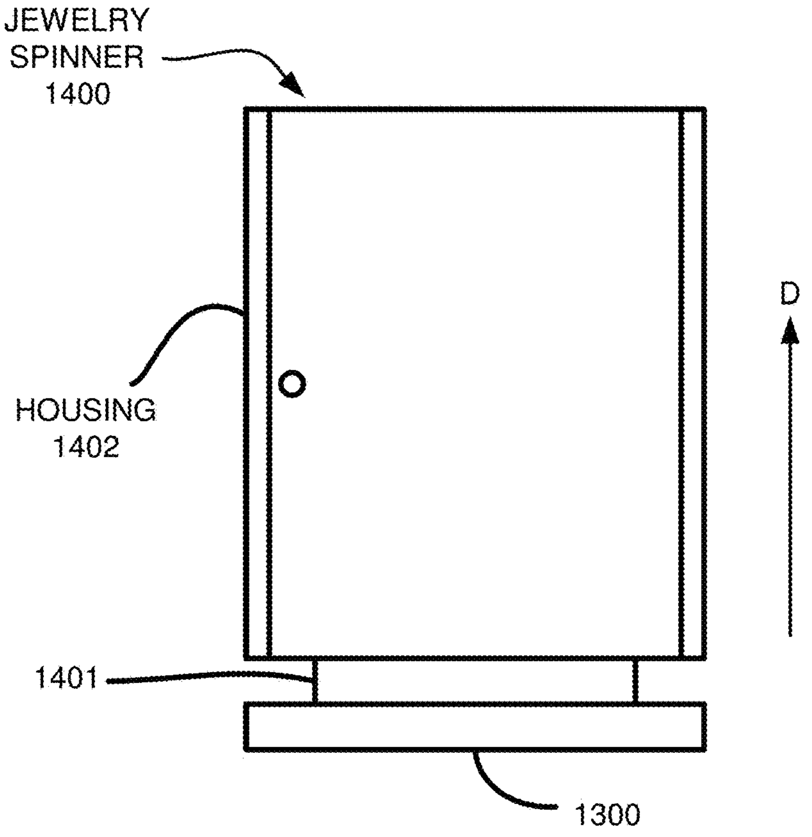
FIG. 13A is a jewelry spinner being used with weight sensing device in accordance with an embodiment of the present disclosure.
Figure 13A:
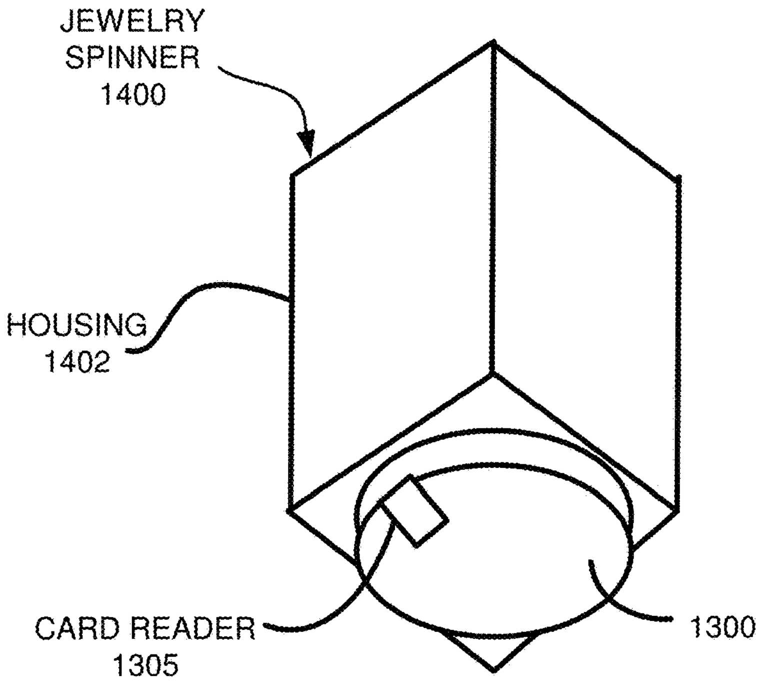

In one embodiment of the present disclosure, system 100 may be configured for use with a weight sensing device 1300 as shown in FIG. 13A. In one embodiment, shown in FIG. 13B, device 1300 includes shoe 1301, arm 1308, switch 1302, electronics 1320, housing 1315, and surface 1350. As will be described below, device 1300 is configured to trigger an alarm when a predetermined amount of weight is placed on or taken off of device 1300.

Figure 13B:
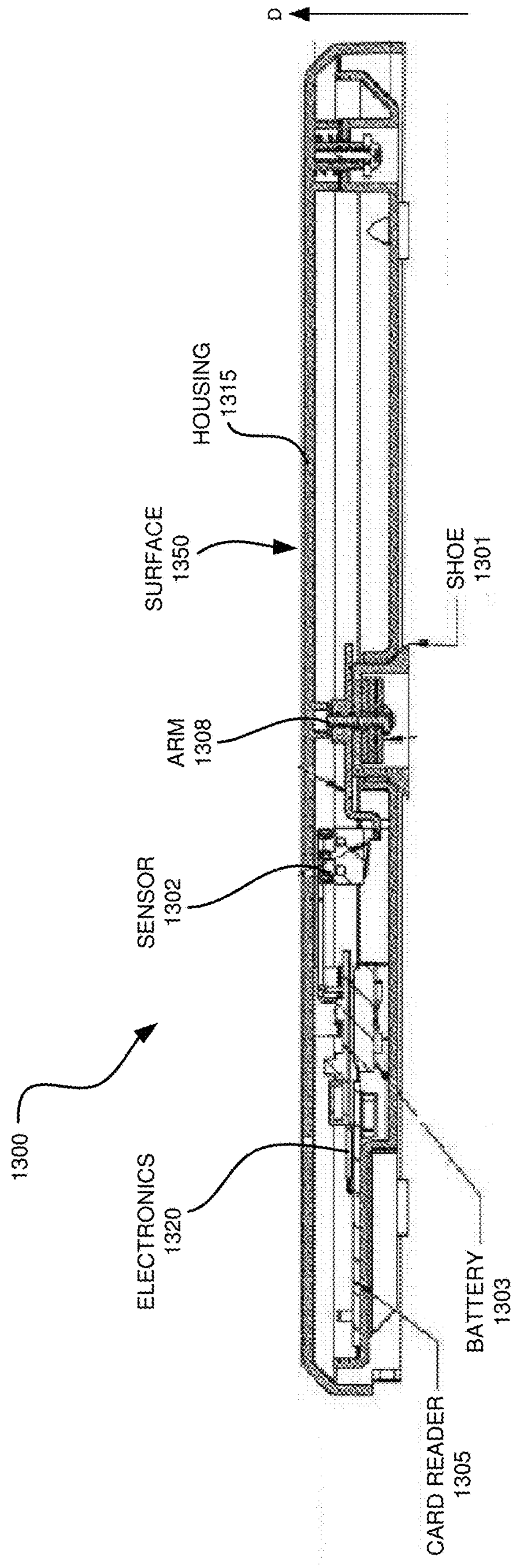
FIG. 13B is a profile of a weight sensing device in accordance with an embodiment of the present disclosure.
Figure 13C:
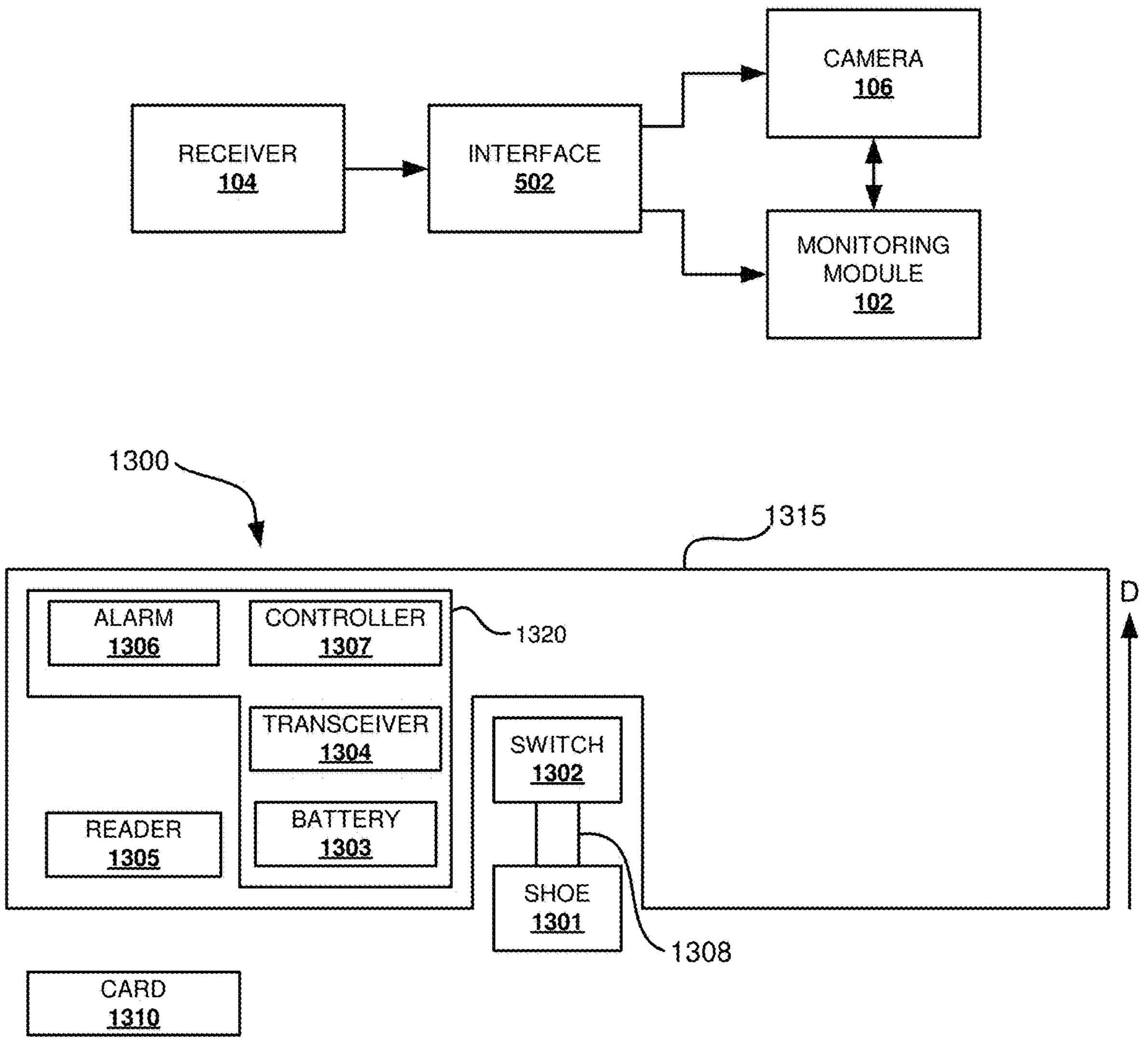
FIG. 13C is a block diagram of a weight sensing device in accordance with an embodiment of the present disclosure.
Figure 13D:
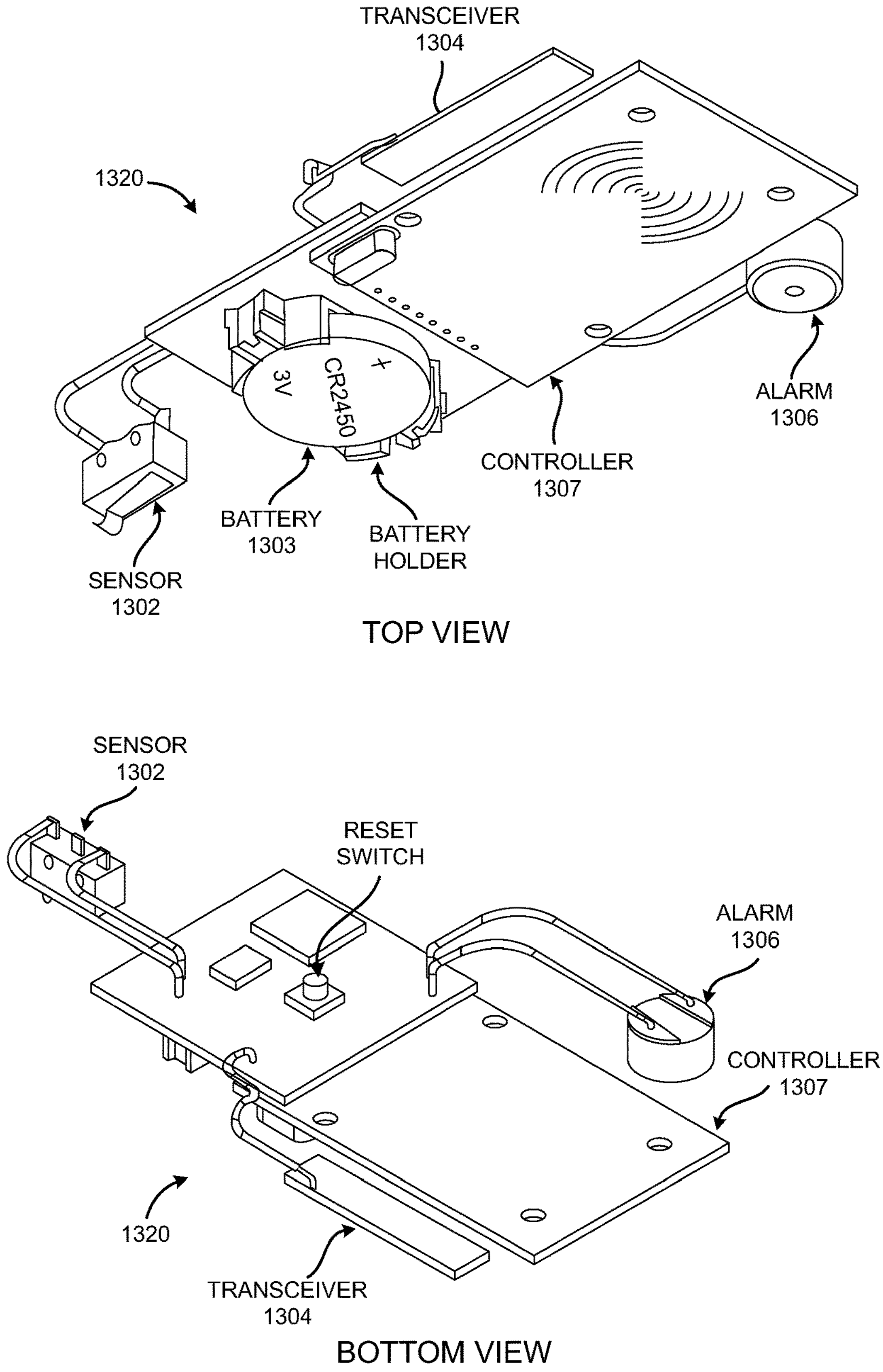
FIG. 13D is a perspective view of electronics for a weight sensing device in accordance with an embodiment of the present disclosure.
Figure 13E:
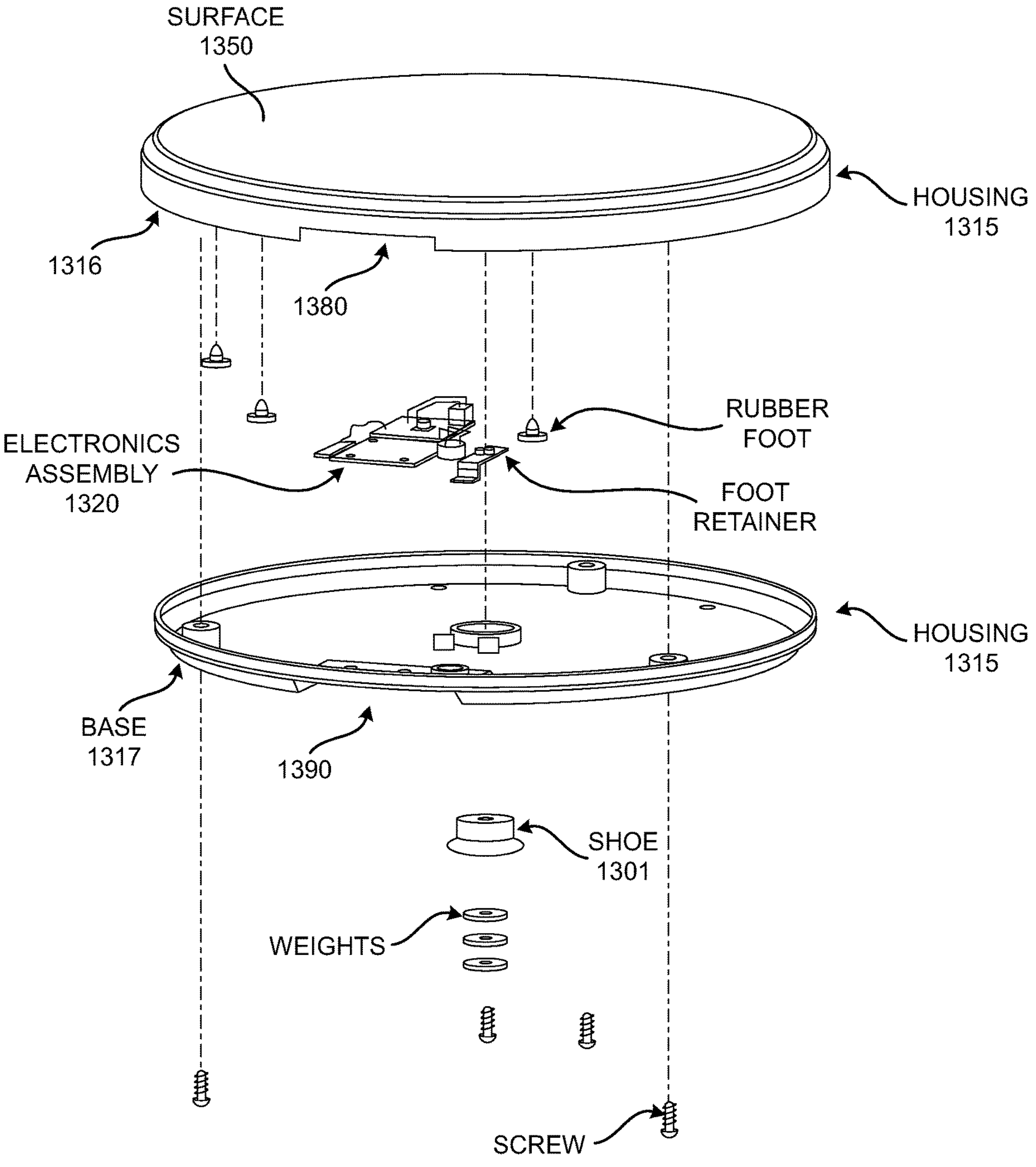
FIG. 13E is an exploded view of a weight sensing device in accordance with an embodiment of the present disclosure.

In one embodiment, as shown in FIG. 13E, housing 1315 is configured to have a top portion 1316 and a bottom portion 1317. In this embodiment, as shown in FIG. 13B, top portion 1316 and bottom portion 1317 are configured to be shaped substantially as a disc when coupled together. Top portion 1316 includes substantially flat surface 1350 configured such that weight may be placed upon surface 1350.

In one embodiment, as shown in FIG. 13C, electronics 1320 includes a battery 1303, alarm 1306, controller 1307, and transceiver 1304. In this embodiment, battery 1303 is configured to power controller 1307, alarm 1306, and any other electronic components included in device 1300. Controller 1307 is configured to control the operation of transceiver 1304, alarm 1306, and any other electronic components of device 1300. Alarm 1306 is configured to create a sound when activated. Transceiver 1304 is configured to send and/or receive one or more signals via any communication means described above (e.g., Bluetooth, BLE, Wi-Fi, ZigBee, Z-wave, etc.).

In one embodiment, arm 1308 triggers switch 1302 when weight is lifted off of surface 1350 of device 1300. In response, switch 1302 sends one or more signals to controller 1307. When one or more signals notifying controller 1307 of the change in weight are received by controller 1307, controller 1307 is configured to activate alarm 1306. In this way, if weight is lifted off of device 1300, the alarm sound notifies nearby personnel. In another embodiment, controller 1307 continuously monitors the status of switch 1302. When controller 1307 detects that switch 1302 has been triggered, controller 1307 is configured to activate alarm.

In one embodiment, shoe 1301 is configured to be attached to housing 1315. In this embodiment, shoe 1301 is configured to move relative to housing 1315 when housing 1315 is displaced in direction D. Housing 1315 is displaced in direction D when weight is either placed on or taken off of surface 1350 of device 1300. When shoe 1301 moves relative to housing 1315, shoe 1301 displaces arm 1308. When arm 1308 is displaced, arm 1308 triggers switch 1302. It is to be appreciated that although device 1300 is described as having shoe 1301, arm 1308, and switch 1302, electronics 1320 may be integrated into any other type of analog or digital weight sensing component (e.g., strain gauge, piezoelectric sensor, etc.) without deviating from the present disclosure.

In one embodiment, shoe 1301 is weighted so shoe 1301 is in contact with the surface device 1300 is placed on. In this embodiment shoe 1301 is shaped so flat objects (e.g., screwdriver) cannot be inserted between shoe 1301 and the surface device 1300 is placed on. If a flat object is inserted between shoe 1301 and the surface, shoe 1301 is prevented from moving relative to housing 1315. Preventing shoe 1301 from moving relative to housing 1315 would allow a user to remove weight from surface 1350 without triggering the alarm 1306.

In one embodiment, controller 1307 can be calibrated for different weights. Controller 1307 may be calibrated for either a different starting weight, a weight threshold, or both. The weight threshold is the amount of weight removed before controller 1307 triggers alarm 1306. Both the weight threshold and the starting weight are stored in a memory or other information storage. In one embodiment, when weight is placed on surface 1350, controller 1307 compares that weight to the starting weight and weight threshold stored in the memory. Controller 1307 does not trigger the alarm until the weight on surface 1350 is outside of the threshold. It is to be appreciated that this process can also be done in switch 1302 or any other component of electronics 1320 without deviating from the present disclosure.

In one embodiment, as shown in FIG. 13C, device 1300 includes reader 1305. Reader 1305 is configured to communicate with card 1310. Card 1310 may be configured as an RFID or NFC tag. In this embodiment, controller 1307 is calibrated for a different starting weight when weight is placed on surface 1350. When weight is placed on device 1300, alarm 1306 is triggered in the same manner as when weight is removed, unless card 1310 is inserted in or placed proximately to reader 1305 within a predetermined amount of time (e.g. 30 seconds). If card 1310 is inserted in or placed proximately to reader 1305, reader 1305 is activated and controller 1307 arms device 1300. When device 1300 is armed, device 1300 is in a sleep mode where all of electronics 1320 are configured to draw minimal current from battery 1303 until shoe 1301 causes arm 1308 to trigger switch 1302. In this embodiment, device 1300 is disarmed when card 1310 is inserted in or placed proximately to reader 1305 when device 1300 is armed. In disarmed state, controller 107 does not trigger alarm 1306 when weight changes are sensed. Disarming device 1300 allows weight to be removed from device 1300 without triggering the alarm so the weight and device 1300 can be moved separately or stored. It is to be appreciated that although in the embodiment above, it is described that reader 1305 and card 1310 are configured to communicate through RFID or NFC, reader 105 and card 1310 may be configured for communicating via any of the communication protocols described above (e.g., Bluetooth, BLE, etc.) It is to be further appreciated that card 1310 and reader 1305 may be any means, electronic or mechanical, for the purpose of arming/disarming device 1300 or authenticating a user (e.g., mechanical key, key fob, keypad biometric sensor, etc.).

In one embodiment, as shown in FIG. 13E, reader 1305 is configured to be accessed in the bottom portion 1317 of housing 1315 through cutout 1390 to hide reader 1305 from a potential thief. Top portion 1316 of housing 1315 includes a cutout 1380 so a user still has access to reader 1305 when the top portion 1316 and bottom portion 1317 of housing 1315 are attached to each other. Cutout 1380 is configured so that when a housing 1315 has a weight placed on its reader 1305 can still be accessed.

It is to be appreciated that device 1300 may be configured to communicate with receiver 104 allowing device 1300 to be integrated into the automated surveillance and notification system of the present disclosure. For example, referring to FIG. 13C, electronics 1320 of device 1300 includes transceiver 1304 configured to transmit information (e.g., the ID of device 1300) through one or more communication signals to receiver 104. When switch 1302 is triggered, controller 1307 causes transceiver 1304 to transmit a communication signal by any communication means (e.g. Wi-Fi, Bluetooth, BLE or any other communication means described above or below) to receiver 104. In this way, in one embodiment, when receiver 104 receives the ID of device 1300, receiver 104 is configured to interact with interface 502 to cause camera 106 to record one or more images or video, as described above.

In one embodiment, device 1300 is configured for use with a jewelry spinner 1400 shown in FIG. 13A. Jewelry spinner 1400 is configured to display jewelry (e.g., earrings) hanging from display hooks on one or more sides of a housing 1402. Base 1401 and housing 1402 are configured to rotate relative to each other. When base 1401 is placed on a surface (e.g. a countertop) a user can rotate housing 1402 and see all sides of housing 1402 or otherwise disposed in housing 1402. In this embodiment, housing 1315 of device 1300 is approximately the same shape as base 1401 so that housing 1315 does not interfere with the rotation of housing 1402.

It is to be appreciated that jewelry spinner 1400 may employ other sensing means or methods in lieu of weight sensing. For example, various other sensors may be coupled to switch 1302 to trigger or activate an alarm. The sensors may include, but are not limited to, sensing pads that sense when an object to placed thereon or removed, a vibration sensor, a tilt sensor, a light sensor, etc.

Figure 9B:
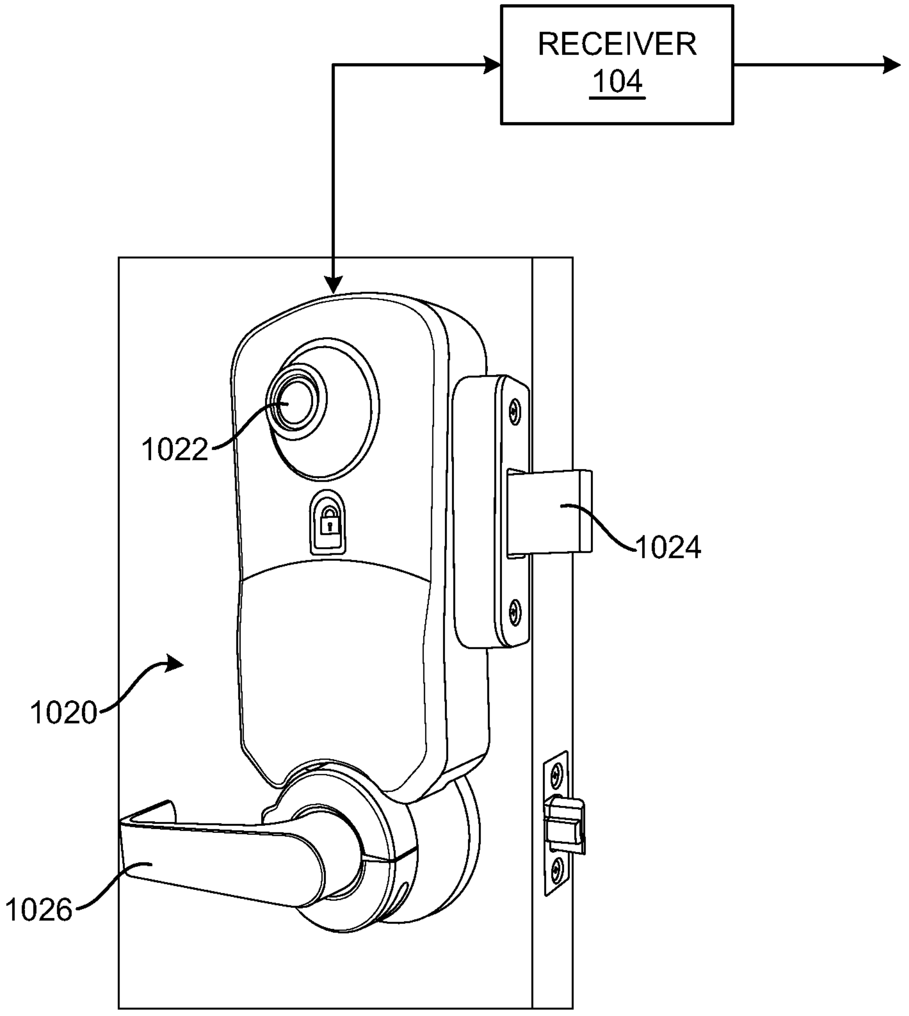
FIG. 9B illustrates a locking device coupled to a receiver in accordance with an embodiment of the present disclosure.

Referring to FIG. 9B, another embodiment of the system of the present disclosure is shown. In the embodiment of FIG. 9B, receiver 104 may be in communication with a locking device 1020 that is used in lock down situations (e.g., when a serious threat is currently underway, such as an active shooter on premises). Lock 1020 may be mounted to a door or other structure and includes a button 1022 and an actuating or engaging member (e.g., a deadbolt) 1024. In one embodiment, member 1024 engages a receptacle (e.g., a door frame receptacle) of the structure lock 1020 is mounted to. Lock 1020 includes a button 1022 that, when pressed, causes (e.g., via a motor or actuator) member 1024 to engage the structure lock 1020 is mounted to. For example, where the structure is a door, by pressing button 1022, member 1024 is caused to extend into and engage the receptacle of a door frame to secure the door in a locked position without requiring the use of a key.

In one embodiment, lock 1020 includes a communication device (e.g., configured in a similar manner to any of the communication devices, transmitters, and/or transceivers described above). Lock 1020 may also include a processor or microcontroller configured to control the communication device. In either case, lock 1020 is configured such that, when button 1022 is pressed, member 1024 engages the structure lock 1020 is mounted to and the communication device sends at least one communication wirelessly to receiver 104 (e.g., using any of the transmission mediums described above). The communication signal may include the room identification number (e.g., stored in a memory of lock 1020) or other relevant information (e.g., the battery level of the battery in lock 1020) to receiver 104. Receiver 104 is then configured to send the room I.D. and any other relevant data to at least one other device (e.g., monitoring module 102, or any other device in communication with receiver 104). The communication signal sent by receiver 104 may identify the area that lock 1020 is disposed in using the room I.D. The communication signal may be sent by receiver 104 directly to first responders to decrease the response time to any event occurring. In one embodiment, when the communication signal received from receiver 104 includes an indication that the battery level of lock 1020 is below a predetermined threshold (e.g., 50%), receiver 104 sends an alert or notification to a device associated with a maintenance entity to charge or service the lock 1020. In one embodiment, when lock 1020 is in a locked state, lock 1020 is configured to be unlocked by turning the lever 1026 coupled to the lock 1020.

In one embodiment, the processor and/or communication device in lock 1020 is configured with a predetermined time delay, where lock 1020 does not send the communication signal to receiver 104 when button 1022 is pressed unless the button 1022 is pressed for a predetermined period of time. This feature may be useful to prevent accidental alert notifications.

In one embodiment, receiver 104, responsive to receiving a communication from lock 1020 when button 1022 has been pressed, is configured to send a pre-recorded audio message and/or text message to at least one device (e.g., to a communication system of a police station, a school official, or any other entity) either in the facility lock 1020 is located in or outside the facility lock 1020 is located in. The text message sent by receiver 104 may be a text to a 2-way radio, phone or other communication device including the room I.D. that lock 1020 is disposed in and/or any other relevant information (time of day, etc.) The message sent by receiver 104 may include a pre-recorded audio, such as, a public address announcement that can be played by the audio system of the facility that lock 1020 is disposed in.

In one embodiment, when receiver 104 receives a communication signal from lock 1020, receiver 104 is configured to output a signal to one or more cameras (as described above) or to a surveillance system coupled to the cameras that have line of sight (or via swiveling can have line of sight) to the area surrounding lock 1020 to trigger the cameras to capture any event (e.g., a shooting or other event) occurring. In this embodiment, receiver 104 may send or cause to be sent (e.g., in a notification or other type of message) any images and/or video captured by the cameras triggered by receiver 104 to at least one other device (e.g., belonging to police, security personal etc.)

Figure 9C:
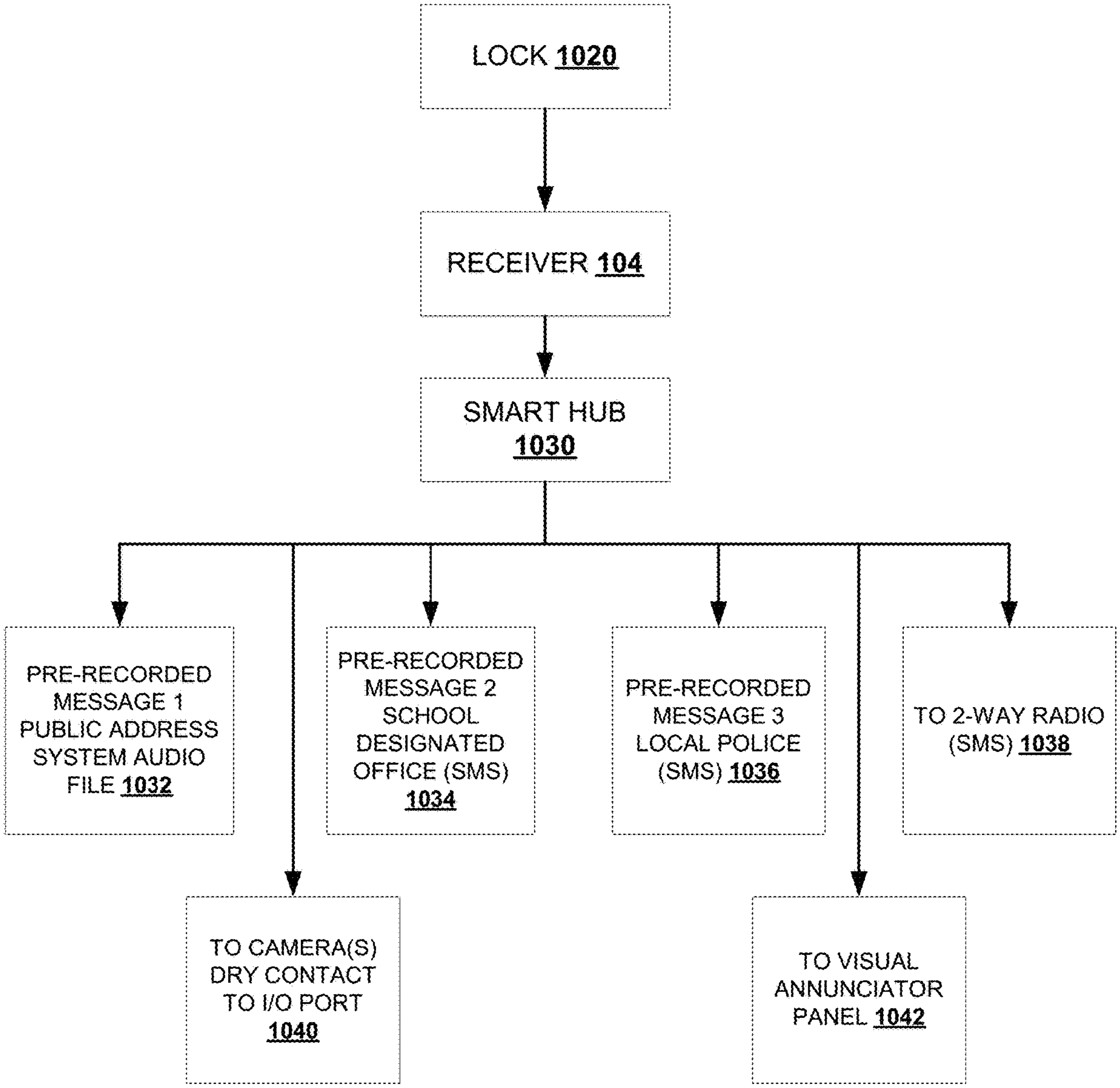
FIG. 9C is a block diagram of a system in accordance with an embodiment of the present disclosure.

It is to be appreciated that receiver 104 may be configured to send any type of communication to any type of device responsive to receiving a communication signal from lock 1020. In one embodiment, receiver 104 may send a communication signal to a smart hub in communication with various types of devices and the smart hub may then provide the communication signal to other devices or systems. For example, referring to FIG. 9C, lock 1020 may send a communication signal to receiver 104 when button 1022 is pressed. As described above the communication signal may include a room I.D. or other relevant data. Receiver 104 sends the communication signal to a smart hub 1030, and depending on the data in the signal (e.g., which room or part of the facility lock 1020 is disposed in, type of facility, etc.), smart hub 1030 distributes the signal to a predetermined device, system, or entity. As shown in FIG. 9C, the signal may be an audio file 1032 including a pre-recorded message and may be sent to an audio system to be played as a public address. The signal may be a pre-recorded message 1034 (text or audio) sent via SMS to a device (e.g., a school designated office). The signal may be a pre-recorded (text or audio) message 1036 sent to local police. The signal may an SMS message 1038 sent to a 2-way radio device in or proximate to the facility. The signal may be a control signal 1040 sent to one or more cameras (or a device interfacing with the cameras) with line of sight to the area lock 1020 is disposed in to trigger the cameras to capture images and/or video of the area. The signal 1042 may be sent to a visual annunciator panel (e.g., including a display and/or speakers), where the visual annunciator panel is configured to communicate (via the display and/or speakers) the message to first responders. In one embodiment, the annunciator panel displays a map of the facility and a visual indication of where in the facility any locks 1020 have been placed in a lock down state (e.g., when button 1022 has been pressed). In any of the cases described above, the signal may include information received from lock 1020 and/or other information added by receiver 104.

The information included in any communications or messages described above that are sent via receiver 104 may include locations of "safe havens", e.g., areas that are locked down by locks 1020 where the occupants are safe during an emergency event, such as a shooting. The information may be used by first responders to get to the occupants in the emergency situation more quickly than would otherwise be possible.

In one embodiment, receiver 104 and/or smart hub 1030 may provide the signal to an all-in-one network audio horn speaker. The network audio horn speaker is configured to play a pre-recorded audio file (e.g., received in the message or communication from receiver 104 or stored in a memory coupled to the speaker) when manually or automatically triggered in response to receiving the signal or in response to an alarm event.

Figure 9D:
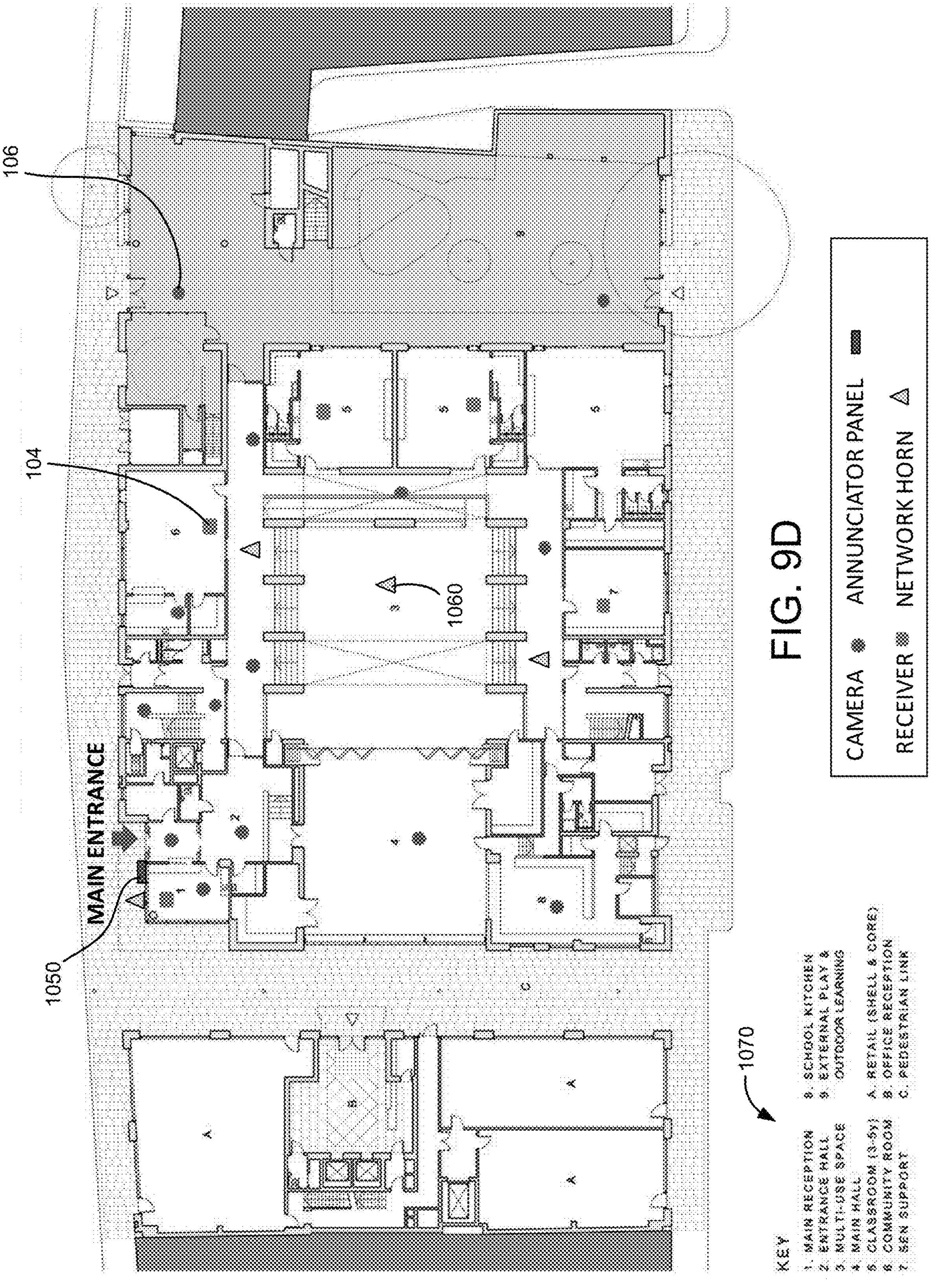
FIG. 9D illustrates the system of FIG. 9C in a facility in accordance with an embodiment of the present disclosure.

Referring to FIG. 9D, an exemplary system implementing the locks 1020, receivers 104, cameras 106, annunciator panel, and network horn described above is shown in accordance with an embodiment of the present disclosure. As shown in FIG. 9D, one or more receivers 104, cameras 106, network horns 1060, and annunciator panels 1050 may be disposed through various rooms or areas 1070 (having corresponding room I.D.s). When the button 1022 of any lock 1020 in the facility is pressed a receiver 104 in communication with the lock 1020 is configured to receiver a signal from the lock 1020 and send a signal (e.g., via a smart hub 1030) to one or more cameras 106, network horns 1060, annunciator panels 1050, and/or any other device. In this way, during any type of emergency event (e.g., a shooting) various rapid responses can be achieved automatically using the system of the present disclosure. It is to be appreciated that when lock 1020 is pressed messages and/or communications including any of the information or data described above may be sent to multiple sources (e.g. police, school administration, 2-way radios, public address system, visual annunciator located outside of facility, etc.)

It is to be appreciated that in any of the embodiments described above, when receiver 104 receives a signal from lock 1020, receiver 104 or a device coupled to receiver 104 is configured to archive (e.g., in a memory) all lock down events and the corresponding room I.D.s (and any associated images and/or video captured by cameras 106) where the lock down event occurred for later review by security personnel. The data archived may be analyzed (e.g., by monitoring module 102 or any other software) using video analytics software to mine for forensic evidence (e.g., to identify a shooter or other suspect in the images and/or video captured).

One or more of the locks 110, 112, 302, key fob 306, tag 550, lock 900, and facial recognition module 1004 discussed above may be disposed throughout an area and automatically surveilled by camera 106 when an attempt is made to change the state of locks 110, 112, 302 or structure such as by-pass doors or a safe (e.g., structure 1002) using the lock system of the present disclosure. As stated above, in some embodiments, camera 106 is configured to swivel to alter the orientation of the lens of camera 106 such that the lock or locks being unlocked or locked and/or one or more key fobs 306, are within the field of view of camera 106. In this way, camera 106 is configured to automatically capture images and/or video of any one of the locks and/or key fobs 306 in an area using the above described techniques or any other techniques for communication with cameras, such as camera 106. Furthermore, when the state of one or more locks or non-bitted key fobs 306 within the system of the present disclosure has been altered, a notification (e.g., email, text message, pop-up window, etc.) is automatically sent to relevant entities (e.g., security personnel, loss prevention, and/or other interested user's) by monitoring module 102 to alert the relevant entities of events (locking and unlocking of locks and/or structures, tilting or vibrating non-bitted key fob 306, etc.) occurring within a monitored facility or area implementing the system of the present disclosure.

Figure 6A:
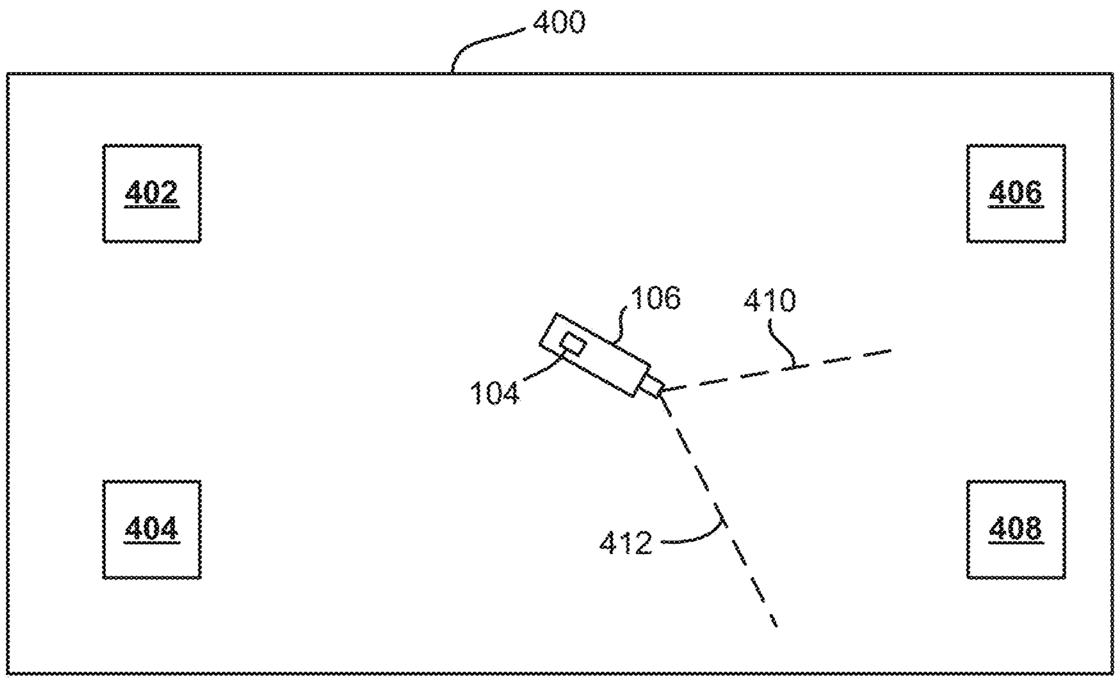
FIGS. 6A-6C illustrate the lock system of FIG. 1 in yet another environment in accordance with an embodiment of the present disclosure.

For example, referring to FIG. 6A, an area 400 is shown, where a plurality of structures 402, 404, 406, 408 are disposed throughout the area 400. Each of the plurality of structures 402, 404, 406, 408 includes one or more of the locks 110, 112, 302 or a facial recognition module 1004 and the necessary components of system 100. When an attempt is made to change the state of the lock or locks mounted to structure 408, one or more cameras 106 are automatically activated (i.e., via one or more communication signals sent via transceiver 114, transceiver circuit 312, etc.) and configured to capture images and/or video of structure 408. As shown in FIG. 6A, structure 408 is within the field of view (i.e., the area between lines 410, 412) of the lens of camera 106.

Figure 6B:
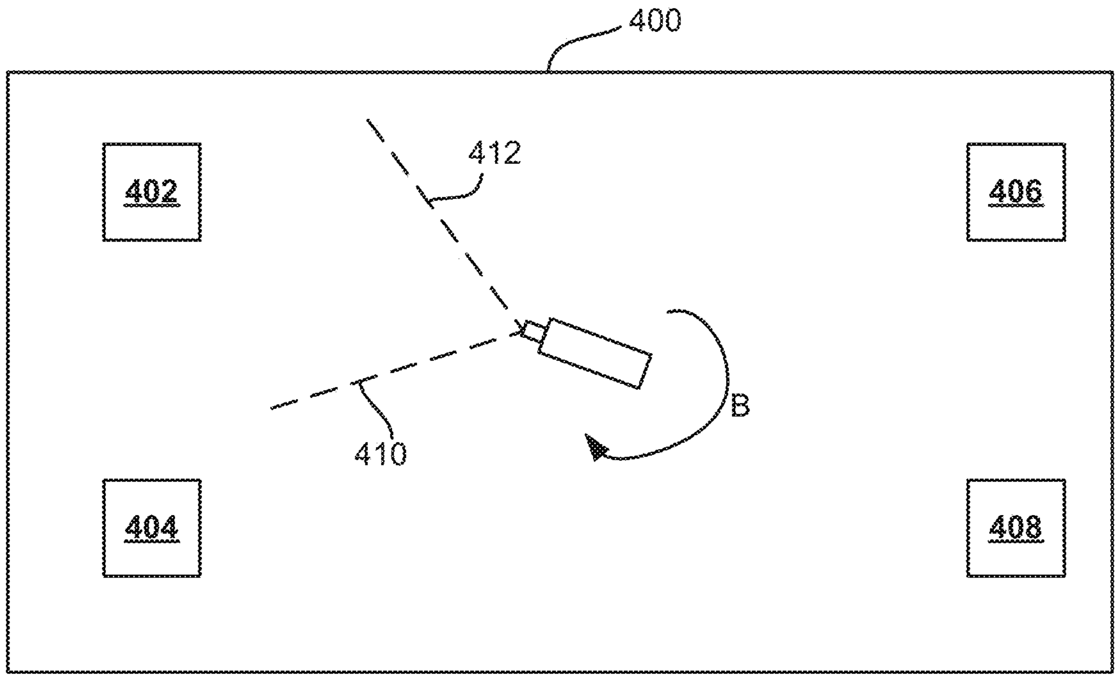

Referring to FIG. 6B, if an attempt is made to change the state of any of the locks mounted to structure 402, camera 106 is configured to automatically determine that structure 402 is outside the field of view of the lens of camera 106. If camera 106 determines that structure 402 is outside the field of view of the lens of camera 106, camera 106 is configured to swivel (in a direction B, indicated in FIG. 6B) until structure 402 is within the field of view of the lens of camera 106 before recording images and/or video of structure 402.

Figure 6C:
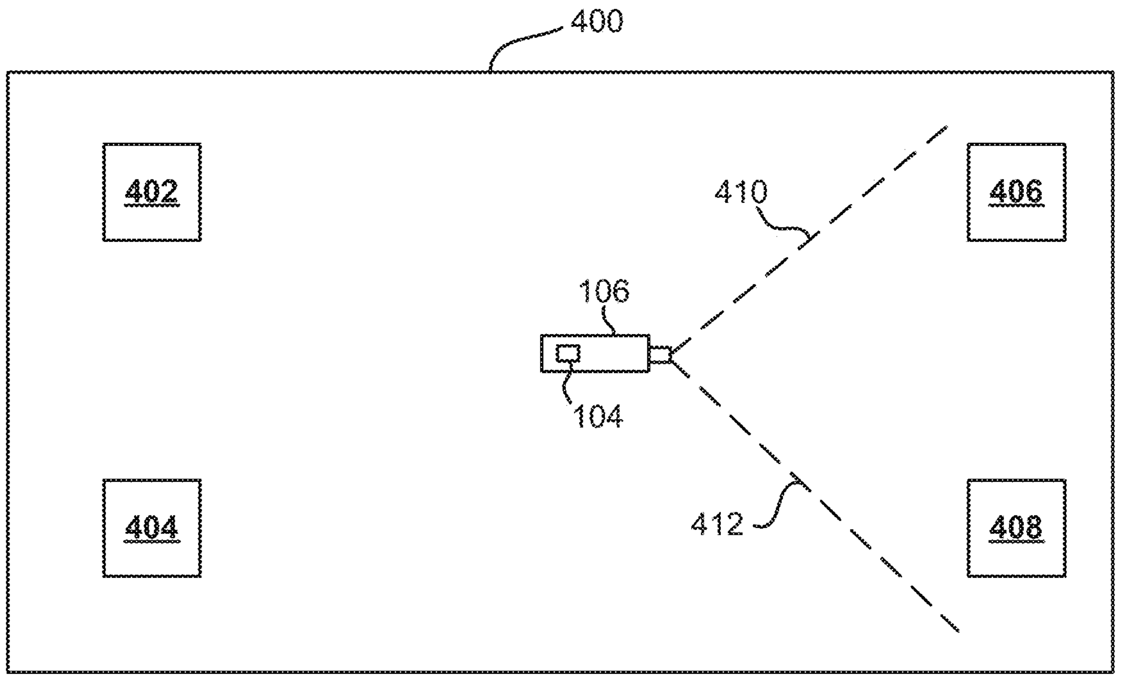

In some embodiments, where an attempt to change the state of two or more locks is made substantially at the same time or within a predetermined time of each other, camera 106 is configured to automatically swivel and orient itself such that each of the structures is simultaneously within the field of view of camera 106. In this way, camera 106 is able to capture images and/or video of two or more structures simultaneously. For example, referring to FIG. 6C, if an attempt is made to change the state of each of the locks mounted to structures 406, 408 within a predetermined time of each other, camera 106 is configured to automatically swivel and positions itself such that both of structures 406, 408 are within the field of view of the lens of camera 106 before recording images and/or video of structure 402. Additionally, the camera 106 may adjust a zoom of an associated lens to capture a wider area of interest.

In one embodiment, camera 106 is configured to determine the positions within area 400 of the locks mounted to the structures 402, 404, 406, 408 to implement the swiveling described above. Camera 106 may be configured to determine the positions of each of the locks in area 400 in one or more ways. For example, in one embodiment, the positions of each of the locks in area 400 may be mapped when each of the locks is installed in area 400 and saved in a memory of camera 106 (or an external memory accessible by camera 106, such as, a memory included in monitoring module 102). Each of the locks installed in area 400 include a unique identification code. When an attempt is made to change the state of any one of the locks installed in area 400, either controller 108 or transceiver circuit 312 of key fob 306 is configured to transmit the identification code of the lock to camera 106. Camera 106 is then configured to look up the unique identification code within the memory to determine the position of a lock when an attempt is being made to lock or unlock the lock. Once the position is determined, camera 106 is configured to swivel and orient itself, such that the field of view of the lens of camera 106 includes the position of the lock.

In another embodiment, each of the locks 110, 112 and/or the transceiver circuit 312 includes a GPS tracking chip or any other locating or tracking means. The GPS tracking chip is configured to determine a current position of the GPS tracking chip. In this embodiment, when an attempt to change the state of any of the locks 110, 112, 302 is made, controller 108 and/or transceiver circuit 312 requests the current position from the GPS tracking chip in the lock and/or transceiver circuit 312 and transmits the current position of the GPS tracking chip to receiver 104 of camera 106. Camera 106 then uses the position (as determined by the GPS tracking chip) to swivel and orient itself, such that the field of view of the lens of camera 106 includes the position of the lock that is currently being unlocked or locked.

It is to be appreciated that when the state of any of the locks 110, 112, 302 is changed or non-bitted key fob 306 is tilted or vibrated within one or more areas 400 of system 100, notification or communication signals may be automatically sent to camera(s) 106, monitoring module 102, and to any other devices (e.g., smart phones, smart watches, desktops, laptops, IoT devices, etc.), or entities (e.g., loss prevention located within the area 400, proximate to the area 400, or remotely from the area 400). The notification signals may by in the form of any type of communication, e.g., an email, text message, pop-up on a display screen, automated phone call, etc. The notification signals may alert these devices and/or entities that the state of one or more locks or a non-bitted key fob 306 within system 100 have been changed. For example, where the notification signals are received by monitoring module 102, a notification may be displayed on one or more displays or screens of monitoring module 102 along with the one or more images captured by cameras 106. In this way, personnel monitoring the displays or screen are automatically alerted to a change of state of a lock or non-bitted key fob 306 within the system 100. In this way, the personnel do not need to monitor an excessive number of screens and locks/non-bitted key fob 306 to identify when the state of a lock has been changed. It is to be appreciated that the notification signal may include information about the lock or non-bitted key fob 306 whose state has been altered (e.g., the identification number, the items secured by the lock, the time and date the state was changed, etc.), the location the lock or non-bitted key fob 306 is disposed in, or any other information available to the system 100 and relevant to a user receiving the notification.

It is to be appreciated that the images and/or video captured by cameras 106 within system 100 may further be automatically provided (e.g., by monitoring module 102, receiver 104, transceiver 114, transceiver 312, or transceiver 552) to one or more user computing devices (e.g., smart phones, smart watches, tablets, desktops, laptops, etc.). In this way, the user device receives both a notification of which lock has been locked or unlocked or a non-bitted key fob 306 has been titled or vibrated along with image and or video information that can be displayed on the user's device.

In some embodiments, system 100 may be configured to implement rules associated with special items or assets being secured by locks 110, 112, 302 within structures 202. For example, if a lock within system 100 is securing a special item or asset (e.g., expensive jewelry, important documents, dangerous substances, such as, chemicals or drugs), controller 108, transceiver circuit 312, and/or another component within system 100 is configured to send the notification signals sent to camera 106 and/or monitoring module 102 when the drawer/door/window has been opened (as detected by sensor means described above) and/or the locks securing the drawer/door/window has been locked or unlocked indicating that the state of a lock securing a special item has been altered. System 100 may be configured to give priority to locks securing special items. For example, if camera 106 can only focus on one of multiple locks whose state has been changed simultaneously (or within a very small time of each other), and one of those locks is securing a special item, camera 106 is configured to orient itself to capture images and or video of the lock and associated structure securing the special item. Furthermore, the notification sent and displayed in monitoring module 102 associated with the lock securing the special item, may include a prompt or other notification indicating that the attention of the personnel should be focused on the lock and structure within system 100 that is securing the special item.

In another embodiment of the present disclosure, an interface, such as interface 502 is used to bridge unconnected security components in security and surveillance systems for preventing theft of assets.

Figure 7A:
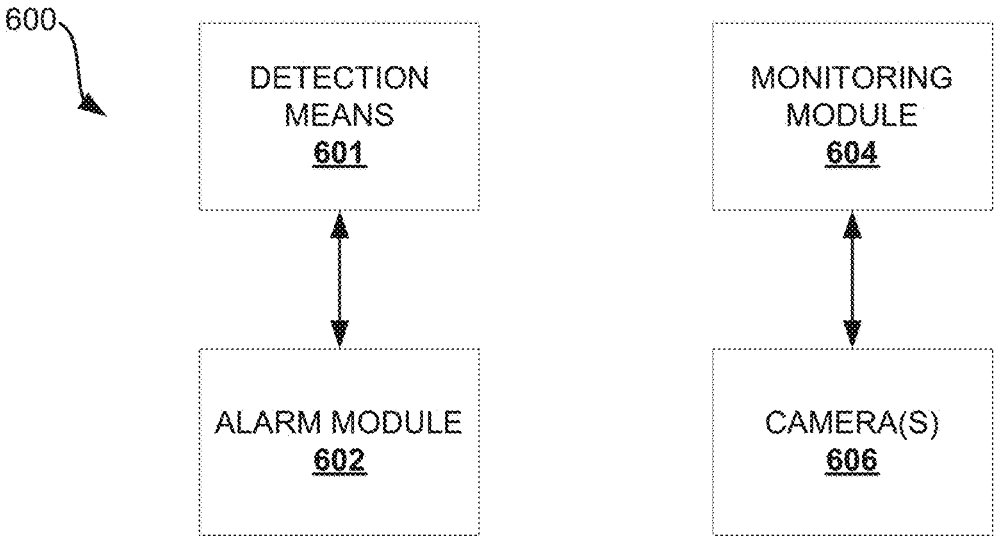
FIG. 7A is a block diagram of an existing security system in accordance with an embodiment of the present disclosure.

For example, referring to FIG. 7A, an existing security and surveillance system 600 for preventing theft of assets (retail goods, pharmaceutical items, etc.) is shown in accordance with the present disclosure. Existing systems 600 typically include a detection means 601 for detecting when an attempt to steal and asset occurs, e.g., one or more sensors at various points in a retail or other type of environment that sense when an asset is being removed from the environment by an unauthorized person or without being purchased. If the detection means 601 detects a potential theft, an alarm module 602 may be triggered. The alarm module 602 may be configured to generate an alarm sound or otherwise alert security personnel as to a potential theft. Existing systems 600 also may include one or more cameras 606 for surveilling an environment the assets are disposed in and a monitoring module 604, including one or more displays for displaying video streams captured by cameras 606 and storage means for storing the video streams.

A major disadvantage for existing systems 600 is that when a theft of an asset occurs and alarm module 602 is triggered, unless security personnel by chance see (either by physical line of sight or by viewing the displays in display module 604) the thief or assailant, the thief can escape the environment unidentified with the asset. Although video streams saved by cameras may be analyzed after the theft has occurred to identify the assailant, this is often too late to apprehend the thief immediately after the theft has occurred to prevent the asset from being stolen.

Figure 7B:
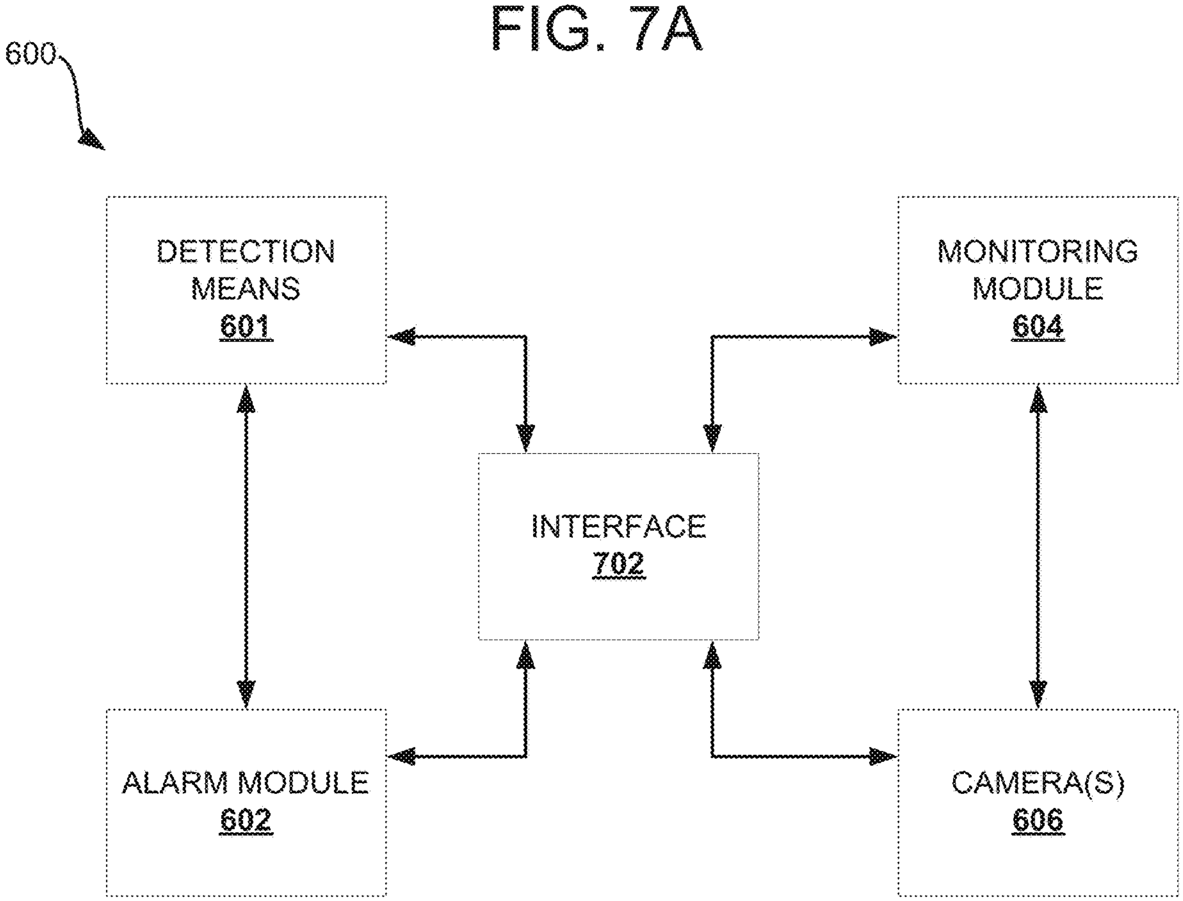
FIG. 7B is a block diagram of the security system of FIG. 7A including an interface for communicatively connecting several components of the system of FIG. 7A in accordance with an embodiment of the present disclosure.
Figure 7C:
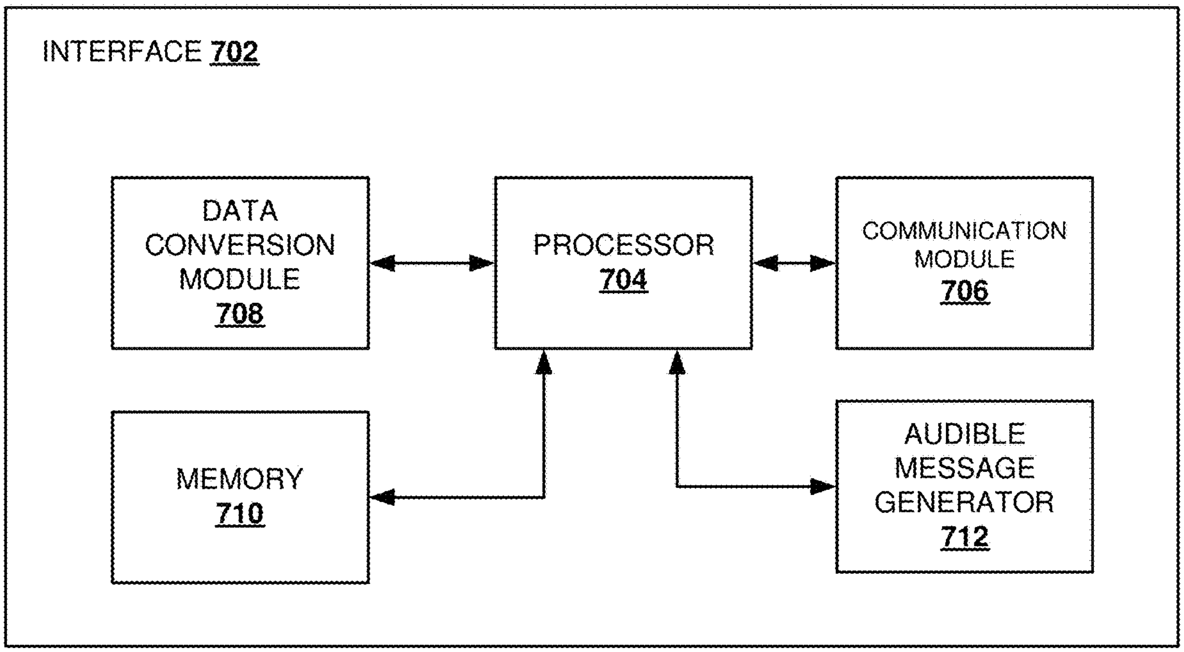
FIG. 7C is a block diagram of the interface of FIG. 7B in accordance with an embodiment of the present disclosure.

Referring to FIG. 7B, in one embodiment of the present disclosure, an interface 702 is introduced into the system 600 which connects the detection means 601 and alarm module 602 to the monitoring module 604 and camera 606. Referring to FIG. 7C, interface 702 includes a processor or controller 704 and a communication module 706. Communication module 706 is configured to communicate with detection means 601, alarm module 602, monitoring module 604 and camera 606 either via hardwired or wireless communication means. It is to be appreciated that in some embodiments, the detection means 601 and the alarm module 602 may be a single device including a common housing. In other embodiments, the alarm module 602 may be disposed remotely from the detection means 601. The detection means 601/alarm module 602 may include any device that generates an alarm, e.g., transmits a signal, closes a relay, generates a sound, etc., upon the detection means 601 sensing an event, e.g., the removal of an item, sensing motion, sensing glass breaking, etc. The detection means 601/alarm module 602 may include, but is not limited to, a retractable alarmed tether, a padlock tag, powered and alarmed pedestal, spider wraps, conductive tapes, etc.

Referring to FIGS. 7B, 7C, when the detection means 601 is triggered by a potential theft of an asset and alarm module 602 enters an alarm condition, processor 704 receives data indicative of the alarm condition from detection means 601 and/or alarm module 602 via communication module 706. It is to be appreciated that the data may be analog and/or digital data and interface 702 may include a data conversion module 708 (e.g., having an A/D converter, a plurality of communication protocols, etc.) for converting the data into a readable format for processor 704. The data received may further include identifying information relating to the asset or the detection means 601 (e.g., an ID number associated with the asset or the detection means 601, etc.) Responsive to the alarm condition, processor 704 sends (via communication module 706) one or more communication signals to camera 606, to trigger camera 606 to capture one or more images and/or a video of the area surrounding the detection means 601 and the protected asset that an attempted theft has been detected for. Processor 704 is further configured to receive the captured images and/or video from camera 606 and provide the captured images and/or video to monitoring module 604. In one embodiment, processor 704 sends a notification to monitoring module 604 causing a pop-up window to open on one of the displays associated to the monitoring module 604, the pop-up window including the captured images and/or video and information associated with the asset and/or detection means 601 (e.g., which asset the attempted theft is occurring for, which detection means 601 within an environment has been triggered, a location of the detection means 601 and/or asset). In this way, security personnel viewing the displays in monitoring module 604, can immediately identify the thief attempting to steal the asset and prevent the thief from leaving the environment.

It is to be appreciated that processor 704 or communication module 706 are configured to send communications signals to cameras 606 and/or monitoring module 604 in the existing format that each of cameras 606 and/or monitoring module 604 can accept communication for. For example, if cameras 606 are analog cameras, processor 704 or communication module 706 are configured to convert any communication signals sent to cameras 606 via the data conversion module 708 (to trigger cameras 606 to capture one or more images) to a suitable analog format supported by cameras 606.

As stated above, in systems, such as system 600, when detection means 601 detects a potential or attempted theft, the alarm module 602 may be configured to generate an alarm sound. However, if at least one person (e.g., security personnel) is not near enough to the alarm module 602 and/or the environment surrounding alarm module 602 is overly noisy, the alarm sound generated by alarm module 602 may not be heard by anyone. If the alarm sound is not heard by anyone, then the theft may not be prevented and the entire purpose of having the detection means 601 and alarm module 602 may be frustrated.

Figure 7D:
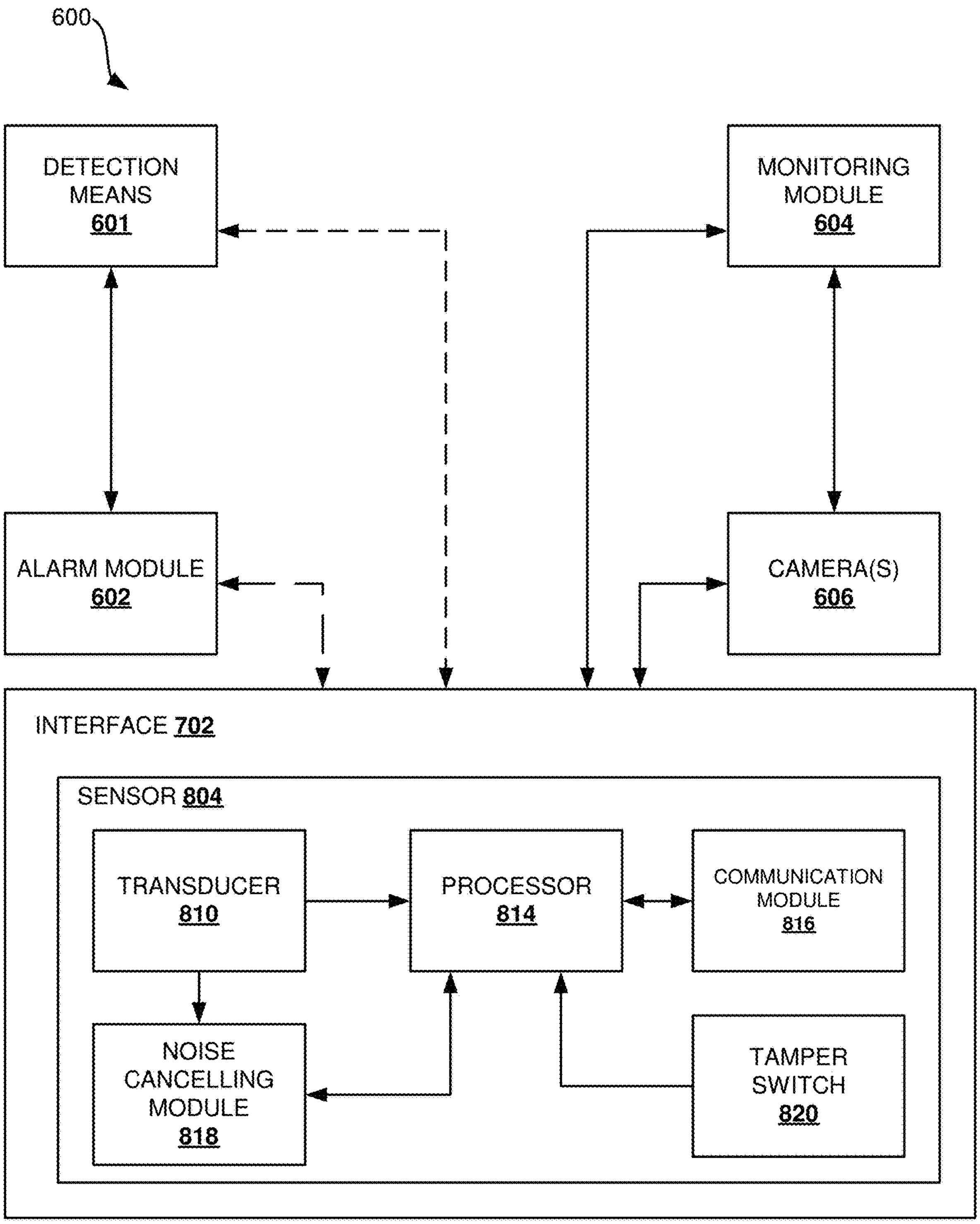
FIG. 7D is a block diagram of the security system of FIG. 7A including an interface and at least one sound frequency sensor in accordance with an embodiment of the present disclosure.

Referring to FIG. 7D, in one embodiment of the present disclosure, one or more sound frequency sensors 804 are employed to overcome the above-described problem in systems, which generate alarm sounds to alert security personnel of a potential theft. The sensor(s) 804 may be included in interface 702 (as shown in FIG. 7D) or alternatively may be external to interface 702 and placed at various locations throughout a given area. In either case, sensor(s) 804 is communicatively coupled to interface 702 (e.g., wirelessly or via hardwired connection) and configured to determine the frequency of sound waves generated proximately to sensor(s) 804. Sensor 804 may include at least one microphone or transducer 810 that converts sound into an electrical signal, e.g., an analog/digital signal, an analog-to-digital-converter (not shown), a processor 814 for determining a frequency of the sound and if the frequency is in a predetermined range and an input/output or communication device 816 for transmitting a signal to the interface 702. It is to be appreciated that the analog-to-digital converter may be a separate component or may be integrated with the transducer 810 and/or processor 814. Alarm sounds, such as those generated by alarm module 602, typically occur within a particular or predetermined frequency range (e.g., 1-3 kHz). Sensor(s) 804 is configured to detect or sense when sound waves having a frequency that is within the predetermined frequency range are generated in a given area and send a signal to processor 704 of interface 702 indicating that an alarm sound has been sensed. It is to be appreciated that the predetermined frequency range of sensor 804 may be adjustable so that interface 702 may be used with a plurality of existing alarm modules 602 and/or systems. The frequency range to be detected by sensor 804 may be adjusted to match, or be in the range, of an audible output of the alarm module 602. It is further to be appreciated that if more than one interface 702 are employed in system 600, each sensor 804 may have its detectable frequency range be adjusted to a particular alarm module 602, e.g., an alarm module 602 closest in distance to the associated sensor 804.

In one embodiment, interface 702 and/or sensor 804 includes a noise cancelling module 818, which cancels ambient noise in frequency ranges other than the frequency ranges associated with alarm sounds. The noise cancelling module is configured to eliminate this noise from being input to sensor(s) 804 to prevent false alarms. In one embodiment, the noise cancelling module 818 receives a noise signal from the transducer 810 and removes the noise component before forwarding the signal to the processor 814 for further processing. In another embodiment, the processor 804 receives a noise signal from the transducer 810, forwards the signal to the noise cancelling module 818 for processing and then receives the processed signal from the noise cancelling module 818 to determine if the processed signal is on the predetermined frequency range.

In a further embodiment, the interface 702 and/or sensor 804 may include a tamper switch 820, which may activate a communication and/or signal when the interface 702 and/or sensor 804 is tampered with, e.g., opened, moved, parameters changed without authority or permission, etc. When the tamper switch 820 is activated, a signal is transmitted to processor 814 which then transmits the tamper signal to the interface 702 via the communication module 816. The interface 702 may activate a camera 606 to record images in the vicinity of the sensor 804 or transmit an alert to the appropriate personnel.

Responsive to the signal received from sensor(s) 804, processor 704 sends (via communication module 706) one or more communication signals to camera 606, to trigger camera 606 to capture one or more images and/or a video of the area surrounding the detection means 601 (and/or sensor 804) and the protected asset that an attempted theft has been detected for. Processor 704 is further configured to receive the captured images and/or video from camera 606 and provide the captured images and/or video to monitoring module 604. In one embodiment, processor 704 sends a notification to monitoring module 604 causing a pop-up window to open on one of the displays, the pop-up window including the captured images and/or video and information associated with the asset and/or detection means 601 (e.g., which asset the attempted theft is occurring for and which detection means 601 within an environment has been triggered). In this way, security personnel viewing the displays in monitoring module 604, can immediately identify the thief attempting to steal the asset and prevent the thief from leaving the environment.

It is to be appreciated that in addition to the notification or communication signals being sent to the camera(s) 606 and/or monitoring module 604, notification or communication signals may be automatically sent to any other devices (e.g., smart phones, smart watches, desktops, laptops, IoT devices, etc.), or entities (e.g., loss prevention located within the area being monitored or proximate to the area, local police, etc.). The notification signals may by in the form of any type of communication, e.g., an email, text message, pop-up on a display screen, automated phone call, external alarm, voice generated message, etc.

In one embodiment, the interface 702 may generate an audible message to be played on an appropriate device, e.g., a two-way radio. In this embodiment, the interface 702 may generate a message based on the information received from the detection means 601, the alarm module 602 and/or sensor 804 associated with a particular asset. For example, the information received may include an ID number associated with the asset or the detection means 601, a location of the asset, etc. Based on the information received, the interface 702 may generate an audible message by either using the information received or looking up the information (e.g., stored in a memory 710 of the interface 702 or in a remote database) based on the received information. Based on the information received, the interface 702 may determine that the alarm triggered was associated to an item, for example, in the fragrance department in area 6. The interface 702 may then generate the audible message, via an audible message generator 712, and send the message to a two-way radio being carried by a security personnel in the facility. The message will then be played on the two-way radio, for example, "Alert! Fragrance Department, Area 6". It is to be appreciated that a text version of this message may be sent to a cell phone or mobile device of security personnel within the facility.

It is to be appreciated that, since sensor(s) 804 use sound frequency to determine when an alarm condition has been triggered, in one embodiment, interface 702 and sensor(s) 804 do not need to be physically connected to detection means 601 and alarm module 602. Additionally, the interface 702 may communicate with the monitoring module 604 and/or the camera(s) 606 via any of the wireless communication means described herein. In this way, integration of interface 702 and sensor(s) 804 with an existing system 600 is made even easier. For example, the interface 702, including a sensor 804 disposed in a single housing, may be placed anywhere in a facility without new wiring. The interface 702 will pick up sound generated by a detection means 601/alarm module 602 in the vicinity of the interface 702 and/or sensor 804 and will generate an alert and/or trigger to be wirelessly sent to monitoring module 604 and/or camera(s) 606.

It is to be appreciated that, in the embodiments shown in FIGS. 7B-7D, interface 702 may be coupled to a receiver, such as receiver 104, described above. Receiver 104 may receive wireless communications from detection means 601, alarm module 602, and/or sensor(s) 804 to trigger interface 702.

It is to be appreciated that the lock system 100, locks 110, 112, 302, key fob 306, and/or interface 702 may be tested and certified by and/or in compliance with any one of the Underwriters Laboratory, Conformité Européenne (CE), the Restriction of Hazardous Substances Directive (RoHs), and/or the Federal Trade Commission (FTC).

It is to be appreciate that all communications sent by communication devices in the system of the present disclosure (e.g., transceiver 114, transceiver circuitry 312, receiver 104, etc.) is encrypted. Furthermore, it is to be appreciated that, in some embodiments, all communication signals sent by communication devices in the system of the present disclosure are sent outside of the standard network (e.g., Wi-Fi network) within the facility or area that system is implemented in to increase security.

Figure 10:
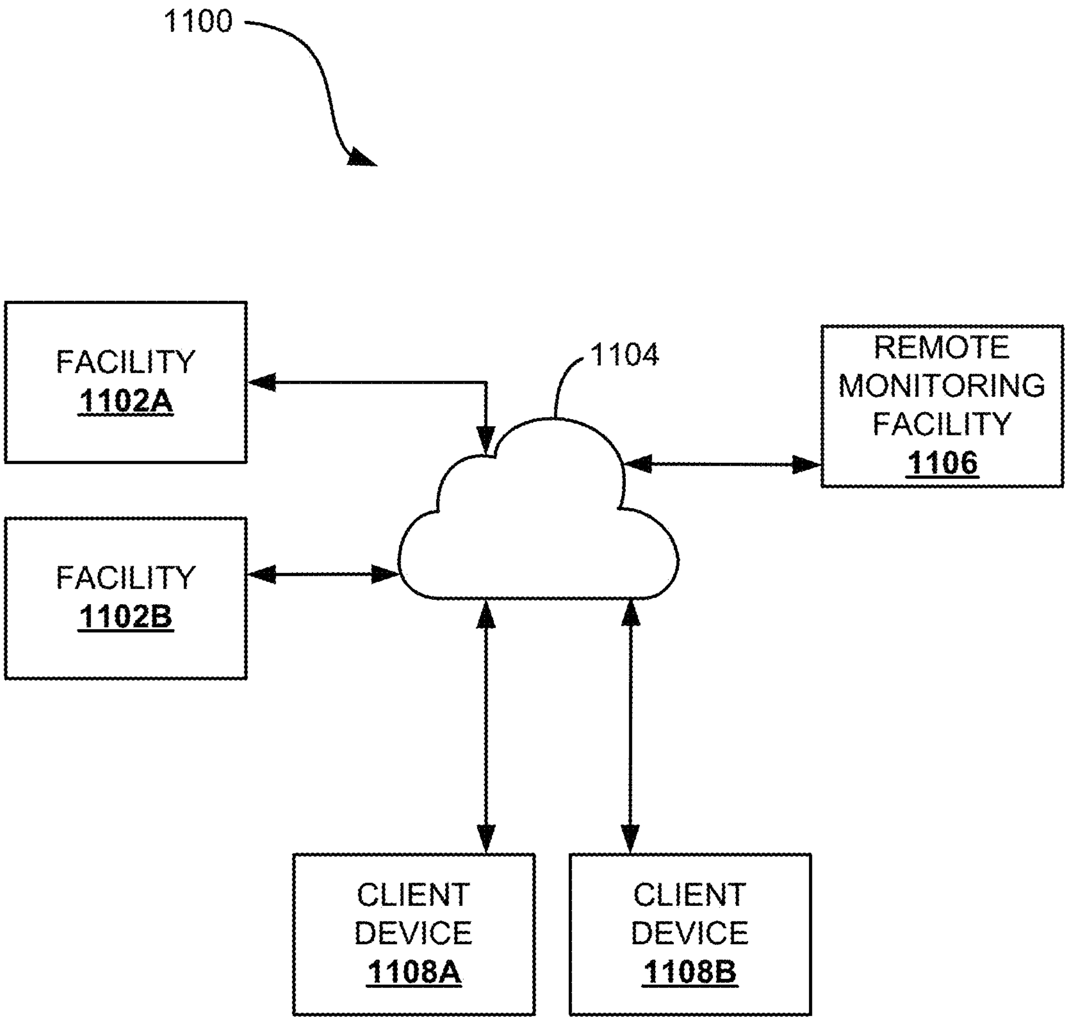
FIG. 10 is a block diagram of a system in accordance with an embodiment of the present disclosure.

For example, referring to FIG. 10, a system 1100 is shown in accordance with the present disclosure. One or more facilities 1102 may each include any of the locks or devices described above. A corresponding receiver 104 (or plurality of receivers) in each facility 1102 is configured to communication via an external network (e.g., wireless or hardwired) 1104 with a remote monitoring facility 1106 (e.g., including monitoring module 102, described above) and/or one or more client devices 1108 (e.g., a desktop, laptop, smart phone, tablet, or any other computing device). The receiver 104 in each facility 1102 may be configured to send any of the information described above (e.g., lock IDs, lock states, battery levels, images, data/time information, etc.) to remote monitoring facility 1106 and/or client devices 1108. Furthermore, each receiver 104 may receive control instructions (or any other type of information or query) from remote monitoring facility 1106 and/or client devices 1108. Each receiver 104 may then appropriately communicate with each lock or device within the facility 1102 to carry out the control instructions. For example, remote monitoring facility 1106 and/or client devices 1108 may operate (e.g., open or close) any of the locks or devices in a facility 1102 by sending control instructions to operate the locks or devices to a receiver 104 in communication with the locks or devices.

Figure 11A:
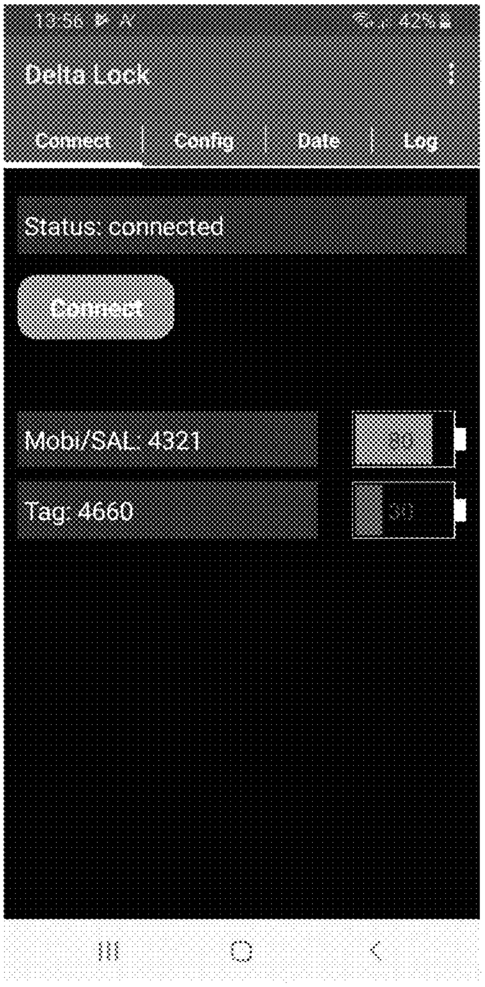
FIGS. 11A-11D illustrate various screens of a user interface of an application in accordance with an embodiment of the present disclosure.
Figure 11B:
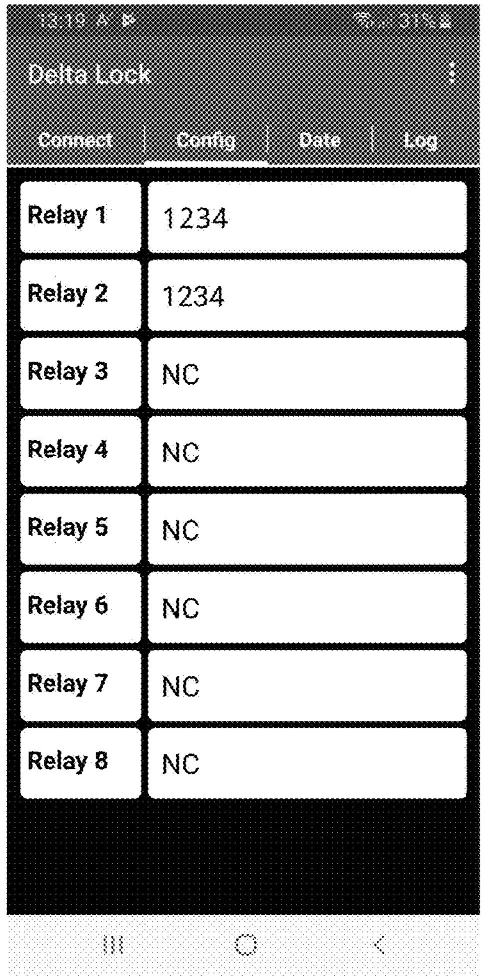

In one embodiment, an app (e.g., a mobile app, a desktop app, a web app, etc.) may be installed and/or executed on a client device 1108 (or on a device in remote monitoring facility 1106) that enables the client device 1108 to synchronize with and receive relevant data from receiver 104 about each of the locks or devices in a facility 1102. For example, referring to FIGS. 11A-11C various screens in an exemplary user interface of an app for interfacing with receivers 104 is shown in accordance with the present disclosure. As shown in FIGS. 11A-11B, a user may connect to one or more receivers 104 and receive information (e.g., battery level, lock or tag ID, lock state, data/time) associated with the devices in communication with connected receiver 104.

Figure 11C:
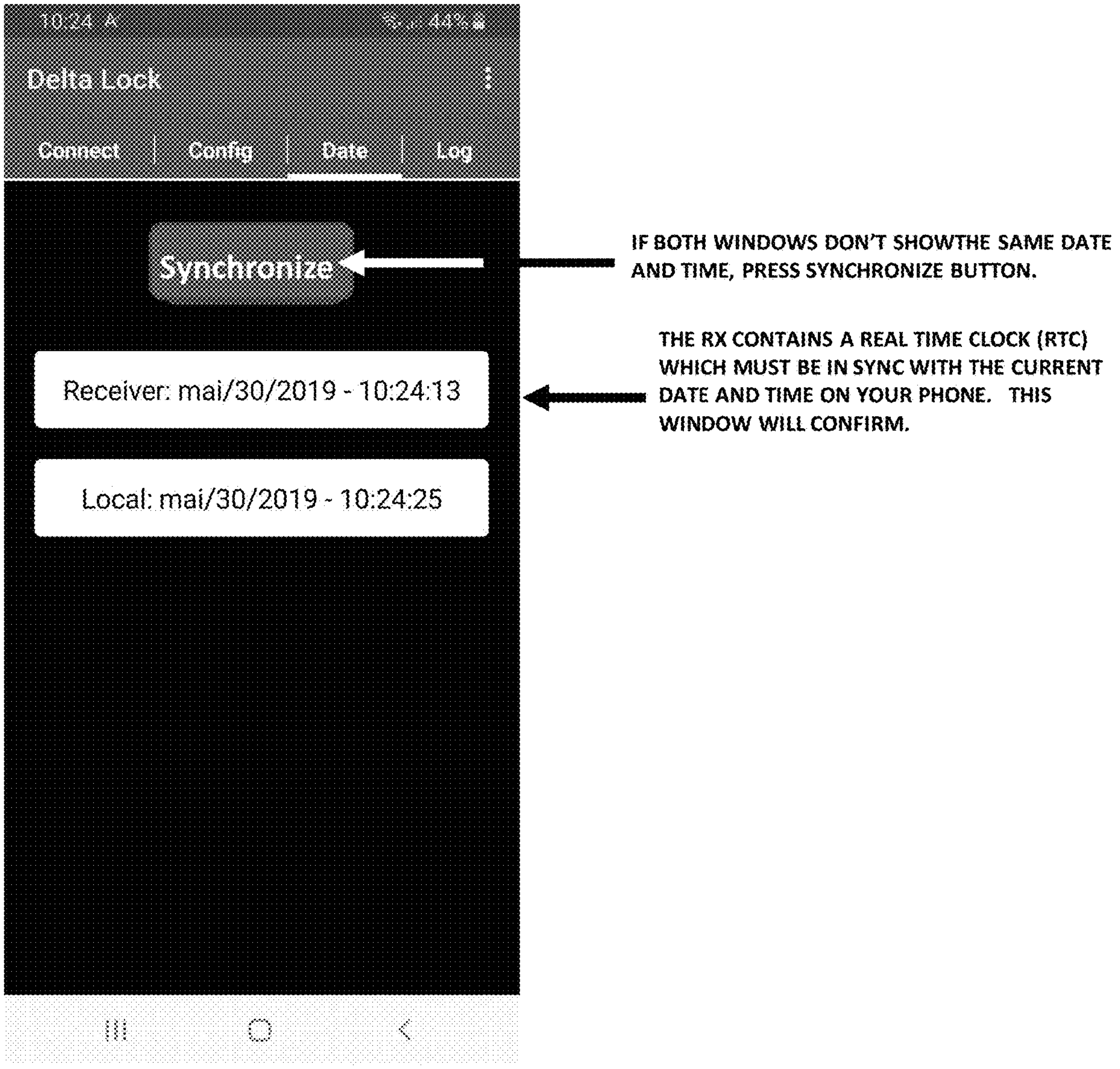

It is to be appreciated that each receiver 104 includes a real time clock (RTC), which tells the receiver 104 what the current time is. The receiver 104 uses the current time to report information (e.g., time a lock state has changed, time an image has been captured, etc.) monitoring facilities 1106 and client devices 1108. However, the time determined by the RTC in each receiver 104 and the time determined by a device running the app (e.g., client devices 1108), must be synchronized, so that there are no discrepancies in an audit trail (e.g., when an unauthorized attempt to open a lock has occurred). Referring to FIG. 11C, the app enables a user to check that the RTC of a given receiver is synchronized with the RTC of the device executing the app. If the time is not synchronized, a user may (e.g., by selecting a button) instruct the app to synchronize the RTC of the receiver 104 to the RTC of the device running the app. In one embodiment, responsive to a synchronization signal received by the receiver 104 changes the time of the RTC of the receiver 104 to mimic the time of the RTC of the device running the app.

Figure 11D:
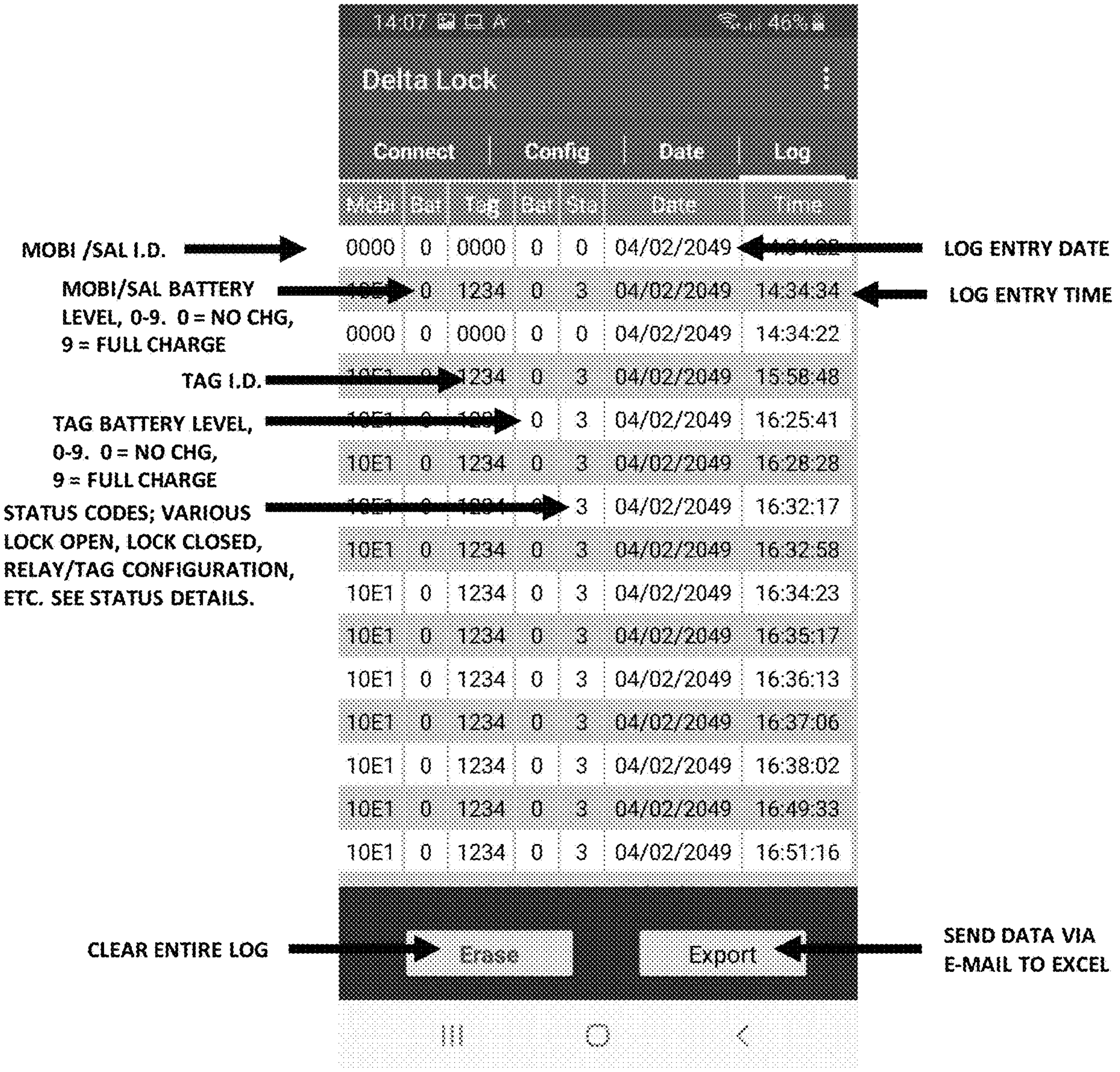
Figures 11E, 11F:
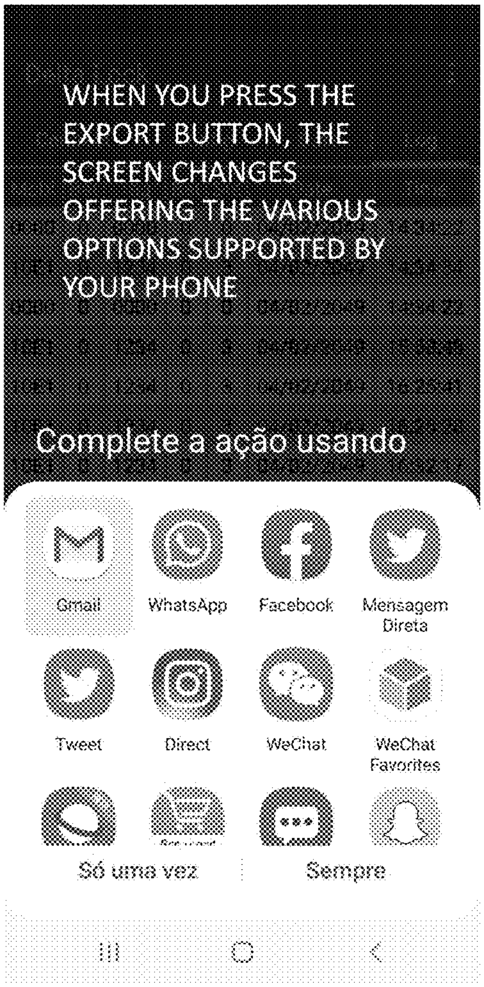
FIG. 11E illustrates data extracted from the application of FIGS. 11A-11D in accordance with an embodiment of the present disclosure.
FIG. 11F illustrates a screen for enabling a user to export data from the application of FIGS. 11A-11D in accordance with an embodiment of the present disclosure.
Figure 11G:
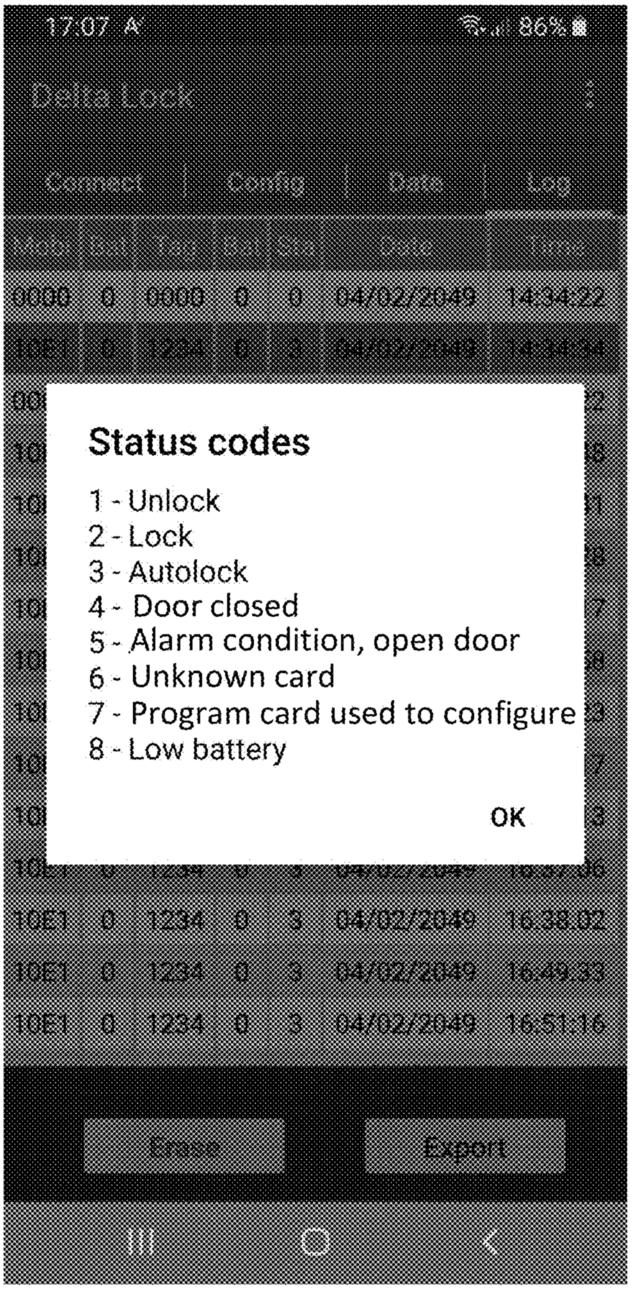
FIG. 11G is a screen illustrating status codes of the application of FIGS. 11A-11D in accordance with an embodiment of the present disclosure.

Once receiver(s) 104 is connected to and synchronized with the app, referring to FIG. 11D, the app is populated with information associated with the each lock or device in communication with a receiver 104 (e.g., lock ID, tag ID battery level of lock or tag, data/time that the state of the lock changed, etc.). Referring to FIGS. 11E and 11F, all of the data compiled by the app from receiver 104 may be erased or exported, e.g., in a desktop or laptop appropriate format (such as an excel sheet or a csv file) as shown in FIG. 11E or in any format supported by the device running the app (e.g., various formats supported by other apps of a mobile device, such as, text messaging apps, emailing apps, etc.) It is to be appreciated that some of the information compiled in the app may be communicated in the form of status codes (e.g., where the codes may be associated with battery levels, lock/unlock states of a lock, etc.). The app may include a legend explaining what each status code pertains to, for example, as shown in FIG. 11G.

Figure 12:
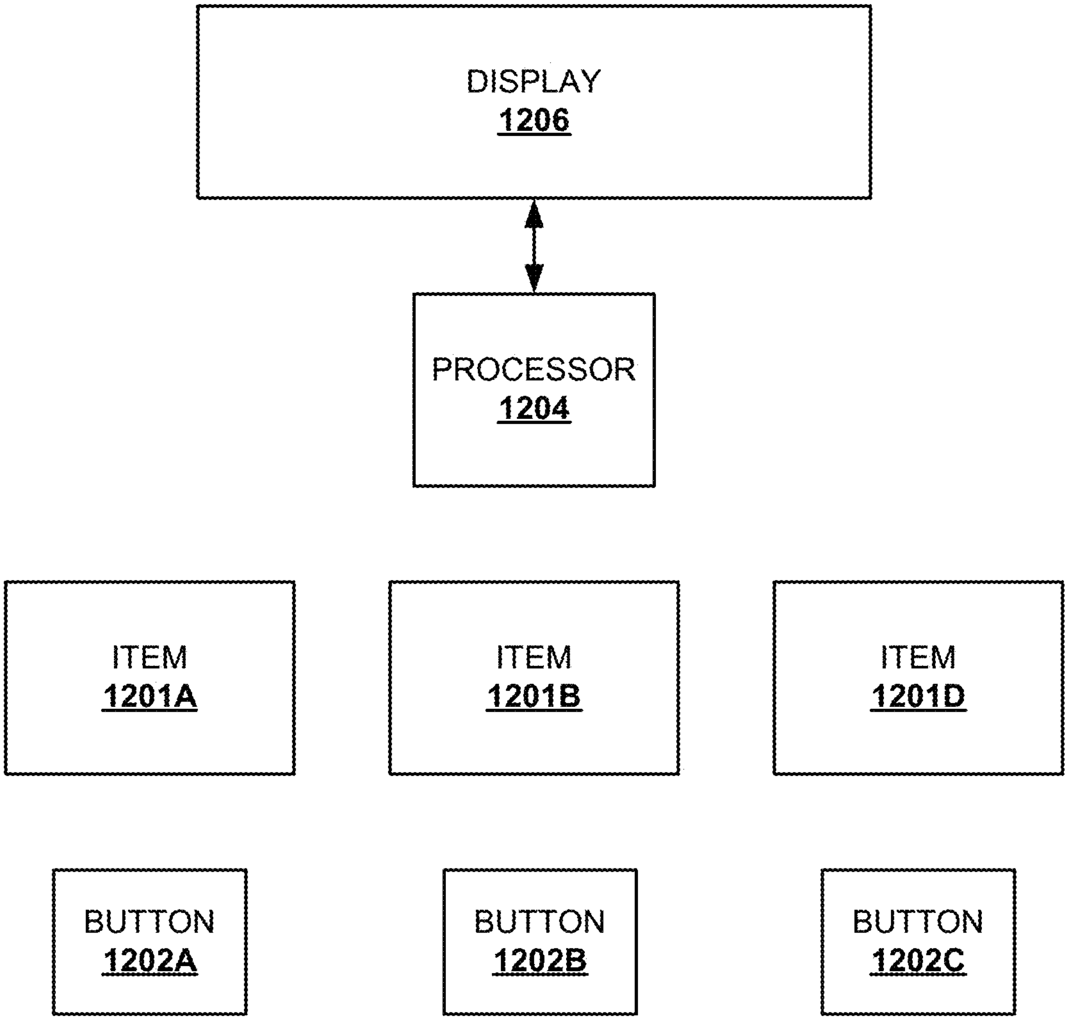
FIG. 12 is a block diagram of a system for educating a user on the differences between various items in accordance with an embodiment of the present disclosure.

In another embodiment of the present disclosure, a system is provided for automatically educating the user as to differences between various items offered for purchase in a retail setting. For example, referring to FIG. 12, in a retail setting, various related items 1201 may be disposed proximately to each other and available for retail purchase. It is to be appreciated that the related items 1201 may be any type of items that may be used for similar purposes (e.g., hardware tools used for the same purpose, cleaning agents used for the same purpose, toys of the same genre or type).

In one embodiment, a button 1202 is placed in close proximity to each item. The button 1202 is in communication with a processor 1204 (e.g., via wireless or hardwired communication). Processor 1204 is coupled to a display 1206 (and/or speakers integrated with or coupled to display 1206) disposed proximately to items 1201 and visibly to potential purchasers of items 1201. When a button 1202 is pressed, processor 1204 is triggered to cause display 1206 to output a video or visual presentation including information related to each item 1201 and the differences between each item that may help a user make a decision selecting and differentiating between which item 1201 to buy. The video or visual presentation may be stored in a memory coupled to processor 1204 and/or display 1206. It is to be appreciated that the memory may include a plurality of different videos or video presentation that are associated with items 1201. It is to be appreciated that, in one embodiment, a single button may be associated with a plurality of items 1201.

It is to be appreciated that the various devices of the present disclosure, e.g., locks 110/302/900/1020, receiver 104, cameras 106/606, interfaces 502/702, device 1004, smart hub 1030, spinner 1400, include a power source, similar to power source 213 described above, for providing power to the components of a respective device. In some embodiments, the power source is configured as a hardwired connection to an external power source such as an AC source or a DC source (e.g., the electrical system of a home or building or a low voltage power supply). In some embodiments, the power source may include circuitry for receiving power wirelessly, e.g., using electromagnetic induction to transfer energy through an electric field between power source and another power source. It is to be appreciated that the energy transfer may occur in any part of the electromagnetic spectrum, including, but not limited to, radio frequency (RF) transmission of energy. In some embodiments, power source is configured as a battery receptacle for receiving one or more batteries. It is to be appreciated that any battery type may be used as a power source 213 without deviating from the scope of the present disclosure. In some embodiments, the various devices may be concurrently coupled to a second (e.g., back-up) power source in additional to the first power source. In this way, if power is lost (e.g., a power surge has occurred, the batteries no longer store a charge, etc.), the device may still be operated (e.g., to be unlocked, locked, etc.) if needed. The second power source may be a hardwired or wireless power source. In a further embodiment, when the device is coupled to a network, the power may be provided by an external source via power over Ethernet (PoE) where power is pass along with data over twisted pair Ethernet cabling.

It is to be appreciated that the various devices and/or components of the present disclosure, e.g., transceiver 114/312/552/1304, receiver 104, connector ports 210, communication module 706, and smart hub 1030, may employ one or more communication means, either hardwired or wireless, for communicating signals between devices and/or over a network. The hardwire connection may include, but is not limited to, hard wire cabling e.g., parallel or serial cables, RS232, RS485, USB cable, Firewire (1394 connectivity) cables, Ethernet, and the appropriate communication port configuration. The wireless connection may support at least some or all of the following wireless communication protocols: ANT/ANT+, Bluetooth, Bluetooth (Low Energy) LE, Dali, DASH7, Echelon, EnOcean, Ethernet, KNX, Mbus, Modbus, (Near Field Communication (NFC), X-10, Insteon, Low-Power Wide-Area Network (LoRaWAN), Long-Term Evolution (LTE), Universal Mobile Telecommunications System (UMTS), code division multiple access (CDMA), Global System for Mobile Communications (GSM), Radio-Frequency Identification (RFID), Weightless-N/W/P, 802.11/Wi-Fi, 802.15.4, IPv6 over Low power Wireless Personal Area Networks (6LoWPAN), Thread, ZigBee, Z-Wave and/or any mesh enabled wireless communication.

It is to be appreciated that the various features shown and described are interchangeable, that is a feature shown in one embodiment may be incorporated into another embodiment.

While the disclosure has been shown and described with reference to certain preferred embodiments thereof, it will be understood by those skilled in the art that various changes in form and detail may be made therein without departing from the spirit and scope of the disclosure.

Furthermore, although the foregoing text sets forth a detailed description of numerous embodiments, it should be understood that the legal scope of the invention is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

It should also be understood that, unless a term is expressly defined in this patent using the sentence "As used herein, the term '______' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

What is claimed is:

1. A device comprising:

a first housing including a top portion and a bottom portion, the top portion configured to support jewelry display spinner disposed thereon and the bottom portion configured to support the first housing on a surface of a structure;

the jewelry display spinner including a base and a jewelry display housing, the jewelry display housing configured to display jewelry disposed therein and rotates relative to the base, the base being fixedly coupled to the top portion of the first housing;

a sensor disposed in the first housing that senses a status of the jewelry display housing relative to the first housing;

a controller disposed in the first housing and coupled to the sensor to receive a signal from the sensor, the controller configured to determine at least one alarm condition based upon the signal from the sensor;

an alarm module disposed in the first housing and coupled to the controller, the alarm module generates an alert under the at least one alarm condition, the alert includes at least one of an audible alert and/or visual alert; and a transceiver disposed in the first housing and coupled to the controller, the transceiver is configured to send at least one communication signal to at least one device under the at least one alarm condition.

2. The device of claim 1, wherein the sensor is a weight sensing device.

3. The device of claim 2, wherein the controller is calibrated for at least one starting weight and/or at least one weight threshold, wherein the at least one weight threshold is an amount of weight removed from the device relative to the top portion of the first housing to trigger an alarm.

4. The device of claim 1, wherein the sensor is a vibration sensor.

5. The device of claim 1, wherein the sensor is a tilt sensor.

6. The device of claim 1, wherein the at least one device is at least one camera and the at least one communication signal further triggers the at least one camera to capture at least one image oriented in the vicinity of the jewelry display spinner.

7. The device of claim 6, wherein the at least one communication signal further includes instructions for the at least one camera to swivel to the location of the jewelry display spinner and/or device.

8. The device of claim 6, further comprising a card reader disposed in the first housing and coupled to the controller, the card reader enables a card to arm and disarm the device, wherein when disarmed, the controller does not trigger an alarm.

9. The device of claim 1, further comprising a card reader disposed in the housing and coupled to the controller, the card reader enables a card to arm and disarm the device, wherein when disarmed, the controller does not trigger an alarm.

10. The device of claim 9, wherein the card is at least one of a Radio-Frequency Identification (RFID) card and/or a Near Field Communication (NFC) card.

11. The device of claim 9, wherein the card communicates to the card reader external to the housing.

12. The device of claim 9, wherein the first housing includes a slot that receives the card to access the card reader.

13. The device of claim 1, wherein the transceiver operates in accordance with at least one of WiFi protocol, Near Field Communication (NFC) protocol, Bluetooth protocol, Bluetooth Low Energy (BLE) protocol, ZigBee protocol and/or Z-wave protocol.

14. The device of claim 1, wherein the transceiver operates in accordance with a wireless communications protocol.

15. The device of claim 1, wherein the at least one communication signal includes an audible message and the at least one device is at least one mobile device configured to receive and play the audible message.

16. The device of claim 15, wherein the at least one mobile device is a two-way radio.

17. The device of claim 15, wherein the at least one communication signal further includes a text version of the audible message, the text message to be displayed in the at least one mobile device.

18. The device of claim 1, wherein the at least one communication signal includes at least one of a unique identification number associated with the jewelry display spinner and/or information associated with the structure the jewelry display spinner is associated to.

19. The device of claim 1, further comprising a shoe coupled to the sensor via an arm, the shoe further coupled to the bottom portion of the housing to support the first housing on the surface of the structure, wherein upon movement of the first housing relative to the shoe, an alarm condition is triggered.

20. The device of claim 19, wherein the sensor is a weight sensing device.

* * * * *